(12) United States Patent
Zhang et al.

(10) Patent No.: US 11,900,924 B2
(45) Date of Patent: Feb. 13, 2024

(54) SEMANTIC PARSING METHOD AND SERVER

(71) Applicant: Huawei Technologies Co., Ltd., Shenzhen (CN)

(72) Inventors: Qing Zhang, Shenzhen (CN); Wei Yang, Shenzhen (CN); Lianghe Zhang, Beijing (CN); Yibo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 280 days.

(21) Appl. No.: 17/607,657

(22) PCT Filed: Apr. 22, 2020

(86) PCT No.: PCT/CN2020/086002
§ 371 (c)(1),
(2) Date: Oct. 29, 2021

(87) PCT Pub. No.: WO2020/221072
PCT Pub. Date: Nov. 5, 2020

(65) Prior Publication Data
US 2022/0208182 A1 Jun. 30, 2022

(30) Foreign Application Priority Data
Apr. 30, 2019 (CN) .......................... 201910370839.7

(51) Int. Cl.
*G10L 15/22* (2006.01)
*G10L 15/18* (2013.01)
(Continued)

(52) U.S. Cl.
CPC ........ *G10L 15/1815* (2013.01); *G06F 40/279* (2020.01); *G06F 40/30* (2020.01);
(Continued)

(58) Field of Classification Search
CPC ..... G10L 15/1815; G10L 15/07; G10L 15/22; G10L 15/30; G10L 15/1822; G10L 15/26;
(Continued)

(56) References Cited

U.S. PATENT DOCUMENTS 8,238,541 B1 * 8/2012 Kalavar .............. H04M 3/5233
379/265.06
9,754,591 B1 9/2017 Kumar et al.
(Continued)

FOREIGN PATENT DOCUMENTS

CN 104462053 A 3/2015
CN 104572626 A 4/2015
(Continued)

OTHER PUBLICATIONS

Bhargava, A., et al., "Easy Contextual Intent Prediction and Slot Detection," 2013, 5 pages.
(Continued)

*Primary Examiner* — Abul K Azad
(74) *Attorney, Agent, or Firm* — Conley Rose, P.C.

(57) ABSTRACT

A semantic parsing method includes extracting, by a first server, a first entity of a first slot from a first user sentence, modifying the first entity to a second entity of a second slot when the first entity is a pronoun, sending a first server request to a second server, and obtaining a first service result from the second server in response to the first service request. The first service request includes indication information of a first intention and the first entity, the second server is an application server that provides a first skill, and the first service result is based on the first intention and the first entity. The first server returns the first service result to a device to output by the device.

20 Claims, 42 Drawing Sheets

(51) Int. Cl.
*G06F 40/279* (2020.01)
*G06F 40/30* (2020.01)
*G10L 15/07* (2013.01)
*G10L 15/30* (2013.01)
*G06F 40/205* (2020.01)

(52) U.S. Cl.
CPC .............. *G10L 15/07* (2013.01); *G10L 15/22* (2013.01); *G10L 15/30* (2013.01); *G06F 40/205* (2020.01); *G10L 15/1822* (2013.01)

(58) Field of Classification Search
CPC ...... G06F 40/279; G06F 40/30; G06F 40/205; G06F 40/35
See application file for complete search history.

(56) References Cited

U.S. PATENT DOCUMENTS

| | | | |
|---|---|---|---|
| 10,019,434 B1 | 7/2018 | Taubman et al. | |
| 10,878,808 B1* | 12/2020 | Mathias | G10L 15/22 |
| 11,455,987 B1* | 9/2022 | Dabas | G06F 3/167 |
| 2014/0257792 A1 | 9/2014 | Gandrabur et al. | |
| 2017/0228366 A1 | 8/2017 | Bui et al. | |
| 2018/0233141 A1 | 8/2018 | Solomon et al. | |
| 2019/0080685 A1* | 3/2019 | Johnson, Jr. | G06Q 30/0256 |
| 2019/0147869 A1 | 5/2019 | Wang | |
| 2022/0382745 A1* | 12/2022 | Rodrigues | H04L 51/02 |

FOREIGN PATENT DOCUMENTS

| | | |
|---|---|---|
| CN | 107886948 A | 4/2018 |
| CN | 107943793 A | 4/2018 |
| CN | 108920497 A | 11/2018 |
| CN | 109063035 A | 12/2018 |
| CN | 109241524 A | 1/2019 |
| CN | 110111787 A | 8/2019 |

OTHER PUBLICATIONS

Dong-Mo, Z., "Language Model for Multilingual Natural Language Generation," Journal of Shanghai Jiaotong University, vol. 34, No. 7, Jul. 2000, 4 pages.

* cited by examiner

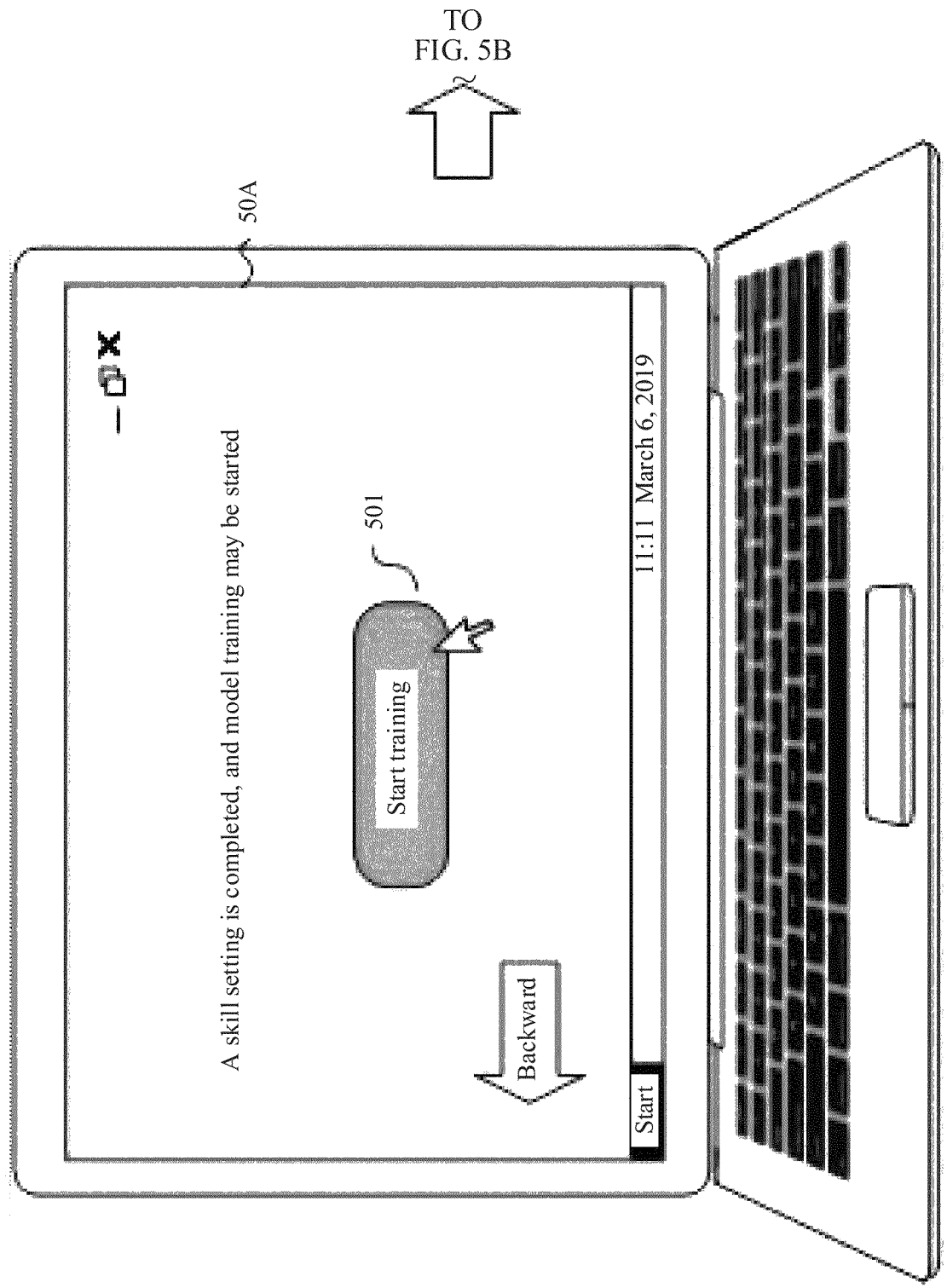

| Weather query skill Slot list | | | | | |
|---|---|---|---|---|---|
| Slot name | Slot type | Mandatory slot | Non-mandatory key slot | Non-mandatory non-key slot | Skill sharing |
| Time | sys.time | ○ | ● | ○ | Select ▶ |
| City | sys.location.city | ● | ○ | ○ 801 | Select ▶ |
| User-defined word library 1 | User-defined word library 1 | ○ | ○ | ● | Select ▶ |

FIG. 8

CONT.
FROM
FIG. 9A

| Skill "Book a ticket in Qunar.com" Slot list | | | | | Entity sharing configuration | | |
|---|---|---|---|---|---|---|---|
| Slot name | Slot type | Mandatory slot | Non-mandatory key slot | Non-mandatory non-key slot | | | |
| Time | sys.time | ○ | ● | ○ | Share an entity | Cancel sharing | ... |
| Place of departure | sys.location.city | ● | ○ | ○ | Share an entity | Cancel sharing | ... |
| Destination | sys.location.city | ● | ○ | ○ | Share an entity ⇐ 902 | Cancel sharing | ... |
| ... | | | | | | | |

FIG. 9B

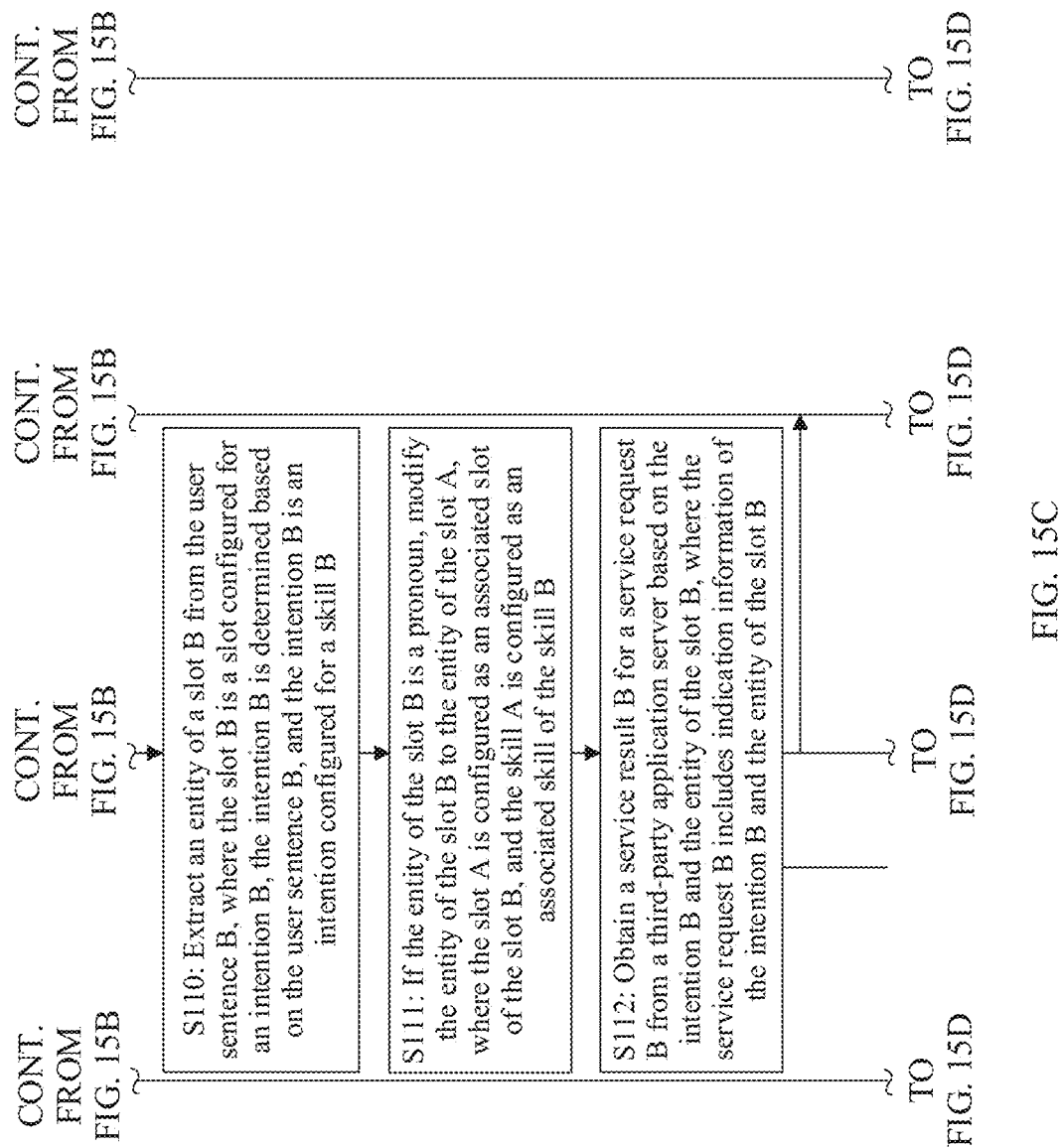

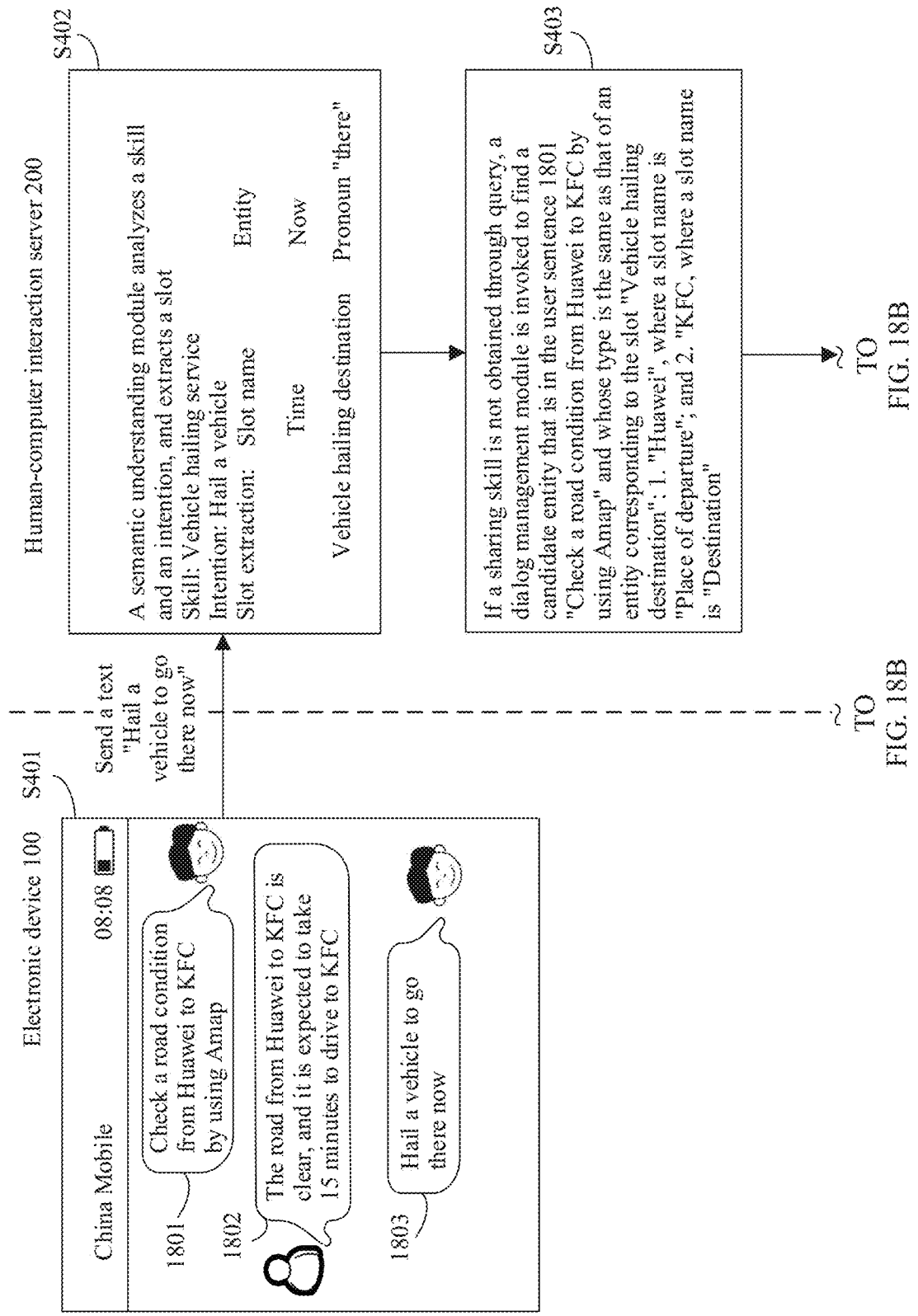

SEMANTIC PARSING METHOD AND SERVER

CROSS-REFERENCE TO RELATED APPLICATIONS

This is a U.S. National Stage of International Patent Application No. PCT/CN2020/086002 filed on Apr. 22, 2020, which claims priority to Chinese Patent Application No. 201910370839.7 filed on Apr. 30, 2019. Both of the aforementioned applications are hereby incorporated by reference in their entireties.

TECHNICAL FIELD

This application relates to the artificial intelligence field, and in particular, to a semantic parsing method and a server.

BACKGROUND

With popularization of a speech technology and prevalence of speech interaction, a voice assistant plays an increasingly important role in an intelligent electronic device such as a mobile phone. In general, the voice assistant can be divided into a speech technology and a content service. The speech technology includes technologies such as speech recognition, semantic understanding, and speech synthesis, and most mobile phone manufacturers implement these technologies by using a technology company. Most content services such as an encyclopedia search, a weather query, and information browsing are provided by a content service provider.

FIG. 1 shows an example of a dialog between an existing voice assistant and a user. As shown in FIG. 1, when the user says "What's the weather like in Beijing tomorrow", the voice assistant provides the weather in Beijing tomorrow. However, when the user says "Book an air ticket to Beijing on that day" next, the voice assistant cannot determine a specific date of "that day". The voice assistant needs to ask the user, for example, "Which day do you want to book the air ticket for?" In this case, a user operation is complex, resulting in poor user experience.

SUMMARY

Embodiments of this application provide a semantic parsing method and a server. In a semantic parsing process, the server can accurately understand a meaning of a pronoun in a user sentence without a need to ask a user for the meaning of the pronoun, thereby improving user experience.

The foregoing objective and another objective are achieved based on features in the independent claims. Further implementations are provided in the dependent claims, the specification, and the accompanying drawings.

According to a first aspect, a semantic parsing method is provided. The method may include: A first server extracts an entity of a first slot from a first user sentence. The first user sentence is a user sentence received by the first server, the first slot is a slot configured for a first intention, the first intention is an intention configured for a first skill, one or more intentions are configured for the first skill, and the first intention and the first skill are determined by the first server based on the first user sentence, and match a service requirement expressed in the first user sentence. The first server modifies the entity of the first slot to an entity of a second slot if the entity of the first slot is a pronoun. The second slot is configured as an associated slot of the first slot, the entity of the second slot is extracted by the first server from a second user sentence, the second user sentence is received by the first server before the first user sentence, the second slot is a slot configured for a second intention, the second intention is configured as an associated intention of the first intention, the second intention is an intention configured for a second skill, and the second skill is configured as an associated skill of the first skill. The first server sends a first service request to a second server, and obtains, from the second server, a first service result generated in response to the first service request. The first service request includes at least indication information of the first intention and the entity of the first slot, the second server is an application server corresponding to the first skill, and the first service result is determined by the second server based on the indication information of the first intention and the entity of the first slot. In this way, the first server can accurately understand a meaning of a pronoun in a user sentence without a need to ask a user for the mewling of the pronoun, thereby improving user experience.

With reference to the first aspect, in a possible implementation, the first server receives a first user sentence collected from an electronic device, and the first user sentence is a user sentence in an audio form or a user sentence in a text form.

Optionally, the first server receives a first user sentence sent by a speech recognition server, and the speech recognition server performs speech recognition on a user sentence that is in the audio form and that is collected by the electronic device, and then converts the user sentence into a user sentence in the text form.

With reference to the first aspect, in a possible implementation, the method further includes: The first server receives a skill association request sent by the second server. The skill association request is used to request to configure the second skill as the associated skill of the first skill, and the skill association request includes indication information of the first skill and indication information of the second skill. The first server obtains confirmation information from a third server in response to the skill association request. The third server is an application server corresponding to the second skill, and the confirmation information is used by the third server to confirm that the second skill is to be configured as the associated skill of the first skill; and the first server configures the second skill as the associated skill of the first skill based on the confirmation information. In this way, a skill developer of the first skill and a skill developer of the second skill can view slot settings of skills of each other, to perform a further association configuration.

With reference to the first aspect, in a possible implementation, the method further includes: The first server receives a slot association request sent by the second server. The slot association request is used to request to configure the second slot as the associated slot of the first slot, and the slot association request includes indication information of the first slot and indication information of the second slot. The first server configures the second slot as the associated slot of the first slot in response to the slot association request. In this way, when the entity of the first slot is a pronoun, the first server may modify the entity of the second slot to the entity of the second slot.

With reference to the first aspect, in a possible implementation, the method further includes: The first server determines whether a slot type of the first slot is the same as a slot type of the second slot; and the first server configures the second slot as the associated slot of the first slot if the slot type of the first slot is the same as the slot type of the second slot. In this way, a case in which an association between different types of slots affects semantic, parsing accuracy is avoided.

With reference to the first aspect, in a possible implementation, the method further includes: If the entity configured for the first slot comes from a system word library, the first server associates a slot name of the second slot with a slot name of the first slot. The system word library is a word library provided by the first server for all skills, the system word library makes all slots whose configured entities come from a same system word library have a same entity set, and an entity source configured for the second slot is the same as an entity source configured for the first slot. Alternatively, if the entity configured for the first slot comes from a first user-defined word library, the first server associates a slot name of the second slot with a slot name of the first slot, and the first server associates the first user-defined word library with a second user-defined word library. The first user-defined word library is an entity set configured for the first slot, the first user-defined word library is a word library created by the first server for the first skill, the first user-defined word library includes a limited quantity of words, the second user-defined word library is an entity set configured for the second slot, the second user-defined word library is a word library created by the first server for the second skill, and the second user-defined word library includes a limited quantity of words. In this way, slots whose entities come from a user-defined word library can be successfully associated.

With reference to the first aspect, in a possible implementation, the first service result is output by an electronic device, and there are at least the following output manners: The first service result is displayed on a screen of the electronic device, and the first service result is voice-broadcast by the electronic device. In this way, a terminal user can obtain a service result.

According to a second aspect, a semantic parsing method is provided. The method may include: A second server receives a first service request sent by a first server. The first service request includes indication information of a first intention and an entity of a first slot, the entity of the first slot is modified from a pronoun to an entity of a second slot if the entity that is of the first slot and that is extracted from a first user sentence is the pronoun, the second slot is configured as an associated slot of the first slot, the first user sentence is collected by an electronic device and sent to the first server, the first slot is a slot configured for the first intention, the first intention is an intention configured for a first skill, one or more intentions are configured for the first skill, the second server is an application server corresponding to the first skill, the first skill and the first intention are determined by the first server based on the first user sentence, and match a service requirement expressed in the first user sentence, a second user sentence is collected by the electronic device before the first user sentence, the second slot is a slot configured for a second intention, the second intention is an intention configured for a second skill, the second skill is configured as an associated skill of the first skill, and the second skill and the second intention are determined by the first server based on the second user sentence, and match a service requirement expressed in the second user sentence. The second server sends a first service result to the first server in response to the first service request. The first service result is determined by the second server based on the indication information of the first intention and the entity of the first slot.

With reference to the second aspect, in a possible implementation, the second server sends a skill association request to the first server. The skill association request is used to request to configure the second skill as the associated skill of the first skill, and the first request includes indication information of the first skill and indication information of the second skill. In this way, the first server may associate the first skill with the second skill.

With reference to the second aspect, in a possible implementation, the second server sends a slot association request to the first server. The slot association request is used to request to configure the second slot as the associated slot of the first slot, and the second request includes indication information of the first slot and indication information of the second slot. In this way, the first server may associate the first slot with the second slot.

According to a third aspect, a semantic parsing method is provided. The method may include: A first server extracts an entity of a first slot from a first user sentence. The first user sentence is a user sentence received by the first server, the first slot is a slot configured for a first intention, the first intention is an intention configured for a first skill, one or more intentions are configured for the first skill, and the first intention and the first skill are determined by the first server based on the first user sentence, and match a service requirement expressed in the first user sentence. If the entity of the first slot is a pronoun, the first server modifies the entity of the first slot to a first candidate entity corresponding to a first candidate sentence, where the first candidate sentence is a candidate sentence with a highest score after scores of M candidate sentences are sorted, the M candidate sentences are candidate sentences whose confidences obtained through semantic recognition are greater than a confidence threshold in K candidates, the K candidate sentences are candidate sentences obtained by respectively replacing the entity of the first slot in the first user sentence with K candidate entities, the K candidate entities are entities of a second slot that are extracted by the first server from a second user sentence, a slot type of the second slot is the same as a slot type of the first slot, the second user sentence is received by the first server before the first user sentence, $K \geq 1$, and $M \leq K$. The first server obtains a first service result for a first service request based on the first intention and the entity of the first slot. The first service request includes indication information of the first intention and the entity of the first slot. The first server returns the first service result to an electronic device. The first service result is determined by a second server based on the indication information of the first intention and the entity of the first slot, and the second server is an application server corresponding to the first skill. In this way, the first server may understand a meaning of a pronoun in a user sentence.

According to a fourth aspect, a server is further provided. The server is applied to a human-computer dialog system, including a communications interface, a memory, and a processor. The communications interface, the memory, and the processor are coupled, the memory is configured to store computer program code, the computer program code includes computer instructions, and when the processor reads the computer instructions from the memory, the server is enabled to perform any possible implementation of the first aspect, any possible implementation of the second aspect, or any possible implementation of the third aspect.

According to a fifth aspect, a computer-readable storage medium is provided, including instructions. When the instructions run on a server, the server is enabled to perform any possible implementation of the first aspect, any possible implementation of the second aspect, or any possible implementation of the third aspect.

According to a sixth aspect, a computer program product is provided. When the computer program product runs on a computer, the computer is enabled to perform any possible implementation of the first aspect, any possible implementation of the second aspect, or any possible implementation of the third aspect.

BRIEF DESCRIPTION OF DRAWINGS

To describe technical solutions in embodiments of this application more clearly, the following briefly describes accompanying drawings used in the embodiments of this application.

FIG. 5A and FIG. 5B are schematic diagrams of some electronic device interfaces in which creation of a skill is completed according to an embodiment of this application;

FIG. 7A-1 and FIG. 7A-2 and FIG. 7B-1 and FIG. 7B-2 are schematic diagrams of interaction of establishing a group of skills according to an embodiment of this application;

FIG. 8 is a schematic diagram of an electronic device interface of an inter-skill configuration according to an embodiment of this application;

FIG. 9A and FIG. 9B are schematic diagrams of some electronic device interfaces of an inter-skill configuration according to an embodiment of this application;

FIG. 12A-1 and FIG. 12A-2 and FIG. 12B-1 and FIG. 12B-2 are schematic diagrams of implementing location entity sharing in a human-computer system according to an embodiment of this application;

FIG. 14A-1 and FIG. 14A-2 and FIG. 14B-1 and FIG. 14B-2 are schematic diagrams of implementing time entity sharing in a human-computer system according to an embodiment of this application;

FIG. 15A to FIG. 15D are a schematic flowchart of a semantic parsing method according to an embodiment of this application;

FIG. 18A to FIG. 18C are a flowchart of an example application of another semantic parsing method according to an embodiment of this application;

DESCRIPTION OF EMBODIMENTS

Figure 1:
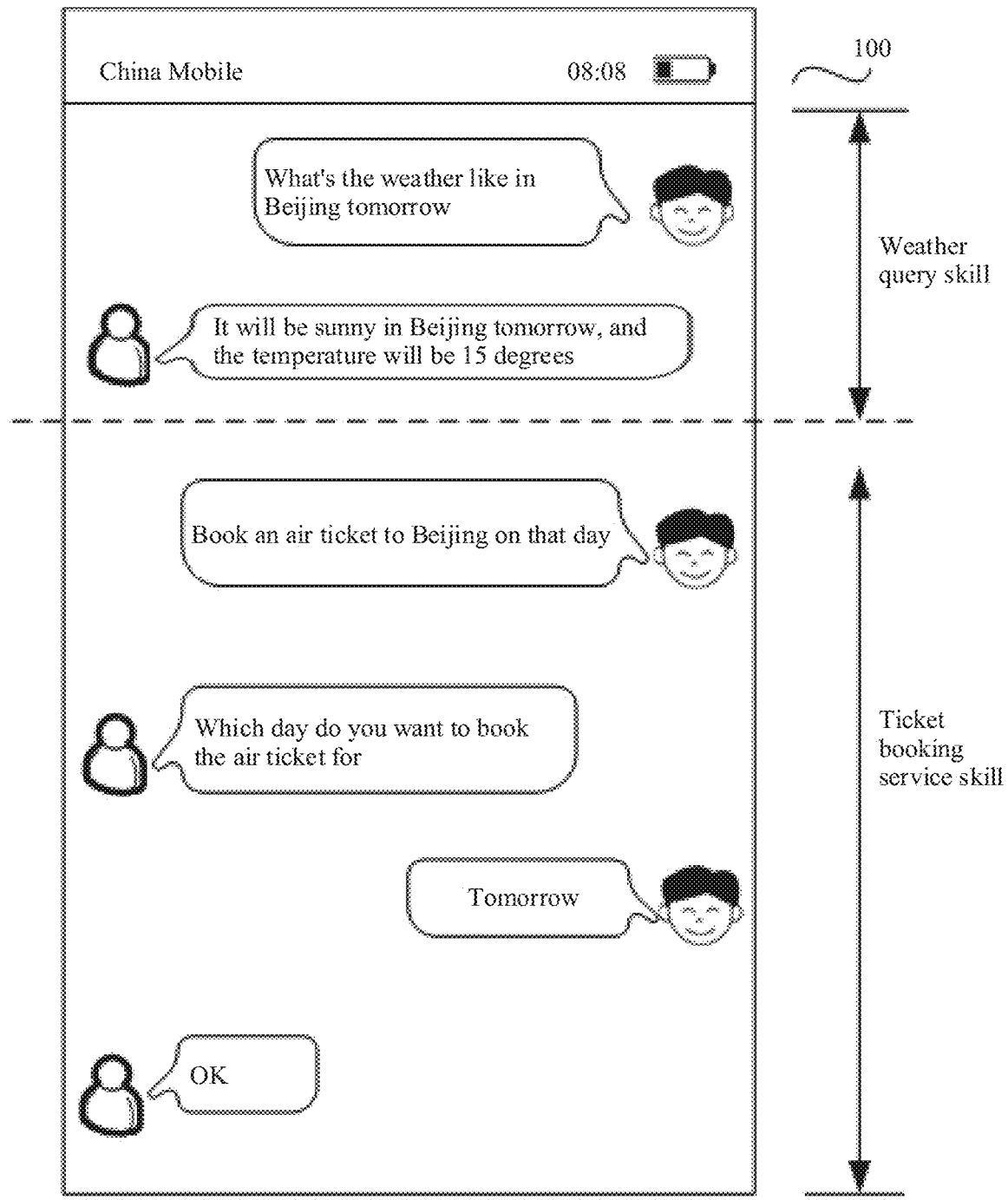
FIG. 1 is a schematic diagram of a terminal interface of a human-computer dialog in the prior art.

Terms used in the following embodiments of this application are merely for the purpose of describing specific embodiments, but are not intended to limit this application. The singular expressions "one", "one type of", "the", "the foregoing", and "this" used in this specification and the appended claims of this application are also intended to include plural forms, unless otherwise specified in the context clearly. It should also be understood that, the term "and/or" used in this application indicates and includes any one or all of possible combinations of one or more listed items.

An electronic device, a user interface used for such an electronic device, and an embodiment used for such an electronic device are described below. In some embodiments, the electronic device may be a portable electronic device that further includes another function such as a personal digital assistant function and/or a music player function, for example, a mobile phone, a tablet computer, or a wearable electronic device (for example, a smartwatch) having a wireless communication function. An example embodiment of the portable electronic device includes but is not limited to a portable electronic device provided with iOS®, Android®, Microsoft®, or another operating system. The portable electronic device may alternatively be another portable electronic device, for example, a laptop computer (Laptop) having a touch-sensitive surface or a touch panel. It should be further understood that, in some other embodiments, the electronic device may not be a portable electronic device, but is a desktop computer having a touch-sensitive surface or a touch panel.

A term "user interface (user interface, UI)" in the specification, claims, and accompanying drawings of this application is a medium interface for interaction and information exchange between a user and an application or an operating system, and implements conversion between an internal form of information and a form acceptable to the user. A user interface of the application is source code written in a specific computer language such as java or an extensible markup language (extensible markup language, XML). The source code of the interface is parsed and rendered on a terminal device, and finally is presented as user-recognizable content, for example, a control such as a picture, a text, or a button. The control (control) is also referred to as a widget (widget), and is a basic element of the user interface. Typical controls include a toolbar (toolbar), a menu bar (menu bar), a text box (text box), a button (button), a scroll bar (scroll bar), a picture, and a text. An attribute and content of the control in the interface are defined by using a tag or a node. For example, the control included in the interface is defined in the XML by using a node such as <Textview>, <ImgView>, or <VideoView>. One node corresponds to one control or attribute in the interface. After being parsed and rendered, the node is displayed as user-visible content. In addition, interfaces of many applications such as a hybrid application (hybrid application) usually further include a web page. The web page, also referred to as a page, may be understood as a special control embedded in an application interface. The web page is source code written in a particular computer language, for example, a hypertext markup language (hypertext markup language, GTML), a cascading style sheet (cascading style sheet, CSS), or a java script (JavaScript, JS). A source code of the web page may be loaded and displayed as user-recognizable content by a browser or a web page display component with a function similar to that of the browser. Specific content included in the web page is also defined by using a tag or a node in the source code of the web page. For example, an element and an attribute of the web page are defined in the GTML by using <p>, <img>, <video>, and <canvas>.

A common representation form of the user interface is a graphical user interface (graphical user interface, GUI), and is a user interface that is displayed in a graphical manner and that is related to a computer operation. An interface element may be an icon, a window, a control, or the like displayed on a display of the electronic device. Controls may include visual interface elements such as an icon, a button, a menu, a tab, a text box, a dialog box, a status bar, a navigation bar, or a widget.

Figure 2:
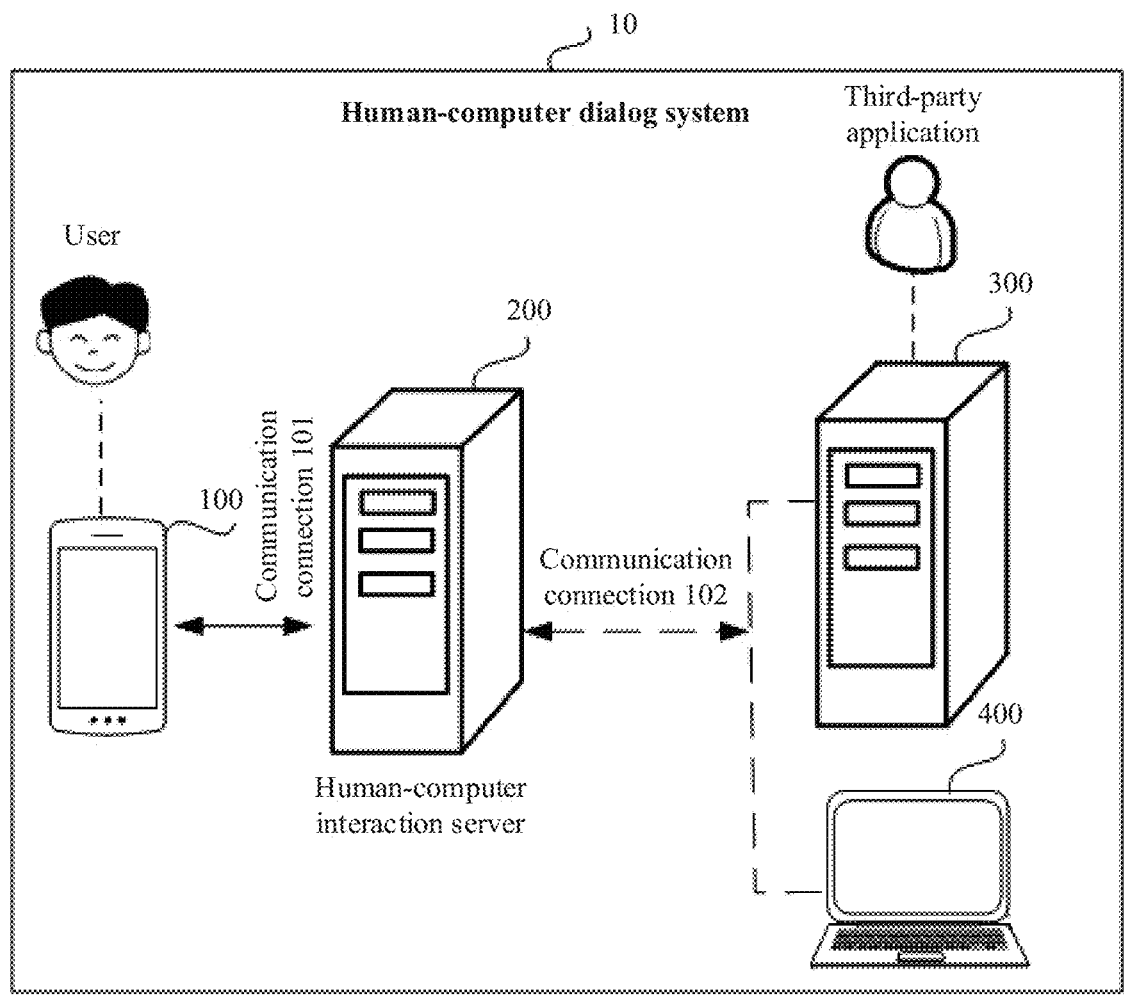
FIG. 2 is a schematic diagram 1 of composition of a human-computer dialog system according to an embodiment of this application.

FIG. 2 shows an example of a human-computer dialog system 10 according to this application. As shown in FIG. 2, the human-computer dialog system 10 may include an electronic device 100, a human-computer interaction server 200, and an application server 300 of one or more content providers. In this application, the application server of the content provider may be referred to as a third-party application server. A communication connection may be established between the electronic device 100 and the human-computer interaction server 200 by using a telecommunications network (a communications network such as 3G/4G/5G communications technology, a wireless fidelity (Wireless Fidelity, Wi-Fi) communications technology, or the like. A communication connection may be established between the human-computer interaction server 200 and the third-party application server 300 through a local area network or a wide area network.

The electronic device 100 may be configured to: collect a user sentence, and send the user sentence to the human-computer interaction server 200. The user sentence may express a service requirement of a user, for example, a weather query requirement or an air ticket booking requirement. Optionally, the electronic device 100 may convert a collected user sentence in an audio form into a user sentence in a text form, and then send the user sentence in the text form to the human-computer interaction server 200. The electronic device 100 may be further configured to receive a service result that is generated based on a user service requirement and that is fed back by the human-computer interaction server 200, for example, a weather query result or an air ticket booking result. The electronic device 100 may further feed back the received service result to the user. These functions may be completed by the electronic device 100 based on a voice assistant. The voice assistant may be installed on the electronic device 100. The voice assistant may be a speech interaction application. The voice assistant may also be referred to as a chat assistant, a chatterbot, and the like. A name of the voice assistant is not limited in this application. The user and the electronic device 100 may perform speech interaction by using the voice assistant.

Specifically, the electronic device 100 may be a mobile phone, a tablet computer, a personal computer (Personal Computer, PC), a personal digital assistant (personal digital assistant. PDA), a smartwatch, a netbook, a wearable electronic device, or an augmented reality technology (Augmented Reality, AR) device, a virtual reality (Virtual Reality, VR) device, a vehicle-mounted device, an intelligent vehicle, a smart speaker, or the like. A specific form of the electronic device 100 is not specifically limited in this application.

The human-computer interaction server 200 may be configured to receive the user sentence sent by the electronic device 100. The human-computer interaction server 200 performs semantic understanding on the user sentence, determines, through semantic understanding, a skill (for example, a skill "Query in Moji Weather") and an intention (for example, a dialog intention "Weather query") corresponding to the user sentence, and extracts, from the user sentence, an entity (for example, "Beijing") of a slot (for example, a "city slot") configured for the intention corresponding to the user sentence. Then, the human-computer interaction server 200 sends a service request to the third-party application server 300 based on the intention of the user sentence and the entity that is of the corresponding slot and that is extracted from the user sentence. The service request sent by the human-computer interaction server 200 matches a service requirement expressed in the user sentence. The service request may include indication information (for example, "Weather query") of the intention corresponding to the user sentence and the entity (for example, "tomorrow, Beijing") of the corresponding slot. For example, a weather query service request may include a time and a city that are extracted from a user sentence, and an air ticket booking service request may include a booking time, a place of departure, a destination, and the like that are extracted from a user sentence. The human-computer interaction server 200 may further receive a service result returned by the third-party application server 300, for example, a weather query result or an air ticket booking result. Finally, the human-computer interaction server 200 sends the received service result to the electronic device 100.

The third-party application server 300 may be configured to receive a service request sent by the human-computer interaction server 200. The third-party application server 300 obtains a service result (the weather in Beijing tomorrow) for the service request based on the indication information that is of the intention corresponding to the user sentence and that is included in the service request (for example, "weather query request"), for example, a weather query, and the entity (for example, "tomorrow, Beijing") extracted from the user sentence. The third-party application server 300 may return the service result for the service request to the human-computer interaction server 200.

Optionally, the human-computer interaction system 10 may further include a speech recognition server (for example, a speech recognition server of iFLYTEK and a speech recognition server of Baidu). After receiving the user sentence, the electronic device 100 sends the user sentence to the speech recognition server for speech recognition, converts the user sentence into a text, and sends the text to the human-computer interaction server 200 for semantic parsing.

Figure 3:
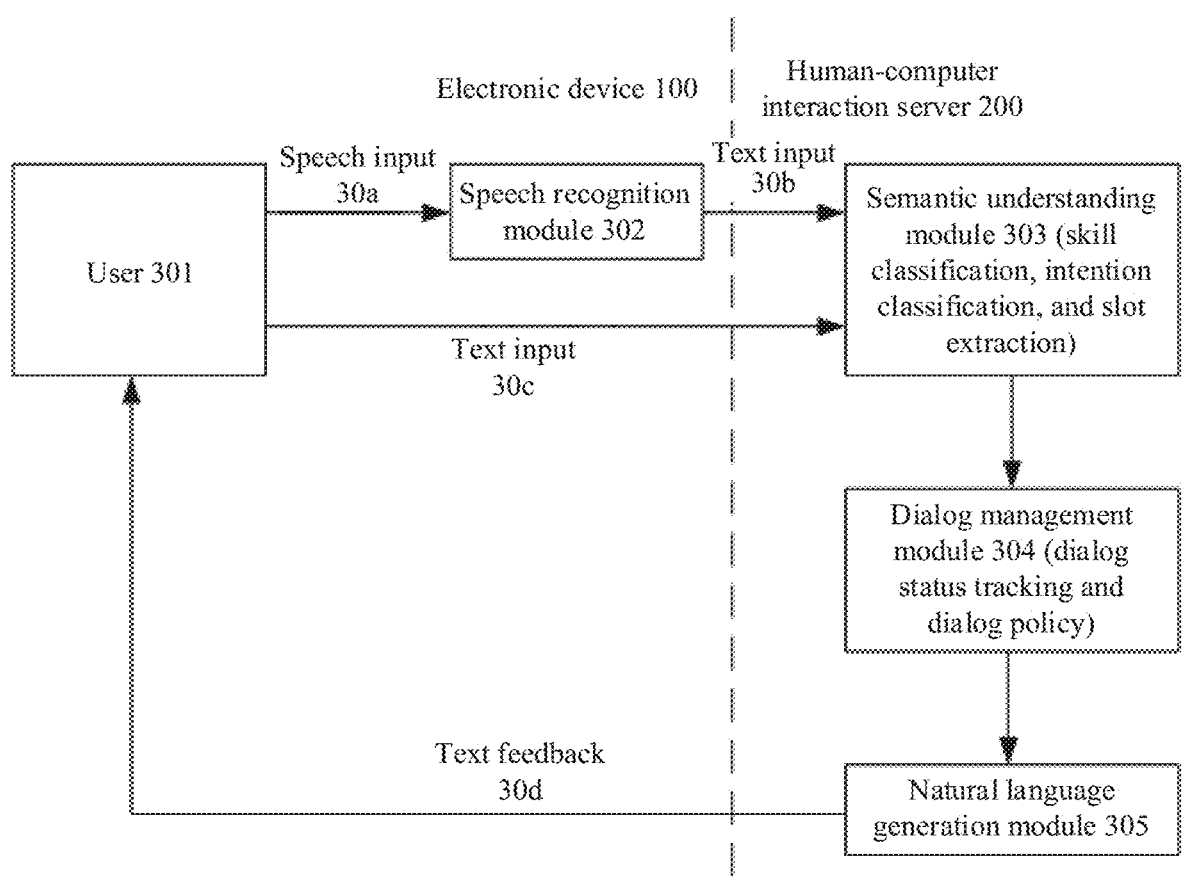
FIG. 3 is a schematic diagram 2 of composition of a human-computer dialog system according to an embodiment of this application.

Based on the human-computer dialog system 10 shown in FIG. 2, FIG. 3 shows an overall human-computer dialog procedure in this application. Details are as follows:

An electronic device 100 may collect a user sentence of a user 301. The user sentence may be referred to as a speech input 30a. The electronic device 100 may convert the speech input 30a into a text form, namely, a text input 30b by using a speech recognition module 302. Finally, the electronic device 100 may send a user sentence in an audio form, namely, the speech input 30a, to a human-computer interaction server 200. The electronic device 100 may alternatively send a user sentence in the text form, namely, the text input 30b, to a human-computer interaction server 200. Specifically, the electronic device 100 may send the text input 30b to the human-computer interaction server 200 through the communication connection 101 shown in FIG. 2.

The human-computer interaction server 200 may receive the user sentence (the speech input 30a or the text input 30b) sent by the electronic device 100. The human-computer interaction server 200 may include a speech recognition module, and the speech recognition module is configured to convert a user sentence in a speech form into a user sentence in a text form. When the user sentence is the speech input 30a, the speech recognition module in the human-computer interaction server 200 may perform speech recognition on the speech input and then convert the speech input into a text. The human-computer interaction server 200 may perform semantic understanding on the user sentence, and extract a service requirement of the user from the user sentence. Then, the human-computer interaction server 200 may further send a service request to a third-party application server 300 based on the service requirement of the user. The human-computer interaction server may further receive a service result returned by the third-party application server 300, and send the service result to the electronic device 100. The human-computer interaction server 200 may include a semantic understanding module 303, a dialog management module 304, and a natural language generation module 305.

The semantic understanding module 303 may be configured to perform semantic recognition on the user sentence (the speech input 30a in the audio form or the text input 30b in the text form). Specifically, the semantic understanding module 303 may perform a skill classification, an intention classification, and slot extraction on the user sentence (the speech input 30a in the audio form or the text input 30b in the text form). Usually, a plurality of specific skills are integrated into the human-computer interaction server 200, and each skill corresponds to a type of service or function, for example, a meal ordering service, a vehicle hailing service, or a weather query. How to create a skill is described in detail below, and details are not described herein. One or more intentions may be configured for each skill. For example, a dialog intention "Weather query" and a question and answer intention "Weather query" may be configured for a skill "Query in MO Weather". One or more slots may be configured for each intention. For example, a time slot and a city slot may be configured for the dialog intention "Weather query". An intention configuration and a slot configuration are also described in detail below, and details are not described herein.

The dialog management (Dialog Management) module 304 may be configured to: use an output of the semantic understanding module 303 as an input, and determine, based on a historical input, an operation that needs to be performed by the human-computer interaction server 200 at present. The dialog management module 304 may include two parts: status tracking and a dialog policy. The status tracking includes continuously tracking various information of a dialog, and updating a current dialog status based on an old status, a user status (information Output by a natural language understanding module 303), and a system status (to be specific, by querying a database). The dialog policy is closely related to a task scenario, and is usually used as an output of the dialog management module 303.

The natural language generation (Natural Language Generation, NLG) module 305 is configured to: generate text information based on the output of the dialog management module 304, and feed back the text information to the user. The natural language generation module 305 may generate a natural language in a manner such as a template-based manner, a syntax-based manner, or a model-based manner. The template-based manner and the syntax-based manner are mainly rule-based policies, and a long short-term memory (Long Short-Term Memory, LSTM) network, or the like may be used in the model-based manner. A specific implementation of generating the natural language is not limited in this embodiment of this application.

Some basic concepts such as the skill, the intention, and the slot that are mentioned in the foregoing content are described below.

(1) Skill

The skill may be a service or a function, for example, a weather query service or an air ticket booking service. The skill may be configured by a developer of a third-party application (for example, Moji Weather). One or more intentions may be configured for one skill. Specifically, the developer of the third-party application may log in to a skill creation page of the human-computer interaction server 200 by using an electronic device 400, to create a skill.

(2) Intention

The intention may be a more detailed service or function of a skill. Intentions may, include a dialog intention and a question and answer intention. If a parameter is required, the dialog intention needs to be used. For example, for a train ticket booking intention, parameters such as a train number and a time of departure are required, and therefore, the dialog intention needs to be used. The question and answer intention is more preferred to resolve a FAQ-type question, for example, a question of how to collect a refund fee. One or more slots may be configured for one intention.

(3) Slot

The slot is key information used to express a user intention in a user sentence. For example, if the user intention is the dialog intention "Weather query", slots that need to be extracted by the human-computer interaction server 200 from the sentence are the city slot and the time slot. The city slot is used to indicate a "place" whose weather is to be queried, and the time slot is used to indicate a "date" for which the weather is to be queried.

The slot may have attributes such as a slot name and slot type. For example, if the slot name is equivalent to a specific parameter of the slot, the slot type is a value set of the parameter, and a value in the value set represents an entity. For example, the city slot and the time slot may be extracted from a sentence "What's the weather like in Beijing tomorrow". An entity of the city slot is "Beijing", and an entity of the time slot is "tomorrow".

The slot type is used to indicate a word library (a system word library or a user-defined word library) from which an entity configured for the slot comes. For example, the entity configured for the city slot may come from the system word library (for example, a system word library of a location type), or may come from the user-defined word library (for example, a user-defined word library of a location type). The system word library is a word library provided by the human-computer interaction server 200, and may be selected for each skill, Words in the system word library cannot be enumerated. Entity sources configured for slots configured for different skills may be a same system word library. If entity sources configured for a plurality of slots are a same system word library, a same entity set is configured for the plurality of slots. The user-defined word library is a word library created by the human-computer interaction server 200 for a skill. The user-defined word library includes a limited quantity of entities. For example, if the human-computer interaction server 200 provides a user-defined word library for a skill "Moji Weather", the user-defined word library may be selected only when an entity source is configured for a slot configured for the skill "Moji Weather". The user-defined word library cannot be selected as an entity source configured for a slot of another skill.

Slots may include a mandatory slot, a non-mandatory key slot, and a non-mandatory non-key slot. The mandatory slot is a slot that needs to exist in a sentence. If a mandatory slot in a user input sentence is missing, the human-computer interaction server 200 cannot correctly understand a meaning of the user input sentence. The non-mandatory key slot may not appear in a sentence, but the human-computer interaction server 200 may fill the non-mandatory key slot with slat information based on a GPS, default information, or the like. If a non-mandatory non-key slot is missing in the user input sentence obtained by the human-computer interaction server 200, semantic understanding performed by the human-computer interaction server 200 on the user input sentence is not affected. For example, in a sentence "What's the weather like in Nanshan Science and Technology Park, Shenzhen today", a time slat corresponding to an entity "today" is a non-mandatory key slot, a city slot corresponding to an entity "Shenzhen" is a mandatory slot, and a location slot corresponding to an entity "Nanshan Science and Technology Park" is a non-mandatory non-key slot.

In this application, a skill that is of the human-computer interaction server 200 and that can be used to provide a service matching a service requirement expressed in a first user sentence is referred to as a first skill. An intention that is configured for the first skill and that matches the service requirement expressed in the first user sentence is referred to as a first intention, and a first slot is configured for the first intention. An entity that is of the first slot and that is extracted by the human-computer interaction server 200 from the first user sentence may express key information of the service requirement expressed in the first user sentence. Only after receiving indication information of the first intention and the entity of the first slot, an application server corresponding to the first skill can provide a service corresponding to the service requirement expressed in the first user sentence. For example, the first user sentence is "Query the weather in Beijing today". The service requirement expressed in the first user sentence is to query the weather. In this case, the skill "Query in Moji Weather" that is of the human-computer interaction server 200 and that matches the service requirement is referred to as the first skill. A dialog intention "Weather query" configured for the first skill is the first intention. A city slot or a time slot configured for the first intention is configured is the first slot.

A user interface that may be used for a configuration operation such as creating a skill, creating an intention, training a human-computer dialog model is further described below 1. Create a Skill.

Figure 4A:
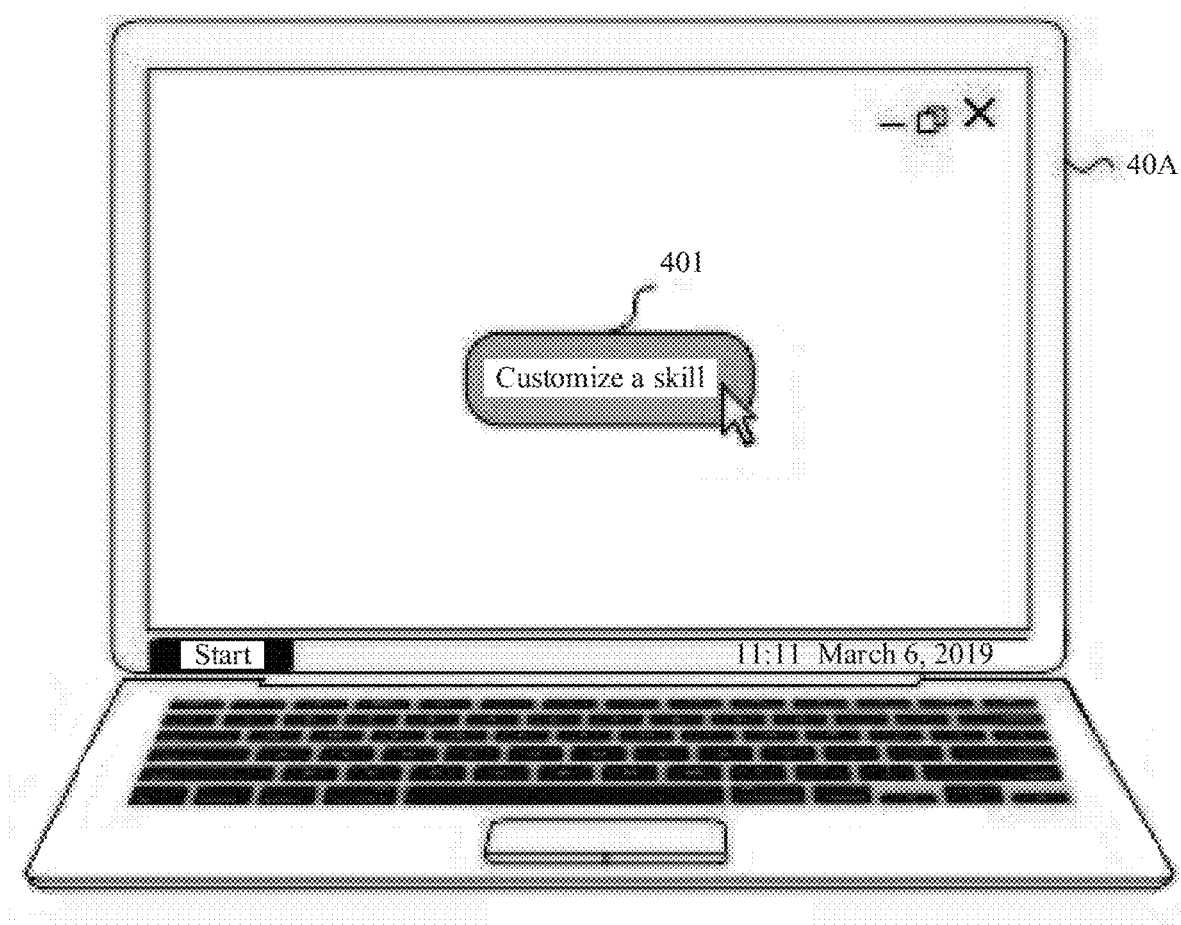
FIG. 4A to FIG. 4D are schematic diagrams of some electronic device interfaces in which a skill is created according to an embodiment of this application.

FIG. 4A shows an example of a user interface 40A that is displayed by the electronic device 400 and that may be used to create a skill. As shown in FIG. 4A, a control 401 ("Create a skill") may be displayed in the user interface 40A. The electronic device 400 may detect a selection operation acting on the control 401. The selection operation may be a mouse operation (for example, a mouse click operation) performed on the control 401, may be a touch operation (for example, a finger tap operation) performed on the control 401, or the like. In response to the selection operation, the electronic device 400 may refresh the user interface 40A.

Figure 4B:
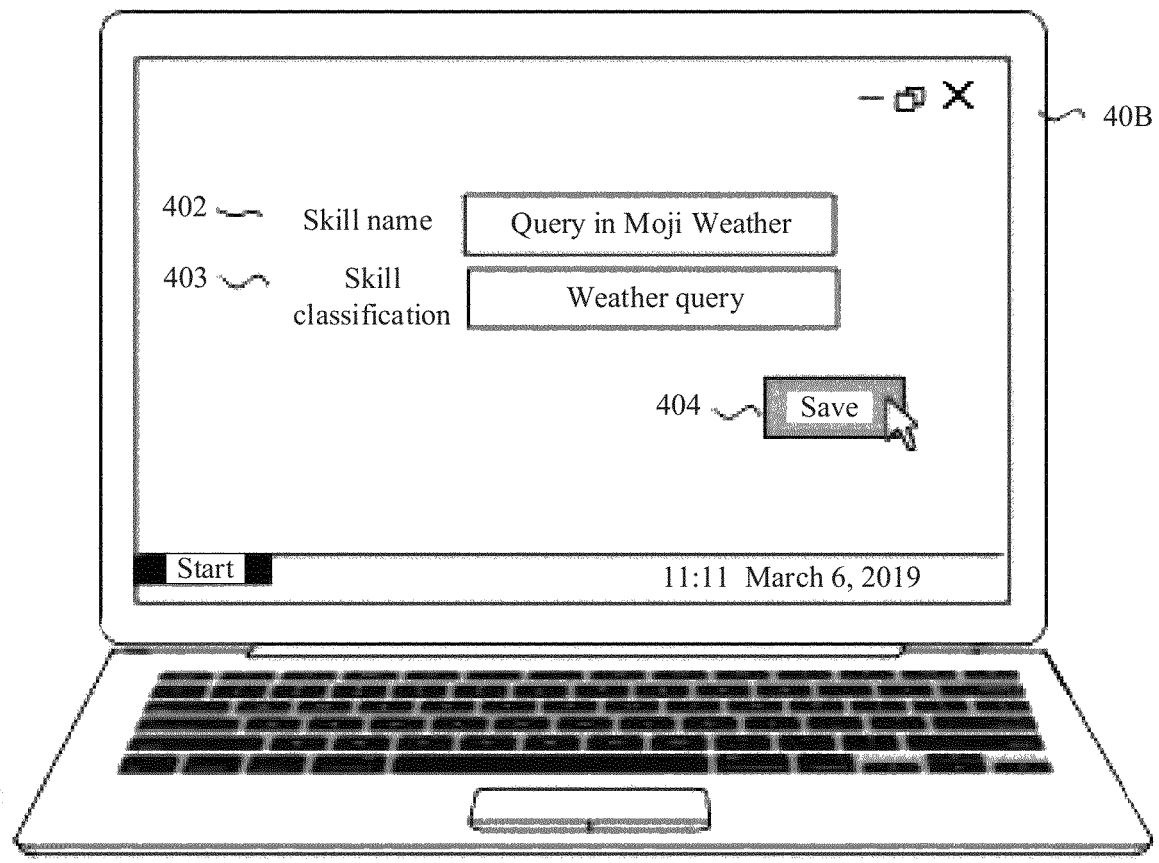

As shown in FIG. 4B, the refreshed user interface 40A may include a control 402 and a control 403. The control 402 may be used by the user (for example, a developer of Moji Weather) to enter a skill name, and the control 403 may be used by the user (for example, the developer of Moji Weather) to enter a skill classification. For example, as shown in FIG. 4B, the user may set the skill name to "Query in Moji Weather" by using the control 402, and may set the skill classification to "Weather query" by using the control 403.

As shown in FIG. 4B, the refreshed user interface 40A may further include a control 404 ("Save"). The electronic device 400 may detect a selection operation acting on the control 404. The selection operation may be a mouse operation (for example, a mouse click operation) performed on the control 404, may be a touch operation (for example, a finger tap operation) performed on the control 404, or the like. In response to the selection operation, the electronic device 400 may create a skill based on the skill name and the skill classification that are set by the user.

2. Create an Intention, and Set a Slot Associated with the Intention.

Figure 4C:
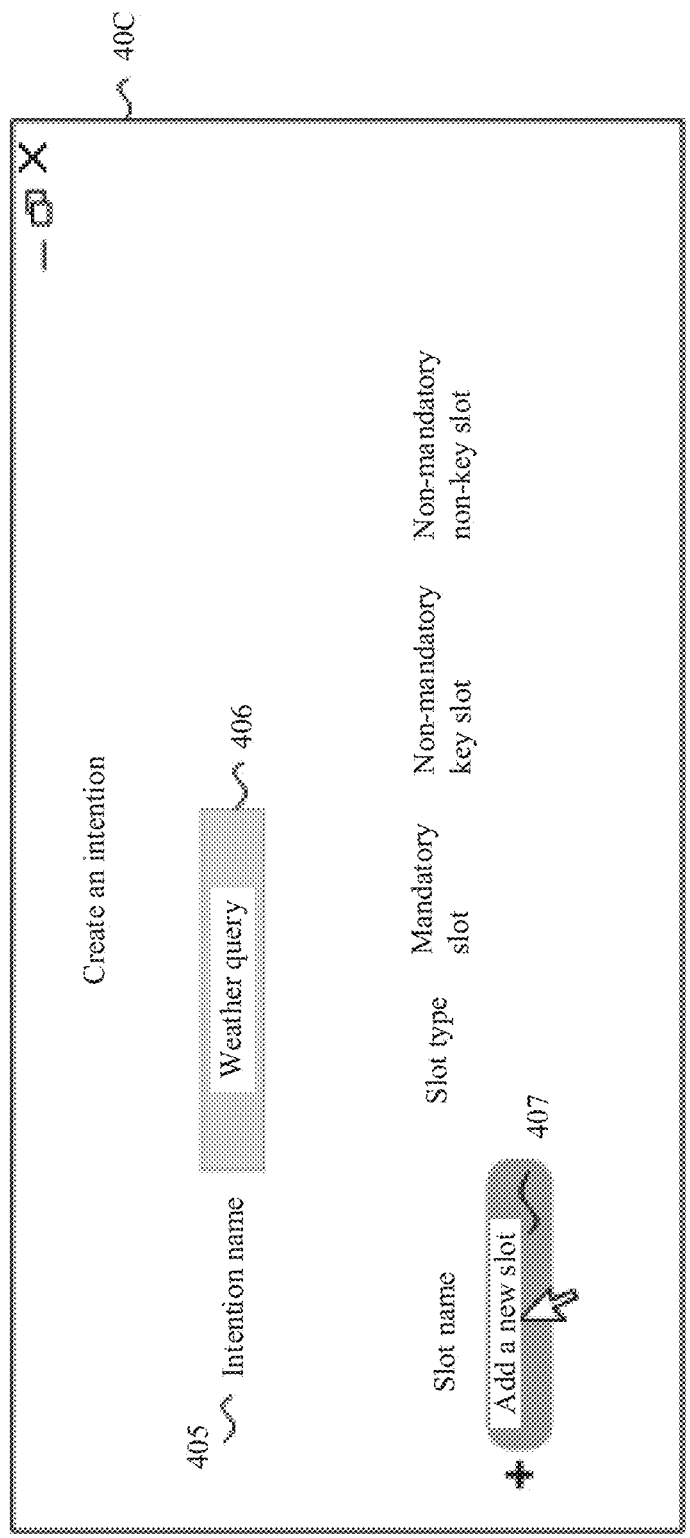

FIG. 4C shows an example of a user interface 40C that is displayed by the electronic device 400 and that may be used to create an intention and set a slot associated with the intention. As shown in FIG. 4C, a control 405, a control 406, and a control 407 may be displayed in the user interface 40C. The control 405 may be used by the user (for example, the developer of Moji Weather) to enter an intention name. The control 406 is used to display the intention name (for example, "Weather query") entered by the user (for example, the developer of Moji Weather). The control 407 may be used (for example, the developer of Moji Weather) to add a new slot. The electronic device 400 of the user may detect a selection operation acting on the control 407. The selection operation may be a mouse operation (for example, a mouse click operation) performed on the control 407, may be a touch operation (for example, a finger tap operation) performed on the control 407, or the like. In response to the selection operation, the electronic device 400 may refresh the user interface 40C.

Figure 4D:
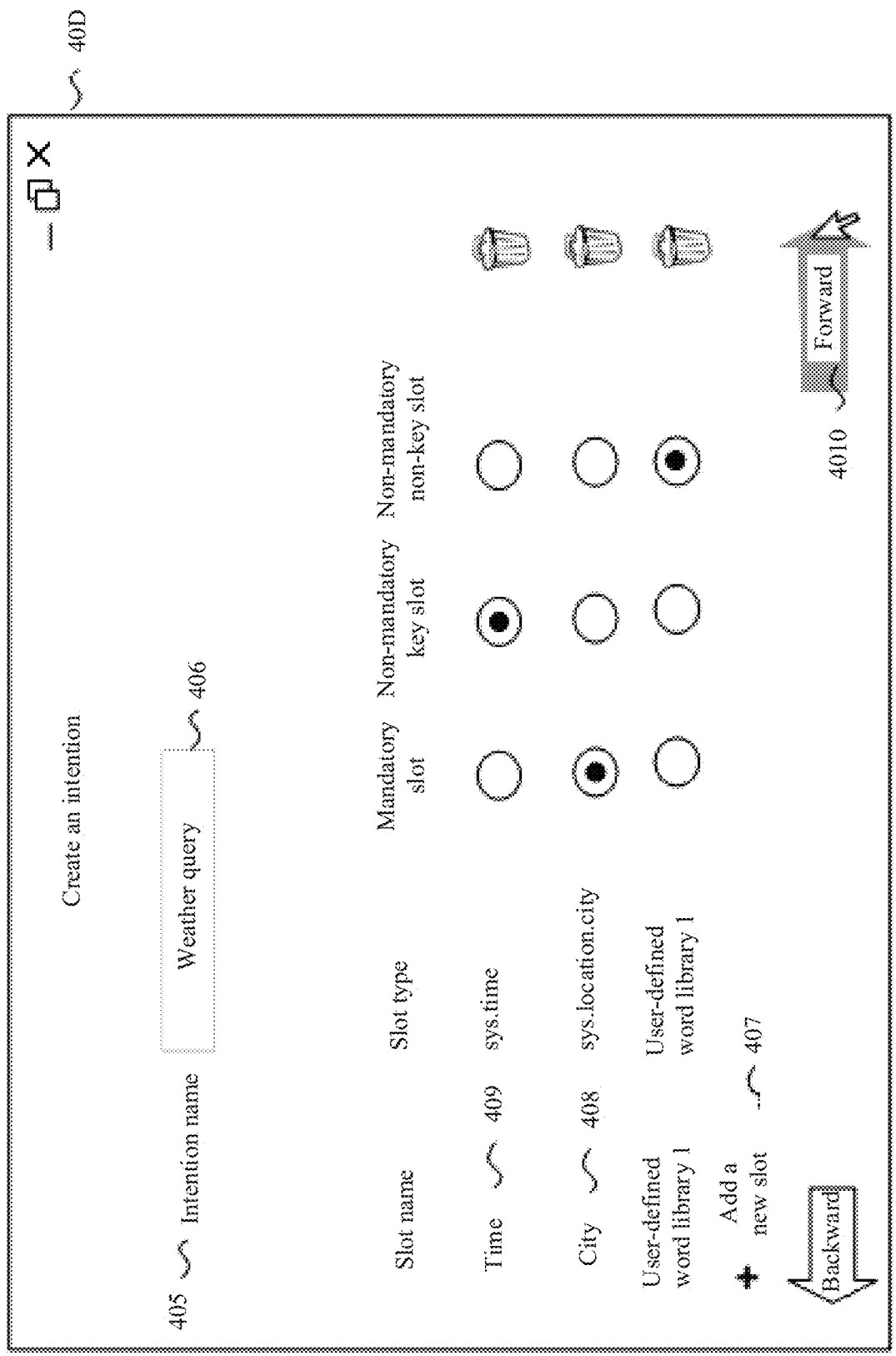

As shown in FIG. 4D, the refreshed user interface 40C may include controls: a control 408, a control 409, and a control 4010. The control 408 may be used by the user (for example, the developer of Moji Weather) to set the city slot of the intention "Weather query". That an entity source that corresponds to a slot type corresponding to the city slot is a system word library sys.location.city and an attribute of the city slot is a mandatory slot may be displayed in the interface 40D. The control 409 may be used by the user (for example, the developer of MO Weather) to set the time slot of the intention "Weather query". That an entity source that corresponds to a slot type corresponding to the time slot is a system word library sys.time and an attribute of the time slot is a non-mandatory key slot may be displayed in the interface 40D. In this embodiment of this application, entity sources corresponding to the slot type are mainly a system word library and a user-defined word library (which may also be referred to as a user dictionary). The system word library is a word library that is preset by the human-computer interaction server 200, and entities in the system word library cannot be enumerated. For example, the system word library may be sys.time, sys.location.city, sys.name, sys, and phoneNum. The user-defined word library is a word library defined by a skill developer. The user-defined word library includes a limited quantity of words.

3. Train a Human-Computer Dialog Model

FIG. 5A shows an example of a user interface 50A that is displayed by the electronic device 400 and that may be used to train a human-computer dialog model. As shown in FIG. 5A, a control 501 ("Start training") may be displayed in the user interface 50A. The electronic device 400 may detect a selection operation acting on the control 501. The selection operation may be a mouse operation (for example, a mouse click operation) performed on the control 501, may be a touch operation (for example, a finger tap operation) performed on the control 501, or the like. In response to the selection operation, the electronic device 400 may refresh the user interface 50A.

A human-computer dialog model that is of a new skill (for example, the skill "Query in Moji Weather") and that is trained by the human-computer interaction server 200 may perform a skill classification, an intent classification, and slot extraction on the user input sentence. For example, it is assumed that the human-computer interaction server 200 trains a human-computer dialog model of the skill "Query in Moji Weather". In this case, the human-computer dialog model can recognize that a skill corresponding to the user input sentence (for example, "What's the weather like in Beijing tomorrow") is "Query in Moji Weather", a corresponding intention is a dialog intention "weather query", and an extracted city slot corresponds to an entity (Beijing) and an extracted time slot corresponds to an entity (tomorrow).

Figure 5B:
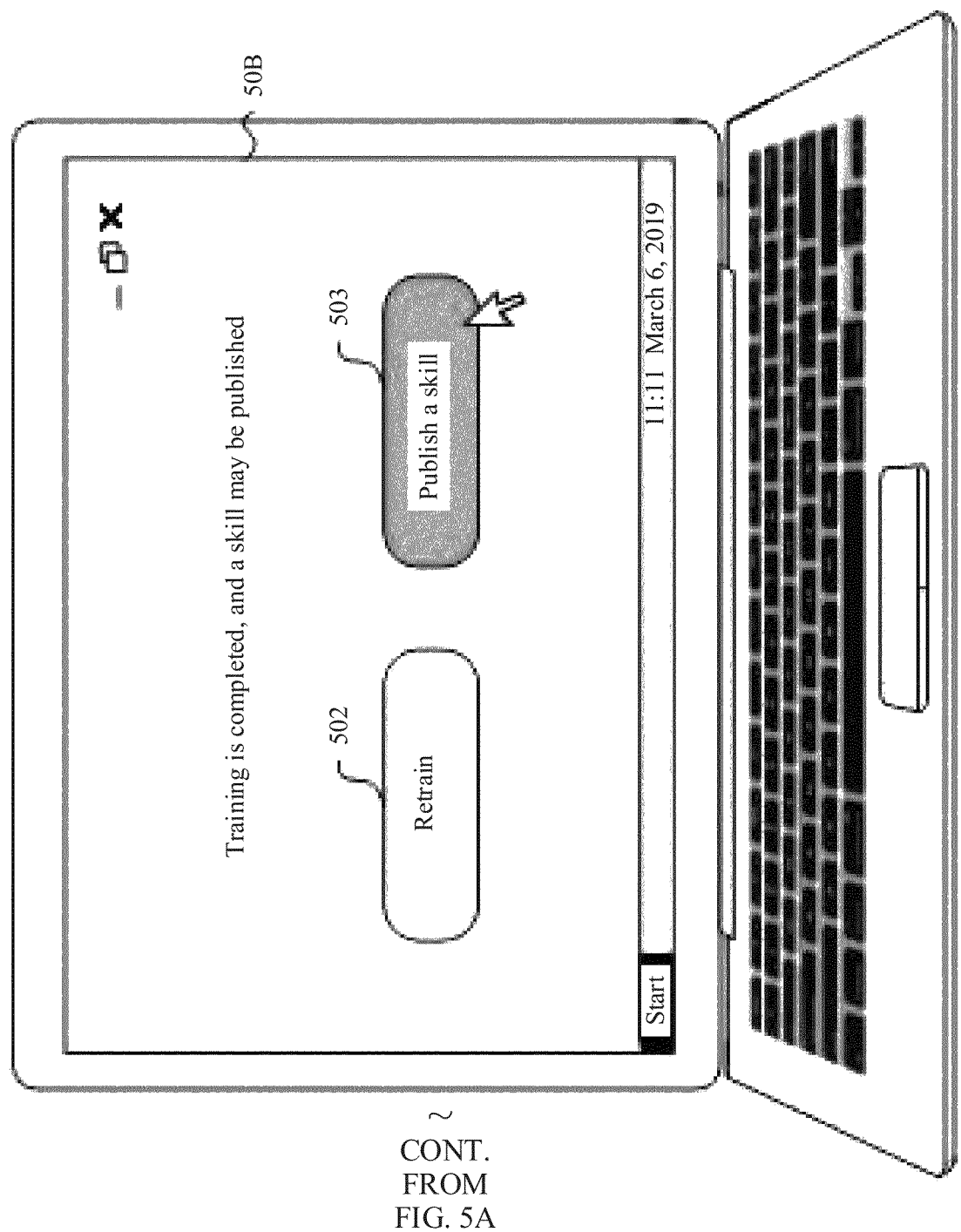

As shown in FIG. 5B, the refreshed user interface 50A may include a control 502 and a control 503. The control 502 may be configured to retrain the human-computer dialog model. The control 503 ("Publish a skill") may be configured to publish a created skill (for example, a weather query skill).

By performing a series of configuration operations such as creating a skill, creating an intention, and training a human-computer dialog model, a voice assistant may perform speech interaction with the user, recognize a service requirement of the user, and feed back a service result to the user.

However, an existing voice assistant cannot determine a specific meaning of a pronoun in a user sentence. After recognizing a skill and an intention that correspond to the user sentence, the human-computer interaction server 200 may further determine, from the user sentence, an entity corresponding to a slot associated with the intention. If the entity corresponding to the slot is a pronoun, the existing human-computer interaction server 200 cannot determine a specific meaning of the pronoun.

For example, when the user says "Query the weather in Beijing tomorrow", the existing voice assistant may recognize that a skill corresponding to this user sentence is the skill "Query in Moji Weather", and may further recognize that an intention corresponding to this user sentence is the dialog intention "Weather query". In addition, the existing voice assistant may further determine, from this user sentence, an entity corresponding to a slot (for example, a time slot or a city slot) associated with the dialog intention "Weather query". Specifically, an entity corresponding to the time slot is tomorrow; and an entity corresponding to the city slot is Beijing.

When the user says "Book an air ticket for me to go to Beijing on that day" next, the existing voice assistant may recognize that a skill corresponding to this user sentence is an air ticket booking skill, and may further recognize that an intention corresponding to this user sentence is a dialog intention "Book an air ticket". The existing voice assistant may further determine, from this user sentence, an entity corresponding to a slot (for example, a time slot, a place of departure slot, or a destination slot) associated with the dialog intention "Book an air ticket". Specifically, an entity corresponding to the time slot is a pronoun "that day", an entity corresponding to the place of departure slot is a current location of the user, and an entity corresponding to the destination slot is Beijing. The electronic device 100 may determine a place of departure by using a positioning technology (for example, GPS positioning), and notify the human-computer interaction server 200 of the place of departure.

Because the entity corresponding to the time slot is the pronoun "that day", the existing voice assistant cannot determine a specific meaning of the pronoun "that day", and cannot accurately determine a service requirement of the user.

To resolve a problem existing in the existing voice assistant, the following embodiments of this application provide a human-computer interaction method, to determine a meaning of a pronoun in a human-computer dialog, for example, a specific meaning of a pronoun such as "here" or "that day". Therefore, efficiency in using an electronic device by a user in a speech interaction process can be improved, and user experience can be improved.

In this application, a human-computer interaction server 200 may establish a group of different skills, and then configure a skill 1 (for example, a skill "Moji Weather") in the skills in the established group as an associated skill of a skill 2 (for example, a skill "Qunar.com"). When the human-computer interaction server 200 detects that a service requirement of a user is switched from the skill 1 to the skill 2, and there is a pronoun in a user input sentence corresponding to the skill 2, the skill 1 is configured as the associated skill of skill 2, and then the human-computer interaction server 200 determines a meaning of the pronoun by obtaining an entity of the associated skill of the skill 2, namely, the skill 1. How to establish a group of skills and how to perform an entity sharing configuration on the skills after the group is established are described in detail below, and details are not described herein.

A service requirement expressed in a user sentence A (for example, "What's the weather like in Beijing tomorrow") that is sent by an electronic device 100 and that is first received by the human-computer interaction server 200 corresponds to a skill A (for example, the skill "Query in Moji Weather"). A service requirement expressed in a user sentence B (for example, "What's the weather like there next week") that is sent by the electronic device 100 and that is subsequently received by the human-computer interaction server 200 also corresponds to the skill A. There is a pronoun in the user sentence B that is subsequently received by the human-computer interaction server 200. A same intention of a same skill is associated with a same slot. For example, a voice assistant in the electronic device 100 first collects the user sentence A "What's the weather like in Beijing tomorrow" and returns a weather query result to the user. Then, the voice assistant in the electronic device 100 subsequently collects the user sentence B "What's the weather like there next week". The user sentence A and the user sentence B correspond to a same skill, to be specific, the skill "Query in Moji Weather". The user sentence A and the user sentence B correspond to a same intention, to be specific, a dialog intention "Weather query". Therefore, slots that need to be extracted by the human-computer interaction server 200 from the user sentence A and the user sentence B are also the same, and slots that need to be extracted by the human-computer interaction server 200 are a time slot and a city slot. When an entity corresponding to a city slot extracted by the human-computer interaction server 200 from the user sentence B "What's the weather like there next week" is a pronoun "there". The human-computer interaction server 200 directly replaces "there" with an entity "Beijing" corresponding to a city slot extracted from the user sentence A. Therefore, a meaning of the pronoun is determined.

The following describes in detail a case of establishing a group of skills and configuring skill sharing.

1. Establish a Group of Skills

Establishing a group of skills may be establishing a mapping relationship between one skill and another skill in the human-computer interaction server 200. For example, the human-computer interaction server 200 establishes a mapping relationship between the skill "Moji Weather" and the skill "Qunar.com". After the human-computer interaction server 200 stores the established mapping relationship between the two skills, the human-computer interaction server 200 allows the two skills to view slot settings of each other.

FIG. 6A to FIG. 6D show an example of a user interface in which the electronic device 400 establishes a group of skills. Details are described below.

Figure 6A:
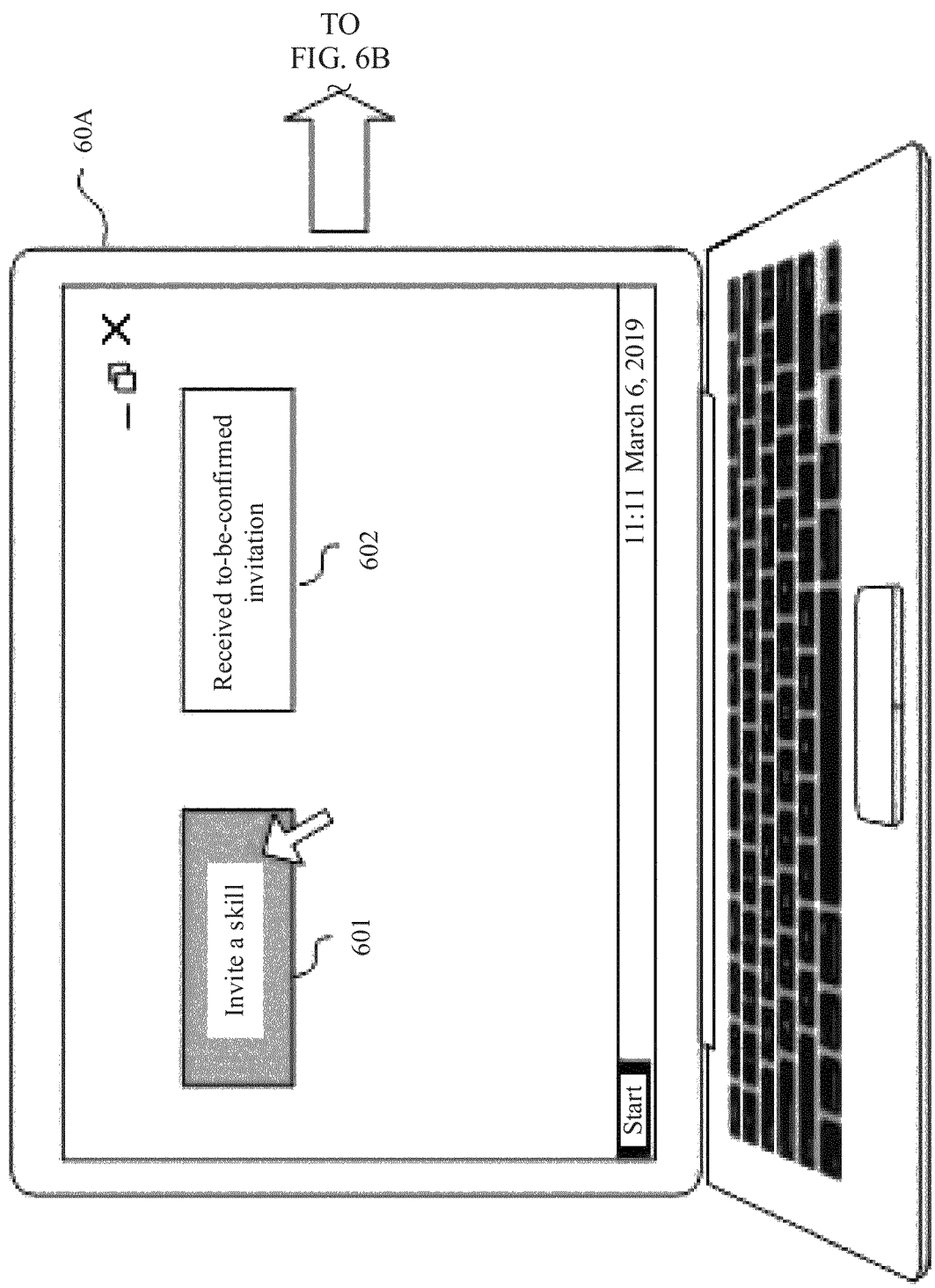
FIG. 6A to FIG. 6D are schematic diagrams of some electronic device interfaces in which a group of skills is established according to an embodiment of this application.

As shown in FIG. 6A, a user interface 60A may include a control 601 ("Invite a skill") and a control 602 ("Received to-be-confirmed invitation"). The electronic device 400 may detect a selection operation acting on the control 601. The selection operation may be a mouse operation (for example, a mouse click operation) performed on the control 601, may be a touch operation (for example, a finger tap operation) performed on the control 601, or the like. In response to the selection operation, the electronic device 400 may refresh the user interface 60A.

Figure 6B:
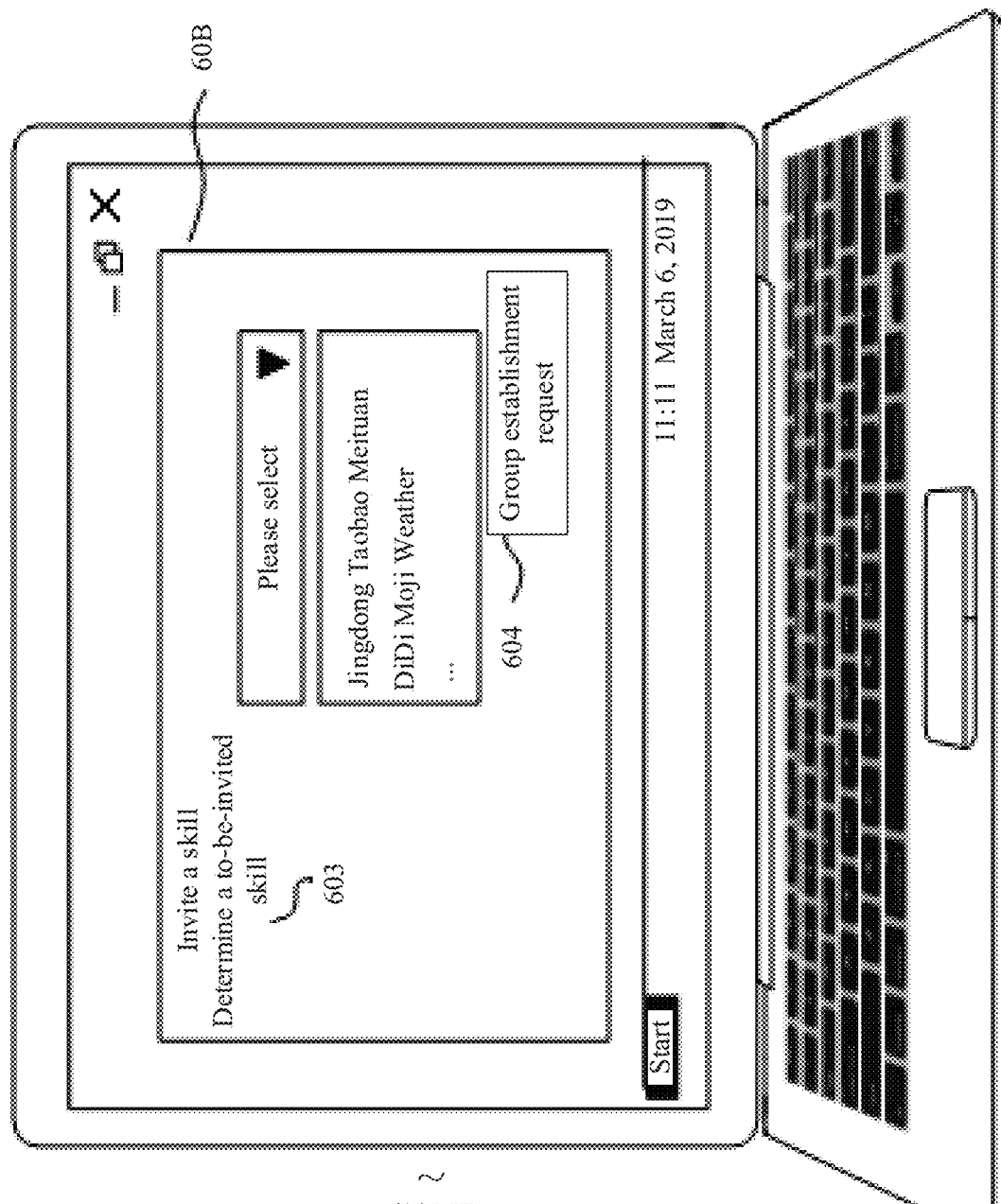

As shown in FIG. 6B, a user interface 60B obtained through refreshing may include a control 603 and a control 604. The control 603 may be used by the user (for example, a developer of Moji Weather) to select a skill to which a group establishment invitation is to be sent. The control 604 may be used by the user (for example, the developer of Moji Weather) to send a group establishment request to the human-computer interaction server 200.

Figure 6C:
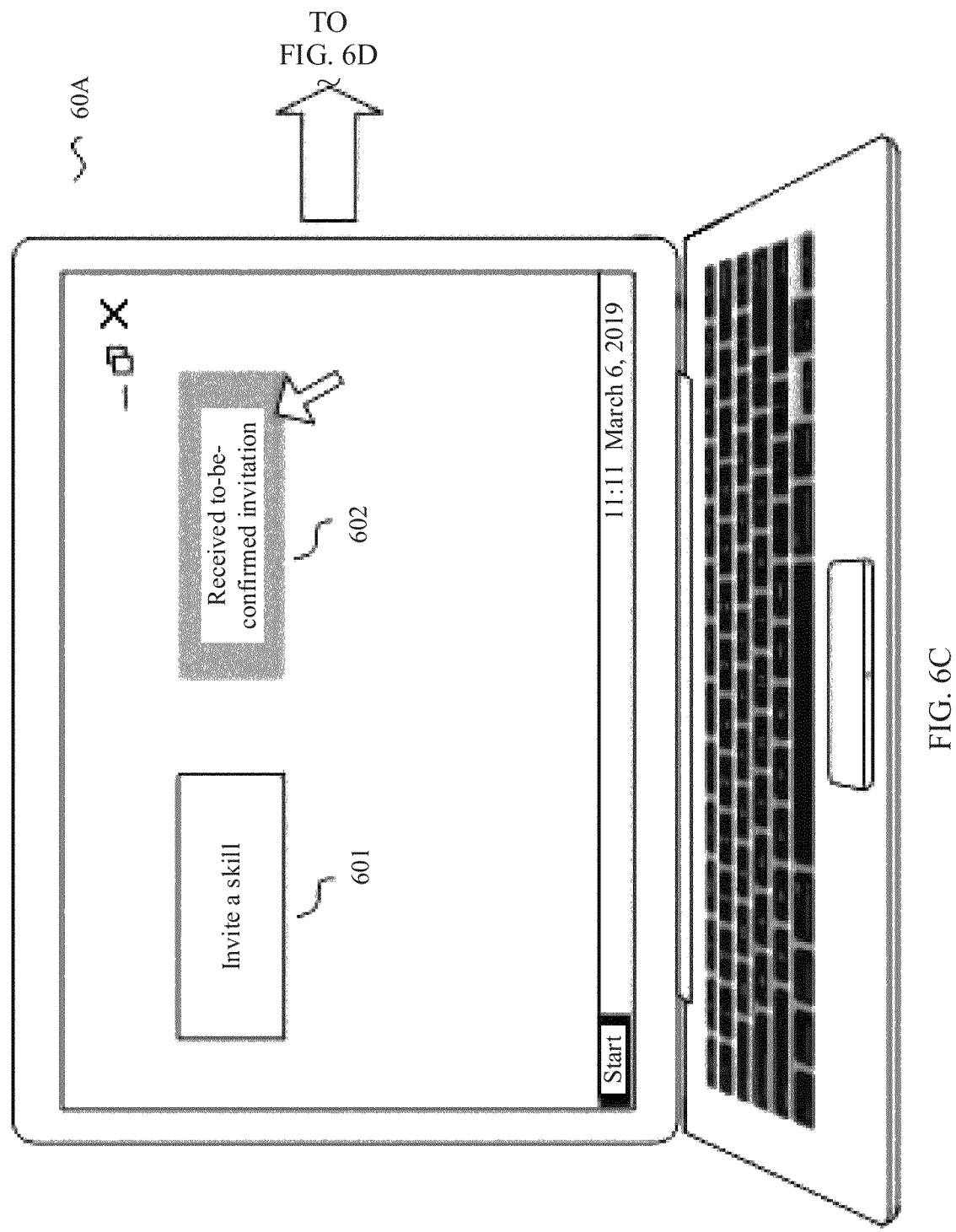

As shown in FIG. 6C, the electronic device 400 may detect a selection operation acting on the control 602. The selection operation may be an operation (for example, a mouse click operation) performed on the control 602, may be a touch operation (for example, a finger tap operation) performed on the control 602, or the like. In response to the selection operation, the electronic device 400 may refresh the user interface 60A.

Figure 6D:
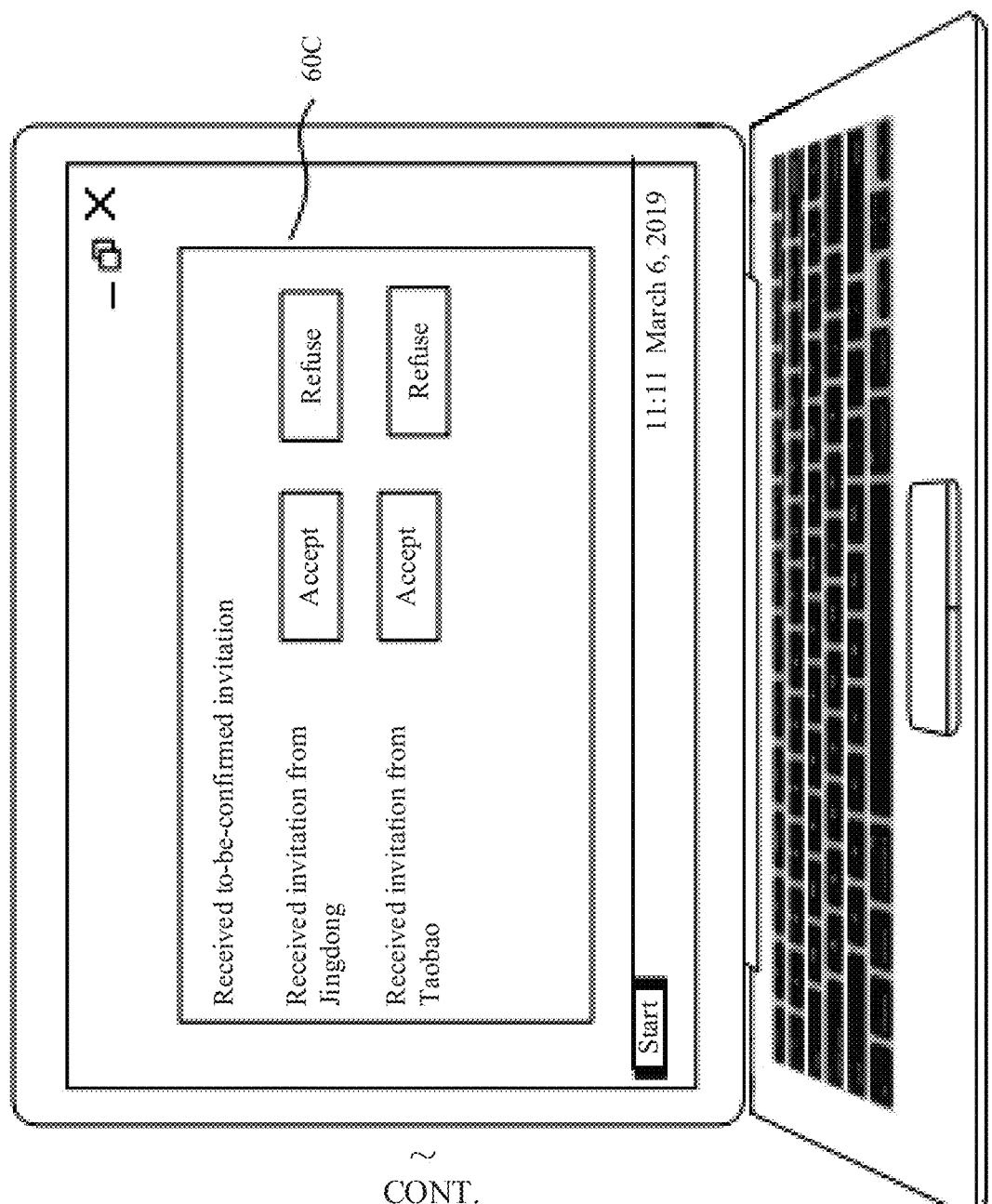

The refreshed user interface 60A may be shown in FIG. 6D, and the electronic device 400 may display a specific skill from which a group establishment invitation is received. For example, as shown in FIG. 6D, the electronic device 400 may display "Received invitation from Jingdong" and "Received invitation from Taobao" of the user.

FIG. 7A-1 and FIG. 7A-2 and FIG. 7B-1 and FIG. 7B-2 show an example of an interaction process of establishing a group of two skills. The process is described in detail below.

Figures 1, 7A:
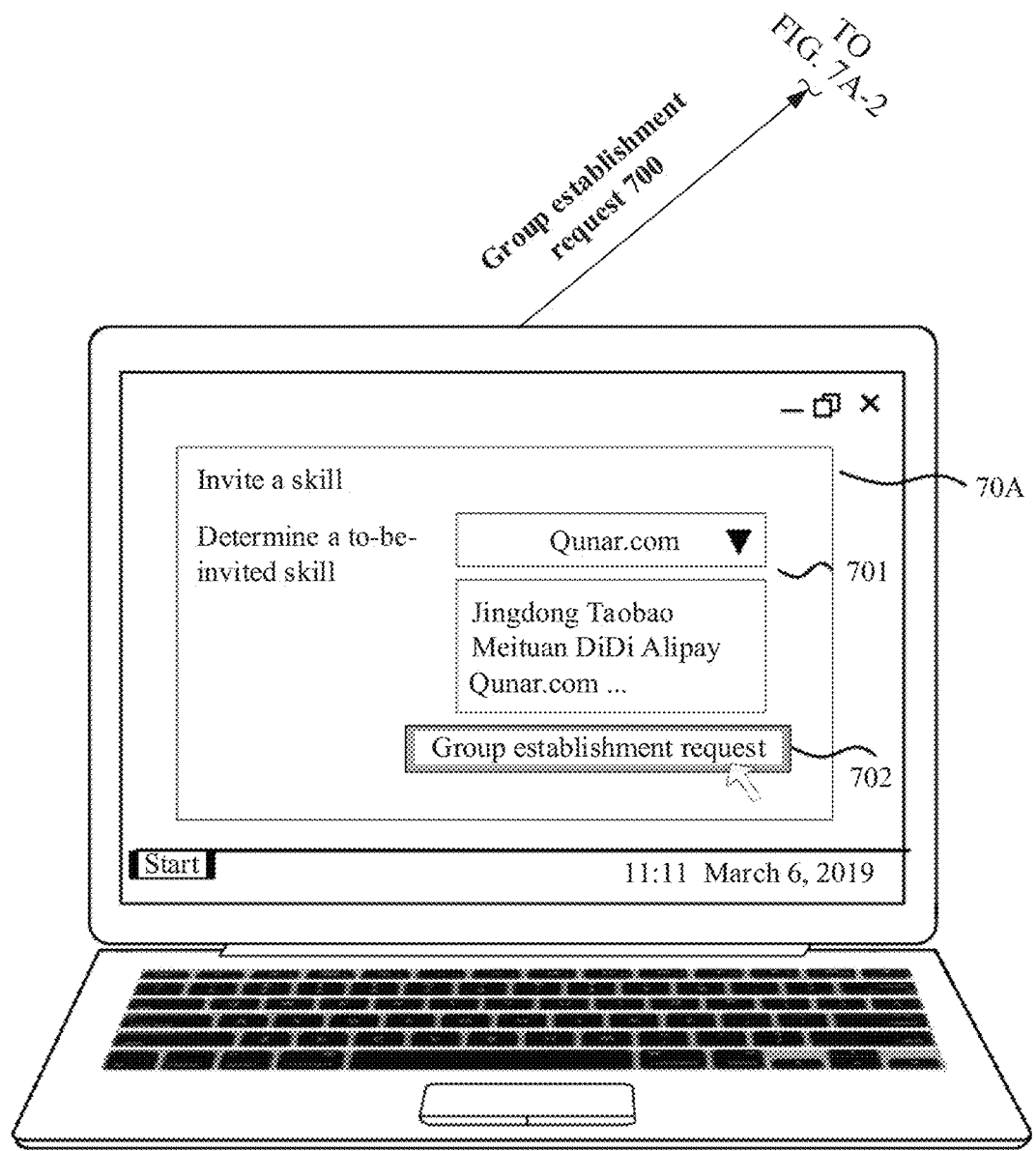
Figures 2, 7A:
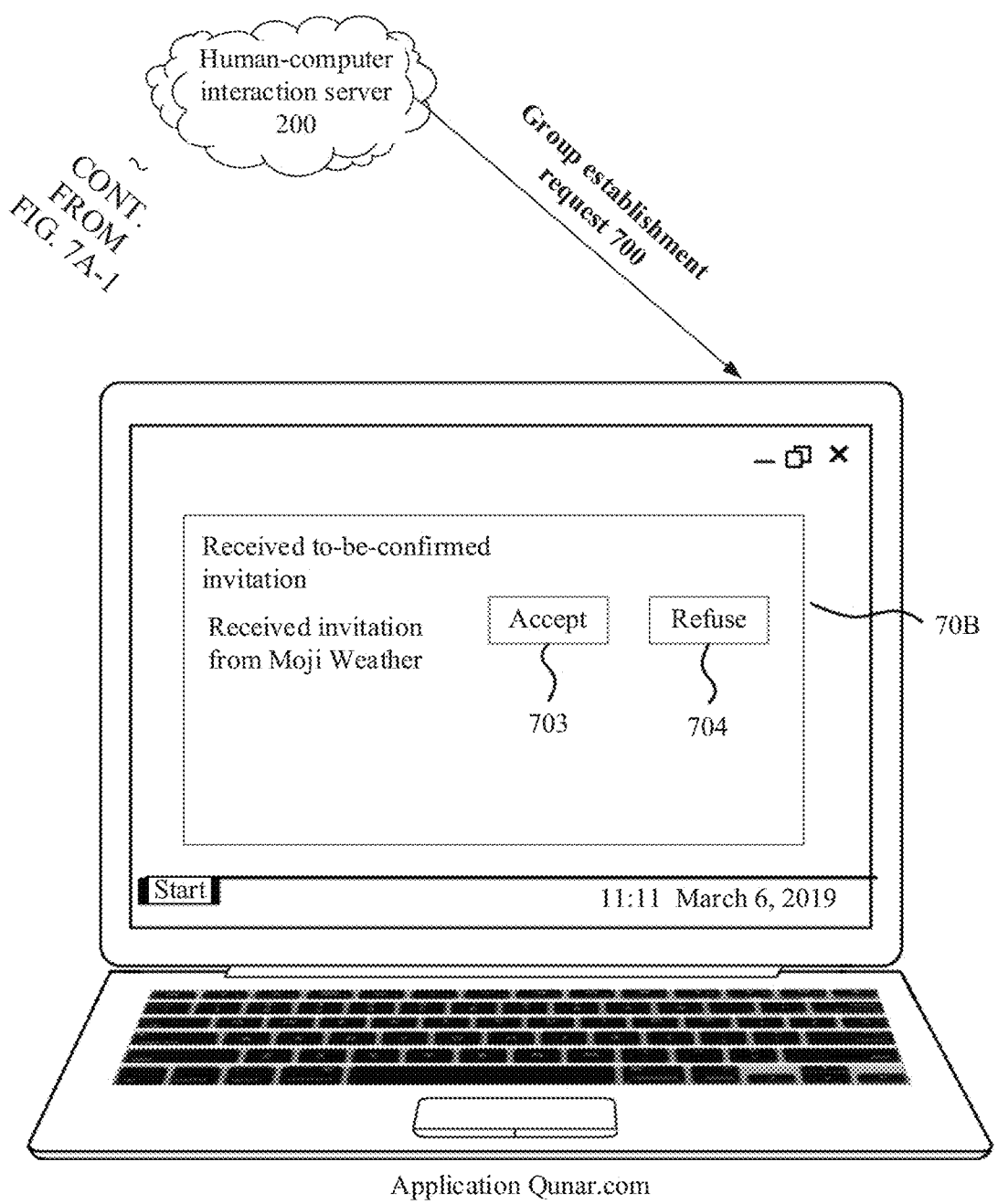

FIG. 7A-1 and FIG. 7A-2 show an example of a process in which an application Moji Weather sends a group establishment invitation to an application Qunar.com. An interface 70A is a user interface that is displayed by the electronic device 400 and in which the application Moji Weather initiates skill group establishment. The interface 70A may include a control 701 and a control 702. The control 701 may be used by the developer of Moji Weather to determine a to-be-invited skill. For example, as shown in FIG. 7A-1, the developer of the application Moji Weather determines, by using the control 702, that the to-be-invited skill is the skill "Qunar.com". The control 702 may be used by the developer of the application Moji Weather to send a skill invitation to the human-computer interaction server 200. Specifically, the human-computer interaction server 200 may receive, through the communication connection 102 shown in FIG. 2, a group establishment request 700 sent by the application Moji Weather. Then, the human-computer interaction server 200 sends the group establishment request 700 to the application Qunar.com through the communication connection 102. The electronic device 400 may display an interface 70B in which the application Qunar.com receives the group establishment request. The interface 70B may include a control 703 and a control 704. The control 703 may be used by a developer of the application Qunar.com to accept the group establishment invitation from the application Moji Weather. The control 703 may be used by the developer of the application Qunar.com to refuse the group establishment invitation from the application Moji Weather. That the electronic device detects a selection operation acting on the control 703 is used as an example for description below.

Figures 1, 7B:
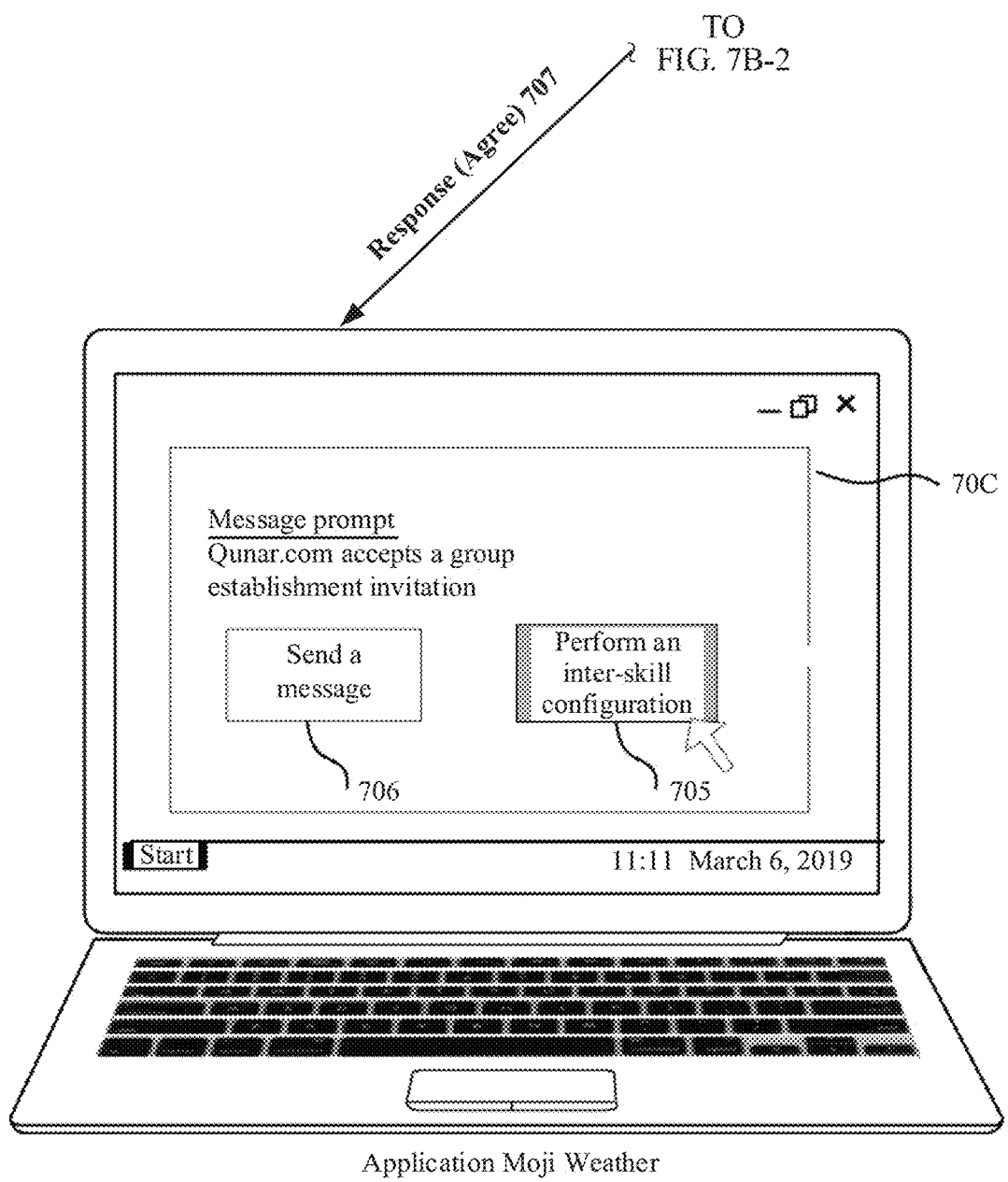
Figures 2, 7B:
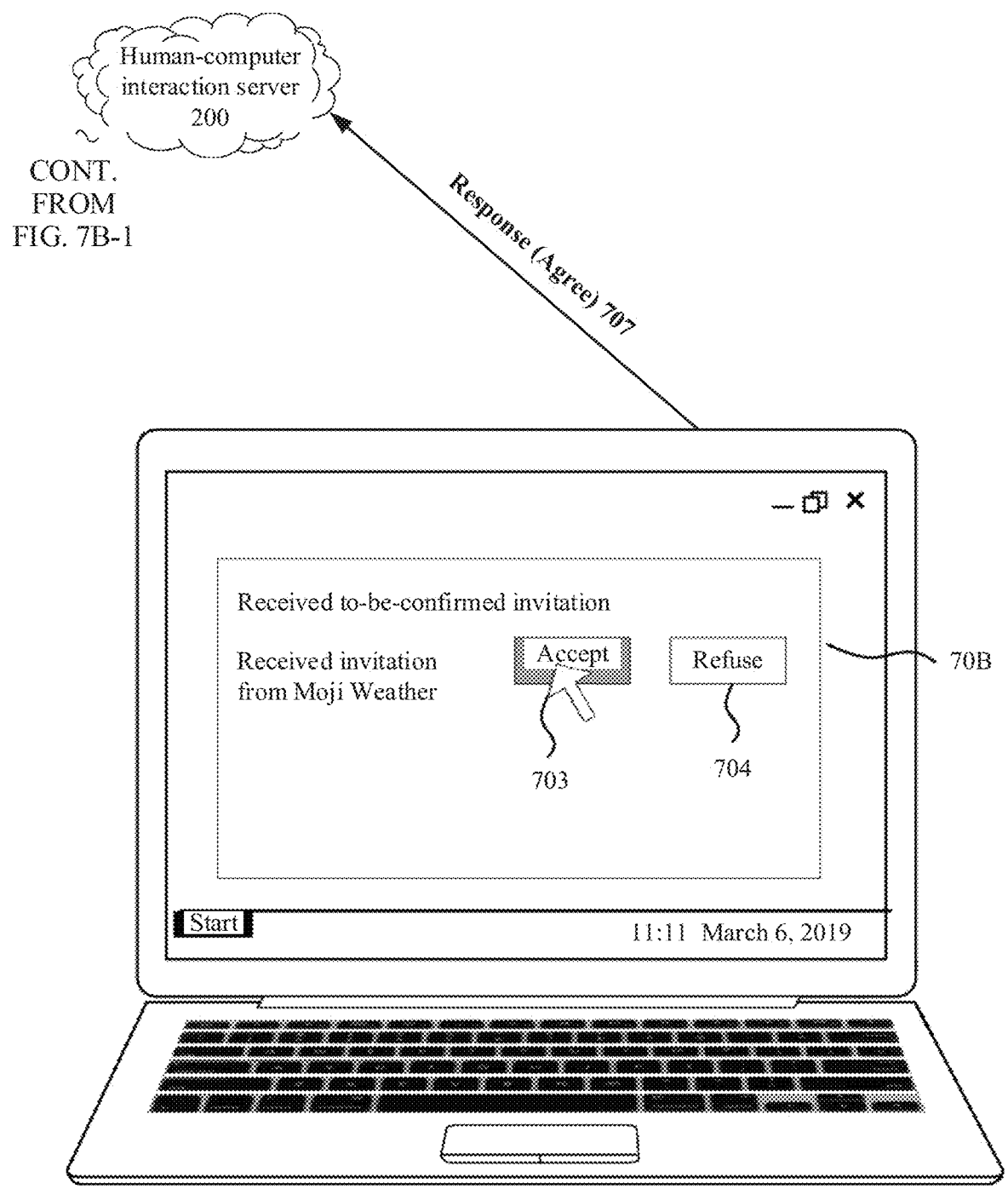

FIG. 7B-1 and FIG. 7B-2 show an example of a process in which an application Qunar.com responds to a group establishment invitation from an application Moji Weather. The electronic device 400 detects the selection operation performed on the control 703 in the interface 70B. The selection operation may be a mouse operation (for example, a mouse click operation) performed on the control 501, may be a touch operation (for example, a finger tap operation) performed on the control 703, or the like. In response to the selection operation, the electronic device 400 may send a group establishment agreement response 707 to the human-computer interaction server 200. Specifically, the human-computer interaction server 200 receives, through the communication connection 102 shown in FIG. 2, the group establishment agreement response 707 sent by Qunar.com. Then, the human-computer interaction server 200 sends the group establishment agreement response 707 to the application Moji Weather through the communication connection 102.

After a group of Moji Weather and Qunar.com is successfully established in the human-computer interaction server 200, the human-computer interaction server 200 may generate the mapping relationship between Moji Weather and Qunar.com. Then, the human-computer interaction server 200 may store the mapping relationship between Moji Weather and Qunar.com.

The electronic device 400 may display an interface 70C in which the application Moji Weather receives the group establishment agreement response. The interface 80C may include a control 705 and a control 706. The control 705 may be used by the developer of the application Moji Weather to perform an inter-skill configuration. The control 706 may be used by the developer of the application Moji Weather to open a chat window, to send a message to the skill "Qunar.com".

In this embodiment of this application, that the group of the skill "Moji Weather" and the skill "Qunar.com" is established used as an example. A group of other skills, a group of one skill and a plurality of skills, a group of a plurality of skill components, or the like may be established. This does not constitute a limitation herein.

2. Configure Entity Sharing

Configuring entity sharing is to configure a case in which one skill (for example, the skill "Query in Moji Weather") and another skill (for example, the skill "Qunar.com") share an entity. Sharing an entity may mean that when there is a pronoun in a user sentence A corresponding to a skill (for example, the skill "Query in Moji Weather"), the human-computer interaction server 200 replaces the pronoun in the user sentence A with an entity of a slot configured for an associated intention of another skill (for example, the skill "Qunar.com") associated with the skill "Moji Weather".

Figure 9A:
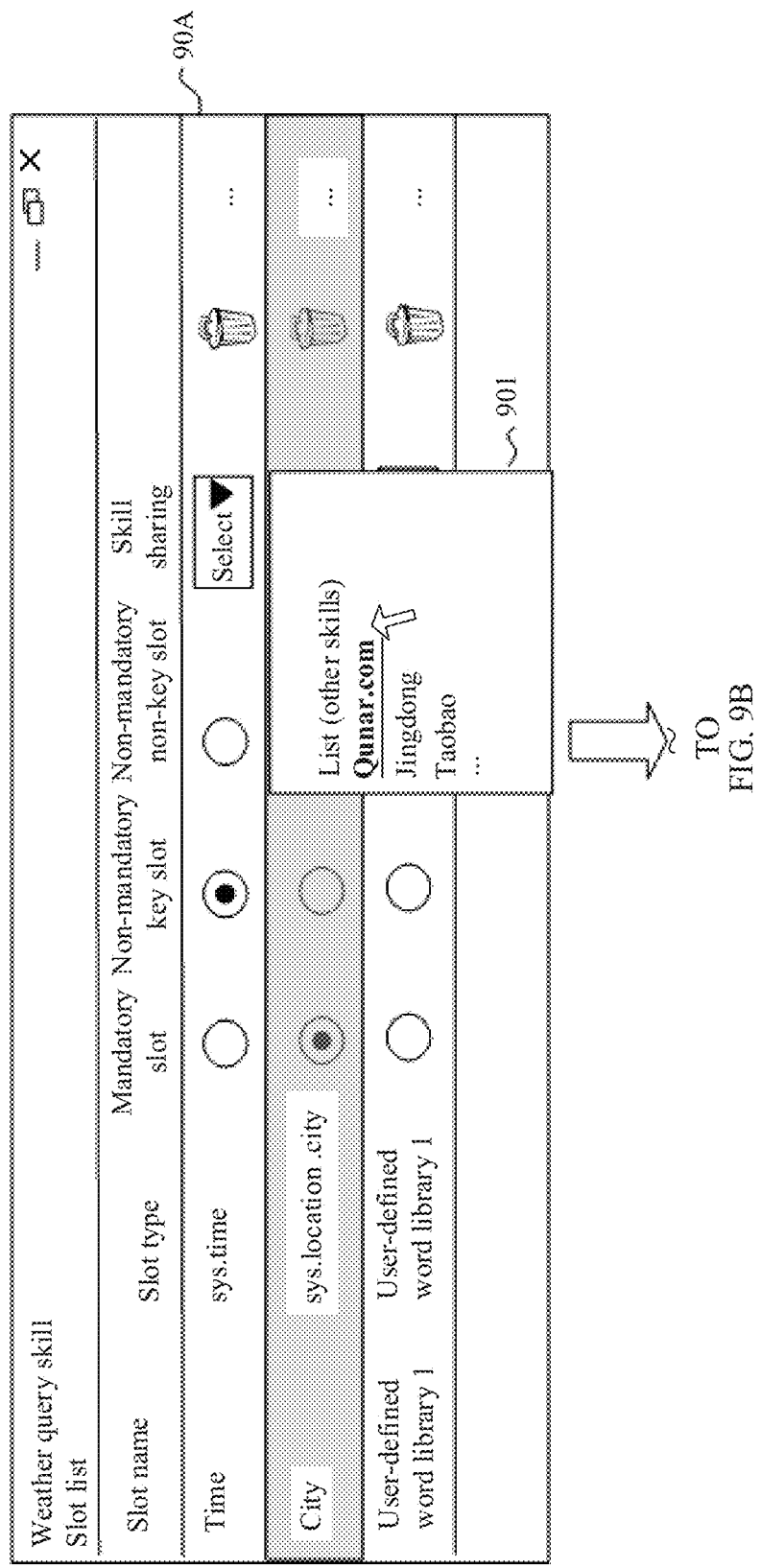
Figure 10:
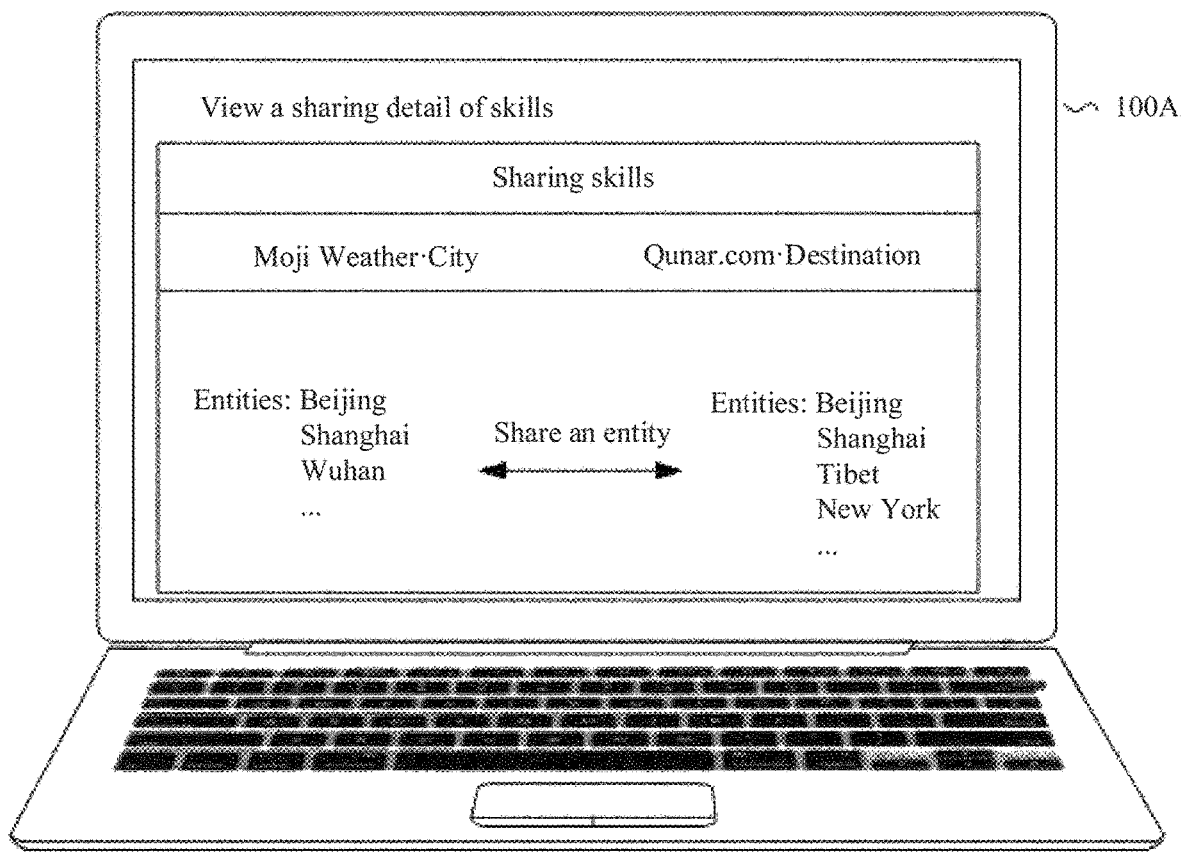
FIG. 10 is a schematic diagram of an electronic device interface in which a sharing skill is viewed according to an embodiment of this application.

FIG. 8 to FIG. 10 show an example of a process of configuring entity sharing for a skill "Moji Weather" and a skill "Qunar.com".

FIG. 8 shows an example of a user interface 80A that is displayed by the electronic device 400 and that is used to configure entity sharing for "Weather query". As shown in FIG. 8, the user interface 80A may display a control 801. The control 801 may be used by the user (for example, the developer of the application "Moji Weather") to display a skill that may be selected and on which a skill sharing configuration can be performed. The electronic device 400 may detect a selection operation acting on the control 801. The selection operation may be a mouse operation (for example, a mouse click operation) performed on the control 801, may be a touch operation (for example, a finger tap operation) performed on the control 801, or the like. In response to the selection operation, the electronic device 400 may refresh the user interface 80A.

As shown in FIG. 9A, the refreshed user interface 80A may be a user interface 90A. The user interface 90A may display a control 901. The control 901 may be used to select a skill that is in a skill list and on which a skill sharing configuration needs to be performed. For example, as shown in the user interface 90A, the user may select the skill "Qunar.com" by using the control 901, to perform the skill sharing configuration. The electronic device 400 may detect a selection operation acting on the control 901. The selection operation may be a mouse operation (for example, a mouse click operation) performed on the control 901, may be a touch operation (for example, a finger tap operation) performed on the control 901, or the like. In response to the selection operation, the electronic device 400 may refresh the user interface 90A.

As shown in the user interface 90B, the refreshed user interface 90A may display a control 902 ("Share an entity"). The electronic device 400 may detect a selection operation acting on the control 902. The selection operation may be a mouse operation (for example, a mouse click operation) performed on the control 902, may be a touch operation (for example, a finger tap operation) performed on the control 902, or the like. In response to the selection operation, the human-computer interaction server 200 may configure a case in which a "city slot" of the skill "Weather query" and a "destination slot" of the skill "Book a ticket in Qunar.com" share an entity. The human-computer interaction server 200 configures the "destination slot" as an associated slot of the "city slot". Specifically, when an entity source configured for the "city slot" is a system word library (for example, sys.location.city), an entity source configured for the "destination slot" is also the system word library (for example, sys.location.city). The human-computer interaction server 200 associates a slot name of the "city slot" with a slot name of the "destination slot". When an entity of the "city slot" comes from a user-defined word library created by the human-computer interaction server 200 for the skill "Moji Weather", the human-computer interaction server 200 associates the slot name of the "city slot" with the slot name of the "destination slot", and associates, with a system word library or a user-defined word library from which the entity configured for the "destination slot" comes, the user-defined word library from which the entity configured for the "city slot" comes. An interface in which entity sharing is configured is not limited to the interface shown in the user interface 90B, or may be an interface in which entity sharing is implemented by using a command line. This is not limited herein.

As shown in FIG. 10, an interface 100A shows a detail after the city slot of the skill "Moji Weather" and the destination slot of the skill "Qunar.com" share an entity. The interface 100A may be stored in the human-computer interaction server 200 in a form of a table. Alternatively, the human-computer interaction server 200 stores a mapping relationship of a shared entity between the city slot of the skill "Moji Weather" and the destination slot of the skill "Qunar.com". This is not limited herein.

A speech interaction method provided in this application is described in detail below with reference to Embodiment 1 and Embodiment 2.

Embodiment 1

Figure 11:
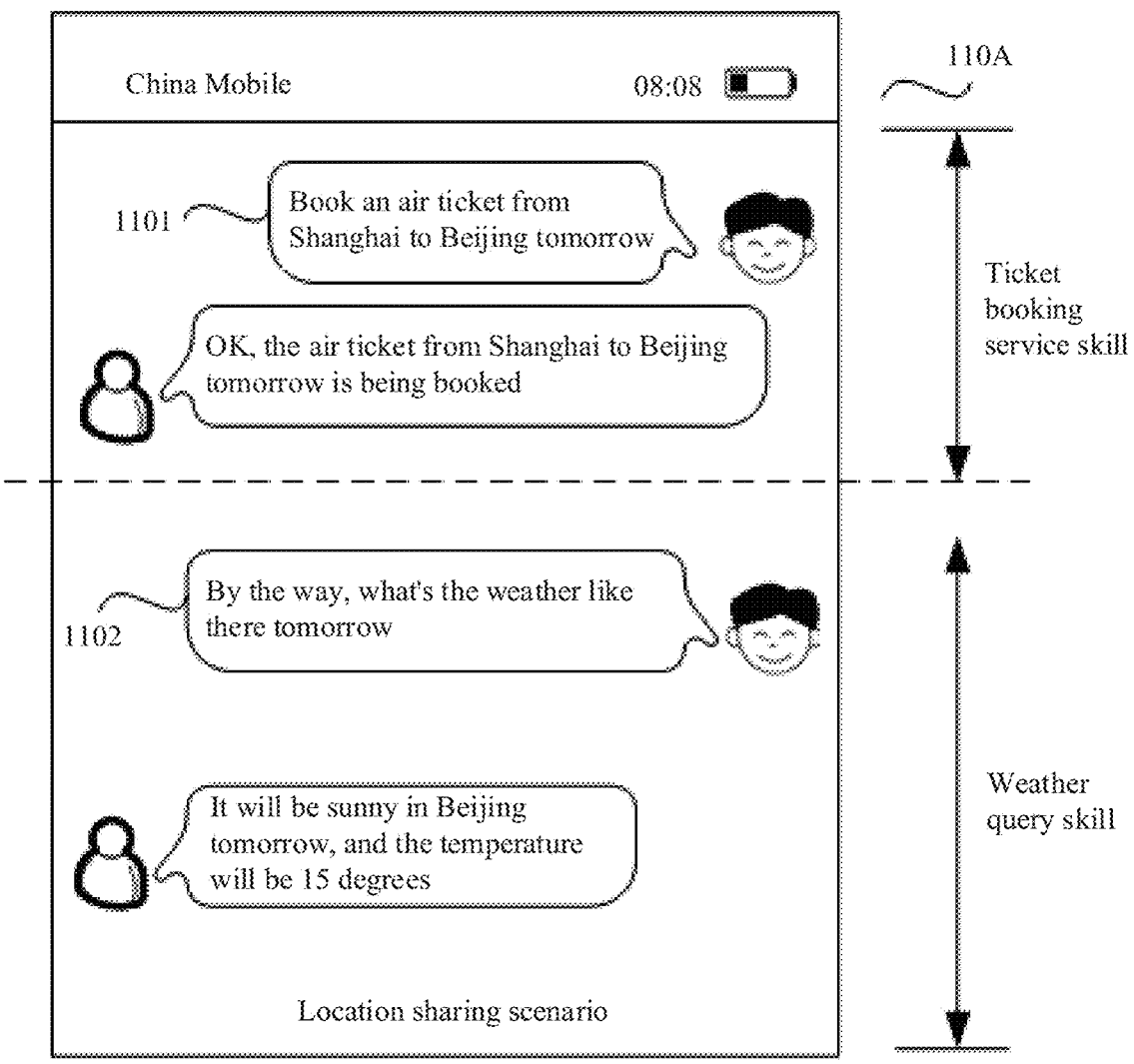
FIG. 11 is a schematic diagram of a terminal interface of a human-computer dialog according to an embodiment of this application.

FIG. 11 shows an example of a human-computer dialog on which Embodiment 1 is based. FIG. 11 shows an example of an entity sharing scenario in which an entity is a location. As shown in FIG. 11, an electronic device 100 may display a human-computer dialog interface 110A.

First, the electronic device 100 may display a collected user sentence 1101 "Book an air ticket from Shanghai to Beijing tomorrow" in the interface 110A. Then, a voice assistant in the electronic device 100 may feed back a ticket booking result (not shown) to a user. Herein, there may be but not limited to the following two manners in which the ticket booking result is fed back: Manner 1: The electronic device 100 may display the ticket booking result in a form of a web page (not shown) in the interface 110A. Manner 2: The electronic device 100 may alternatively voice-broadcast the ticket booking result to the user.

Next, the electronic device 100 may collect a user sentence 1102 "By the way, what's the weather like there tomorrow", and display the user sentence 1102 in the interface 110A. An entity that corresponds a city slot and that is extracted by a human-computer interaction server 200 from the user sentence 1102 is a pronoun "there". The human-computer interaction server 200 determines that the city slot and a corresponding destination slot in the user sentence 1101 share an entity. Then, the human-computer interaction server 200 replaces the pronoun "there" with an entity "Beijing" of the destination slot. In this way, the electronic device 100 can correctly feed back a weather query result to the user. Herein, there may be but not limited to the following two manners in which the weather query result is fed back: Manner 1: The electronic device 100 may display the weather query result in a form of a web page (not shown) in the interface 110A. Manner 2: The electronic device 100 may alternatively voice-broadcast the weather query result to the user.

The user sentence 1101 may alternatively be "Book a ticket to Beijing, where a place of departure is Shanghai". The human-computer interaction server 200 may still extract the entity "Beijing" of the destination slot from the user sentence 1101, and then, the human-computer interaction server 200 replaces the pronoun "there" in the user sentence 1102 with the entity "Beijing" of the destination slot. In this way, the electronic device 100 can correctly feed hack the weather query result to the user.

Based on the human-computer dialog shown in FIG. 11, FIG. 12A-1 and FIG. 12A-2, and FIG. 12B-1 and FIG.

12B-2 show an implementation, in a human-computer dialog system 10, of a human-computer dialog method provided in Embodiment 1.

Figures 1, 12A:
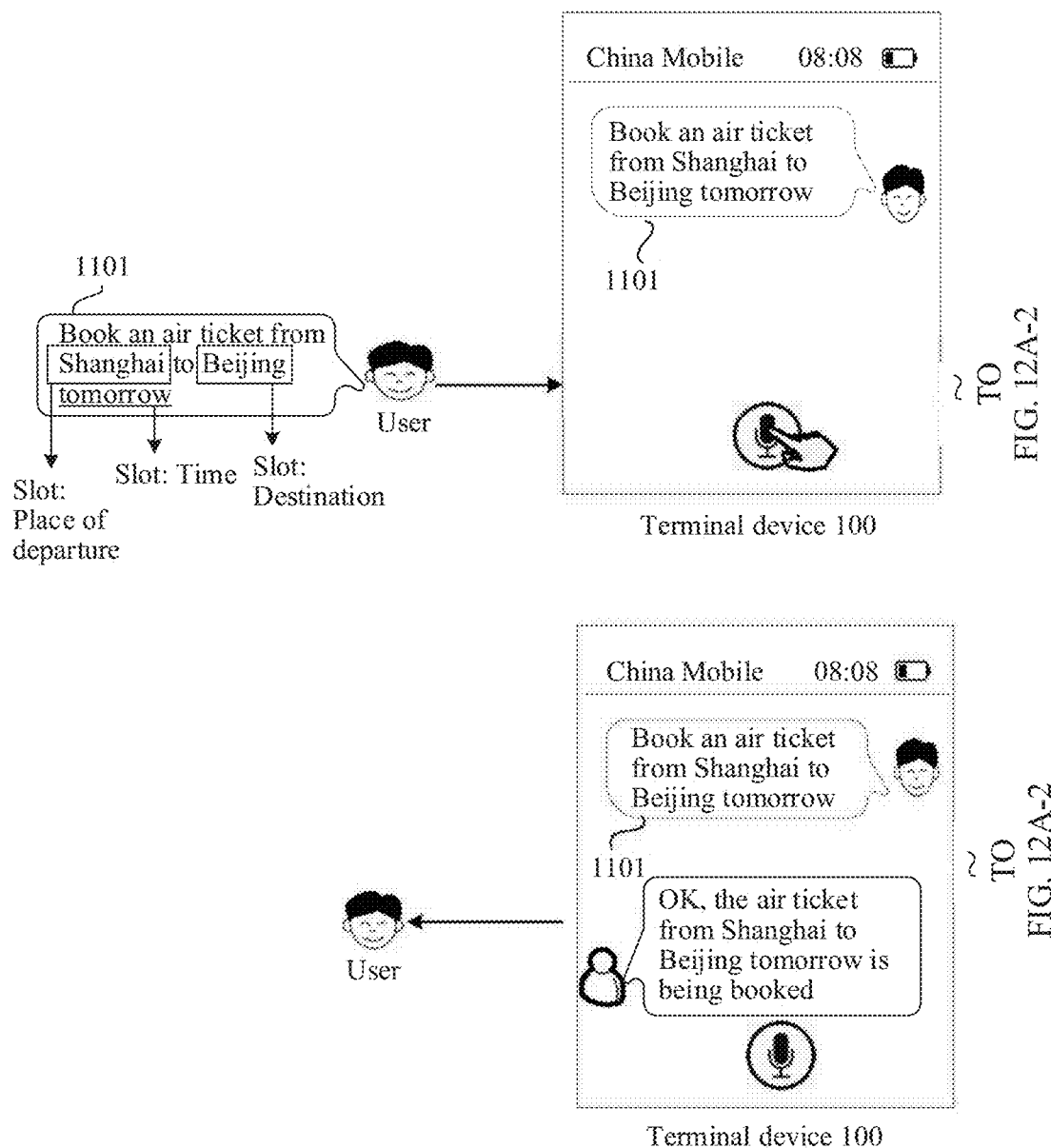
Figures 2, 12A:
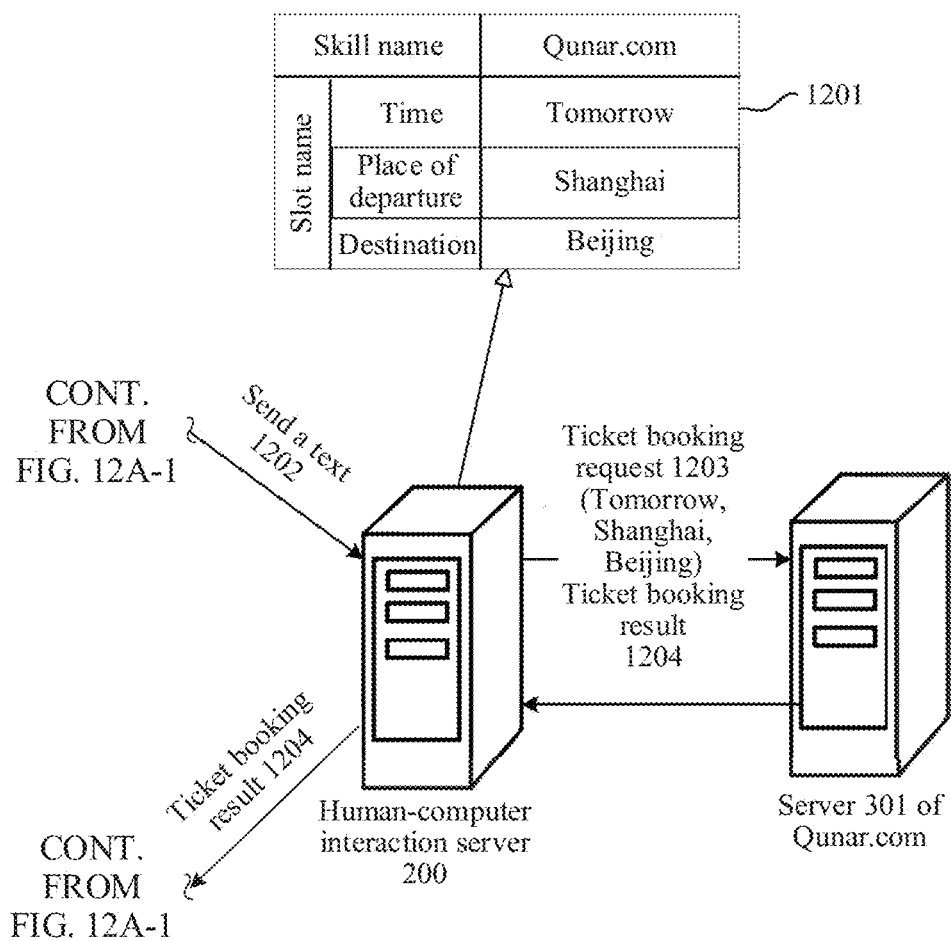

FIG. 12A-1 and FIG. 12A-2 specifically show a process in which the human-computer dialog system 10 processes a ticket booking request.

1. Send a Ticket Booking Request

As shown in FIG. 12A-1 and FIG. 12A-2, the electronic device 100 may collect the user sentence 1101. Optionally, the electronic device performs speech recognition on a user sentence 1201, and then converts the user sentence 1201 into a text 1202. The electronic device 100 sends the text 1202 to the human-computer interaction server 200.

As shown in FIG. 12A-1 and FIG. 12A-2, the human-computer interaction server 200 may receive the text 1202. The human-computer interaction server 200 performs a skill classification, an intention classification, and slot extraction on the text 1202. Specifically, the semantic understanding module 303 in the human-computer interaction server 200 shown in FIG. 3 may perform the skill classification on the text 1202. Then, the human-computer interaction server 200 may perform the intention classification and slot extraction on the text 1202 by using a human-computer dialog model of a skill corresponding to the text 1202. Specifically, the human-computer dialog model may be the human-computer dialog model trained in FIG. 5A. The human-computer interaction server 200 may store, in a form of Table 1201, the skill and a slot that correspond to the text 1202. It can be seen from Table 1201 that the skill corresponding to the text 1202 is a skill "Qunar.com". Therefore, the human-computer interaction server 200 sends a ticket booking request 1203 to a server 301 of Qunar.com. The ticket hooking request 1203 may include a request parameter such as "tomorrow, Shanghai, Beijing". The request parameter may be an entity that corresponds to a slot and that is extracted by the human-computer interaction server 200 from the text 1202. A specific form of the ticket booking request 1203 is not limited herein.

As shown in FIG. 12A-1 and FIG. 12A-2, the server 301 of Qunar.com may receive the ticket hooking request 1203. The server 301 of Qunar.com may obtain a ticket booking result 1204 based on the ticket booking request 1203 and the request parameter "tomorrow Shanghai, Beijing" included in the ticket booking request 1203.

2. Feed Back a Ticket Booking Result

As shown in FIG. 12A-1 and FIG. 12A-2, the server 301 of Qunar.com may return the ticket booking result 1204 (a flight from Beijing to Shanghai tomorrow) to the human-computer interaction server 200.

As shown in FIG. 12A-1 and FIG. 12A-2, after receiving the ticket booking result 1204 fed back by the server 301 of Qunar.com, the human-computer interaction server 200 may send the ticket booking result 1204 to the electronic device 100. Optionally, the human-computer interaction server 200 may send a ticket hooking page to the electronic device 100. The human-computer interaction server 200 may alternatively send a ticket booking parameter to the electronic device 100. The electronic device 100 may generate the ticket booking page based on the ticket booking parameter.

As shown in FIG. 12A-1 and FIG. 12A-2, after receiving the ticket booking result 1204 sent by the human-computer interaction server 200, the electronic device 100 may output (display or voice-broadcast) a result of booking a ticket from Shanghai to Beijing tomorrow.

Figure 12B:
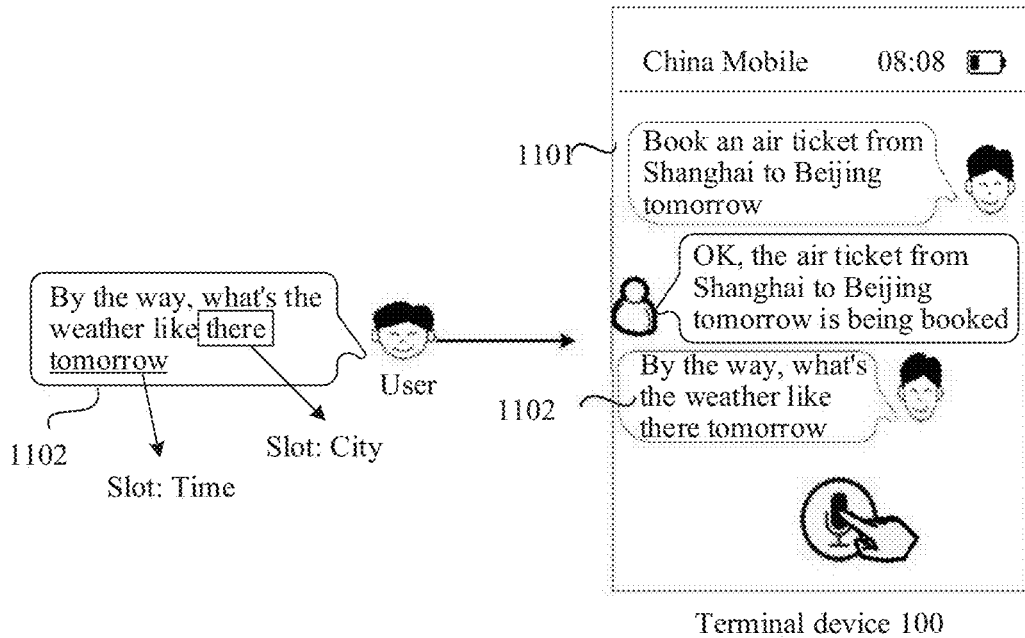
Figure 1:
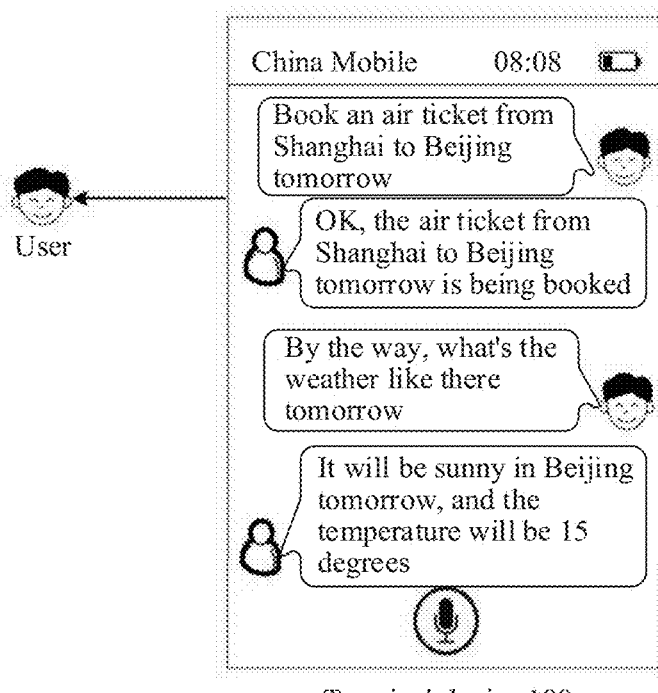
Figures 2, 12B:
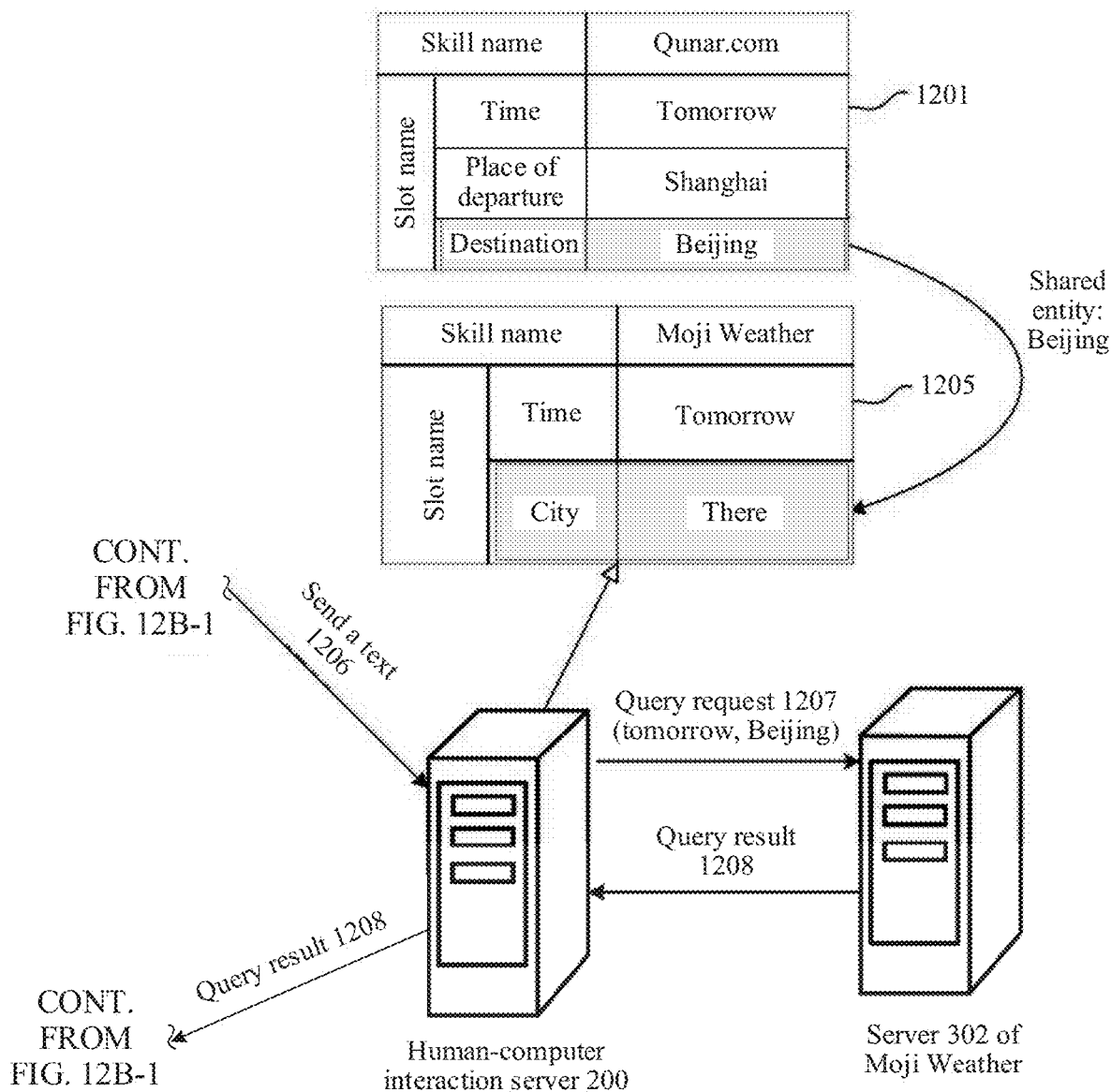

FIG. 12B-1 and FIG. 12B-2 specifically show a process in which the human-computer dialog system 10 processes a weather query request.

1. Send a Query Request

As shown in FIG. 12B-1 and FIG. 12B-2, the electronic device 100 may collect the user sentence 1102. Optionally, the electronic device performs speech recognition on the user sentence 1102, and then converts the user sentence 1102 into a text 1206. The electronic device 100 sends the text 1206 to the human-computer interaction server 200.

As shown in FIG. 12B-1 and FIG. 12B-2, the server 200 may receive the text 1206. The human-computer interaction server 200 performs a skill classification, an intention classification, and slot extraction on the text 1206. Specifically, the semantic understanding module 303 in the human-computer interaction server 200 shown in FIG. 3 may perform the skill classification on the text 1206. Then, the human-computer interaction server 200 may perform the intention classification and slot extraction on the text 1206 by using a human-computer dialog model of a skill corresponding to the text 1206. Specifically, the human-computer dialog model may be the human-computer dialog model trained in FIG. 5A. The human-computer interaction server 200 may store, in a form of Table 1205, the skill and a slot that correspond to the text 1206.

As shown in FIG. 12B-1 and FIG. 12B-2, an entity of a city slot that is in the text 1206 and that is shown in Table 1205 is the pronoun "there". Therefore, the human-computer interaction server 200 needs to query whether there is a shared entity of the city slot in the text 1206. It can be learned from FIG. 8 to FIG. 10 that an entity sharing configuration is performed on a city slot of a skill "Moji Weather" and a destination slot of a skill "Qunar.com". Therefore, the human-computer interaction server 200 directly shares, with the city slot in Table 1205, an entity "Beijing" corresponding to a destination in Table 1201 stored in a memory. Therefore, the human-computer interaction server 200 learns that a specific intention of the text 1306 is "Query the weather in Beijing tomorrow". Then, the human-computer interaction server 200 sends a query request 1207 to a server 302 of Moji Weather. The query request 1207 may include a request parameter such as "tomorrow, Beijing". The request parameter may be an entity that corresponds to a slot and that is extracted by the human-computer interaction server 200 from the text 1206. A specific form of the query request 1207 is not limited herein.

As shown in FIG. 12B-1 and FIG. 12B-2, the server 302 of Moji Weather may receive the query request 1207. The server 302 of Moji Weather may obtain a query result 1208 based on the query request 1207 and a parameter "tomorrow, Beijing" included in the query request 1207.

2. Feed Back a Query Result

As shown in FIG. 12B-1 and FIG. 12B-2, the server 302 of Moji Weather may return the query result 1208 (for example, a weather forecast of Beijing tomorrow) to the human-computer interaction server 200.

As shown in FIG. 12B-1 and FIG. 12B-2, after receiving the query result 1208 fed back by the server 302 of Moji Weather, the human-computer interaction server 200 may send the query result 1208 to the electronic device 100. Optionally, the human-computer interaction server 200 may send a weather forecast page to the electronic device 100. The human-computer interaction server 200 may alternatively send a weather forecast parameter to the electronic device 100. The electronic device 100 may generate the weather forecast page based on the weather forecast parameter.

As shown in FIG. 12B-1 and FIG. 12B-2, after receiving the query result 1208 sent by the human-computer interaction server 200, the electronic device 100 may output (display or voice-broadcast) a weather condition of Beijing tomorrow.

In Embodiment 1 of this application, a shared entity is configured for the city slot of the skill "Moji Weather" and the destination slot of the skill "Qunar.com". Therefore, when the entity corresponding to the city slot in the user sentence 1102 is the pronoun "there", the human-computer interaction server 200 can still understand that "there" in the user sentence 1102 means "Beijing". The human-computer interaction server 200 does not need to ask the user for a meaning of the pronoun "there" in the user sentence 1102. In this way, user experience is improved.

Embodiment 2

Figure 13:
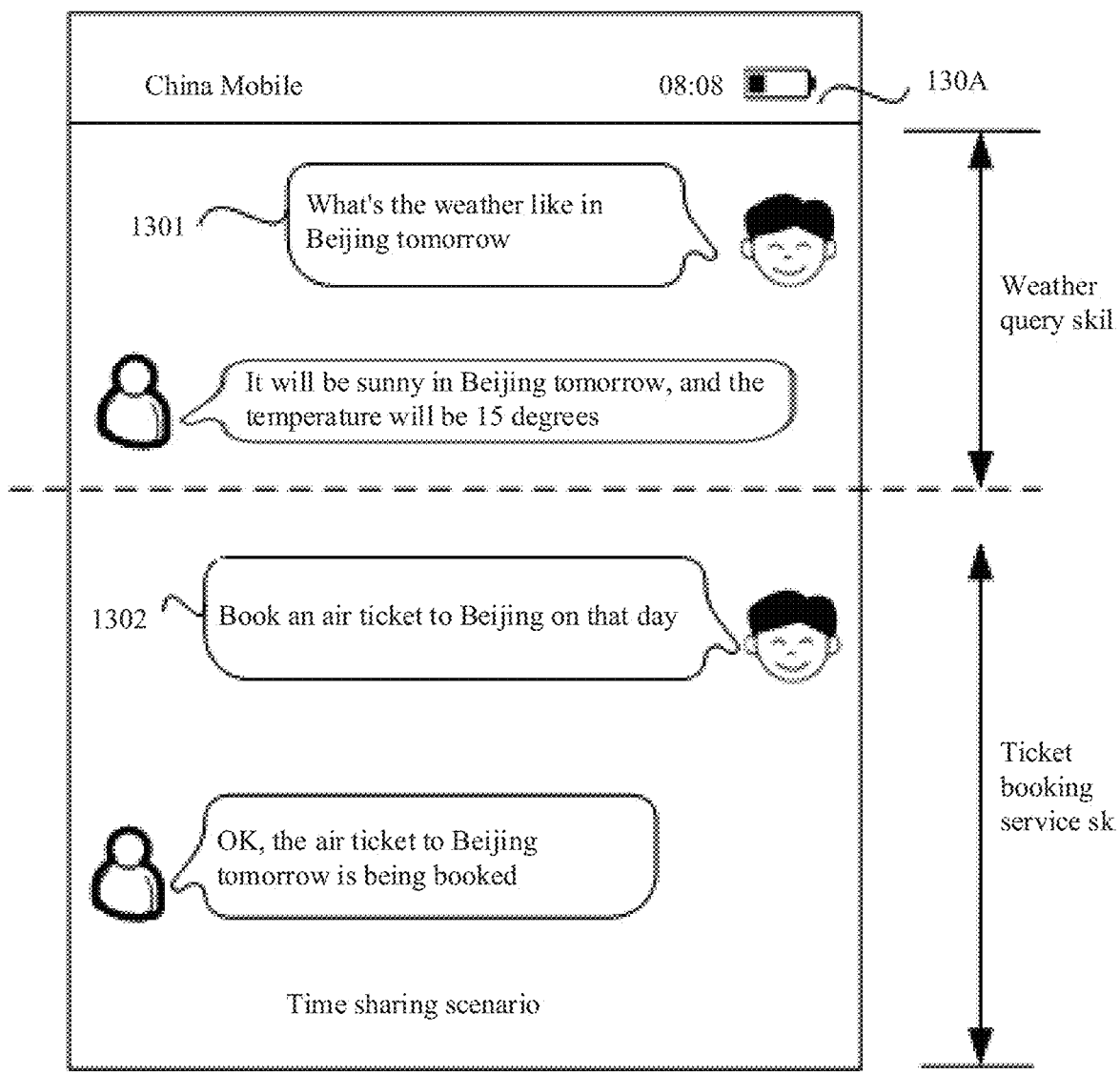
FIG. 13 is a schematic diagram of a terminal interface of another human-computer dialog according to an embodiment of this application.

FIG. 13 shows an example of a human-computer dialog on which Embodiment 2 is based. FIG. 13 shows an example of an entity sharing scenario in which an entity is a time. As shown in FIG. 13, an electronic device 100 may display a human-computer dialog interface 130A.

First, the electronic device 100 may display, in the interface 130A, a collected user sentence 1301 "What's the weather like in Beijing tomorrow". Then, a voice assistant in the electronic device 100 may feed back a query result (not shown) to a user. Herein, there may be but not limited to the following two manners in which the query result is fed back: Manner 1: The electronic device 100 may display the query result in a form of a web page (not shown) in the interface 110A. Manner 2: The electronic device 100 may alternatively voice-broadcast the query result to the user.

Next, the electronic device 100 may collect a user sentence 1302 "Book an air ticket to Beijing on that day." An entity that corresponds to a time slot and that is extracted by a human-computer interaction server 200 from the user sentence 1302 is a pronoun "that day". The human-computer interaction server 200 determines that the time slot and a time slot corresponding to the user sentence 1301 share an entity. Then, the human-computer interaction server 200 replaces the pronoun "that day" with an entity "tomorrow" of the time slot corresponding to the user sentence 1301. In this way, the electronic device 100 can correctly feed back a ticket booking result to the user. The voice assistant in the electronic device 100 may feed back the ticket booking result (not shown) to the user. Herein, there may be but not limited to the following two manners in which the ticket booking result is fed back: Manner 1: The electronic device 100 may display the ticket booking result in a form of a web page (not shown) in the interface 110A. Manner 2: The electronic device 100 may alternatively voice-broadcast the ticket booking result to the user.

Based on the human-computer dialog shown in FIG. 13, FIG. 14A-1 and FIG. 14A-2, and FIG. 14B-1 and FIG. 14B-2 show an implementation, in a human-computer dialog system 10, of a speech interaction method provided in Embodiment 2.

Figure 14A:
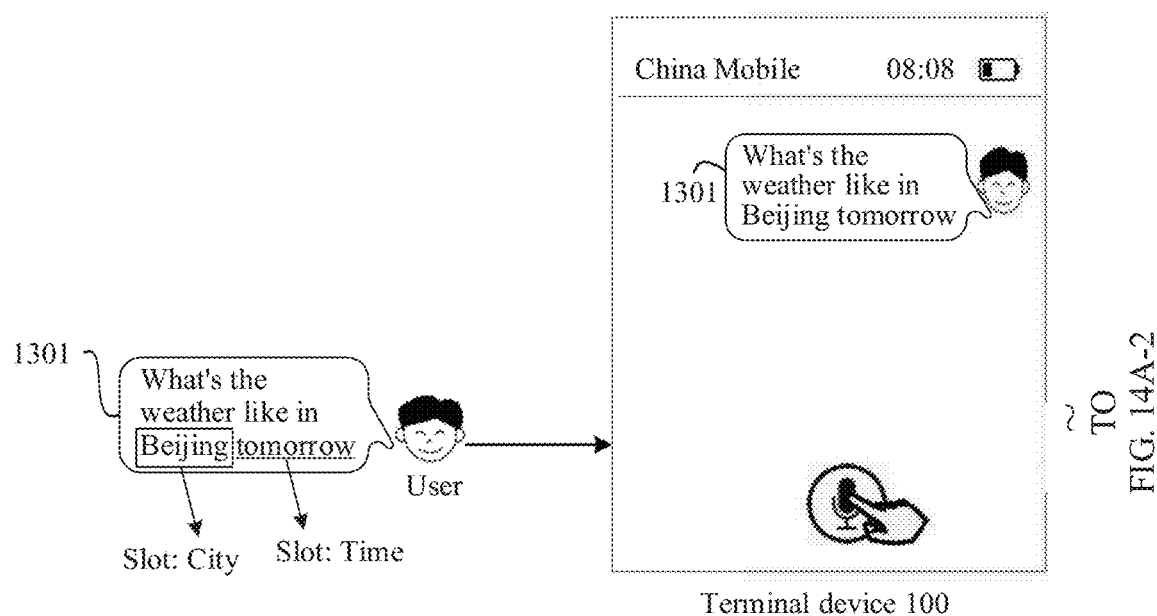
Figure 1:
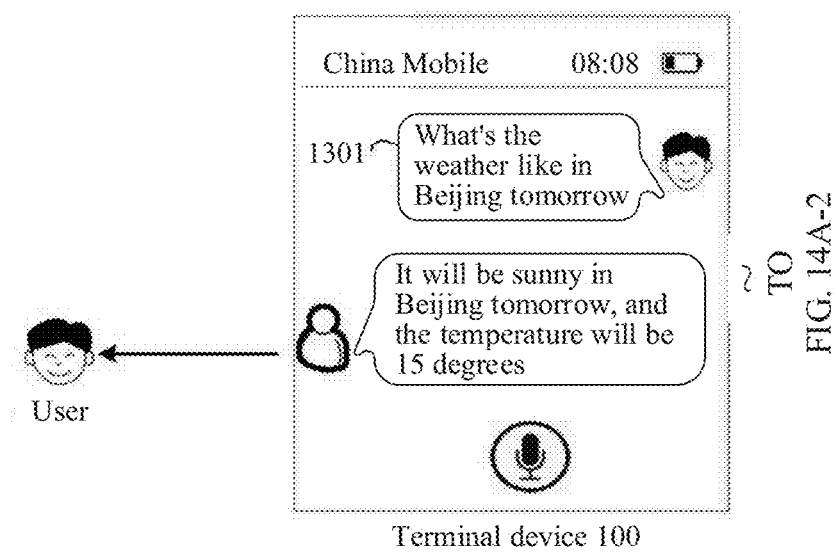
Figures 2, 14A:
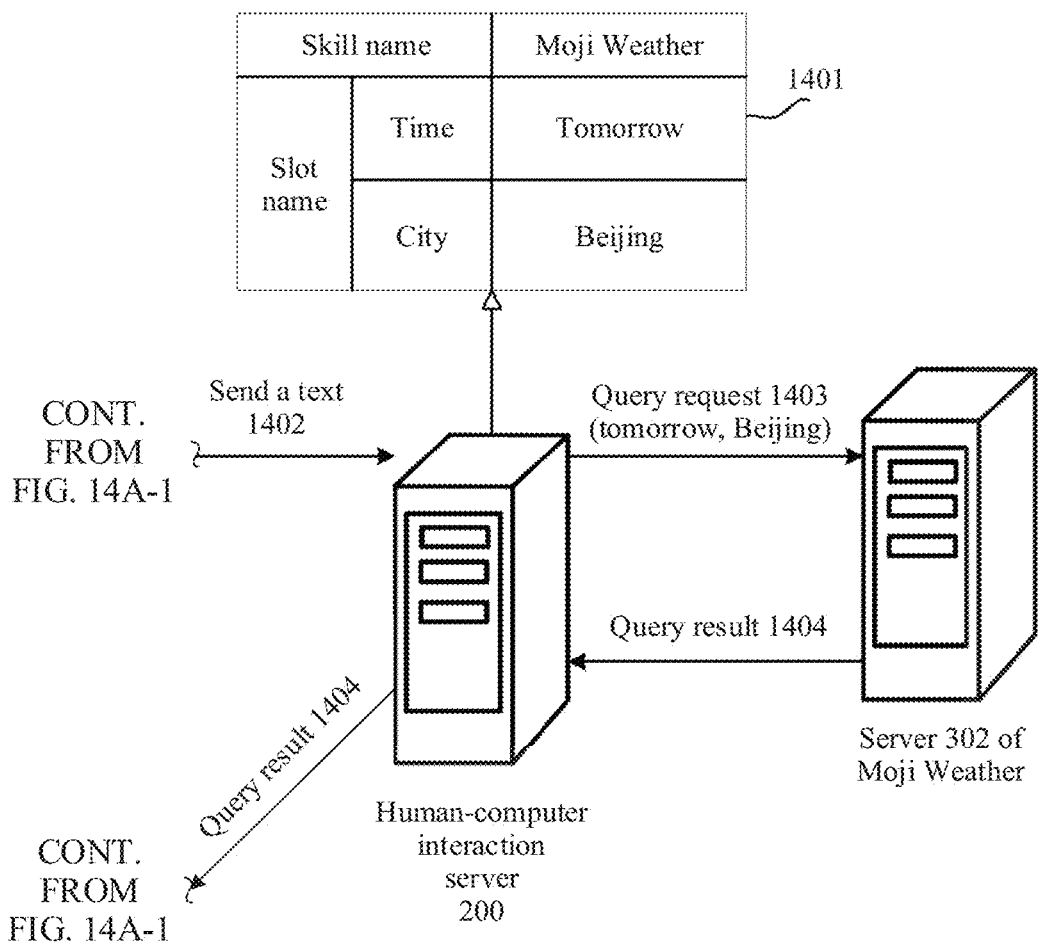

FIG. 14A-1 and FIG. 14A-2 specifically show a process in which the human-computer dialog system 10 processes a weather query request.

1. Send a Query Request

As shown in FIG. 14A-1 and FIG. 14A-2, the electronic device 100 may collect the user sentence 1301. Optionally, the electronic device performs speech recognition on a user sentence 1201, and then converts the user sentence 1201 into a text 1402. The electronic device 100 sends the text 1302 to the human-computer interaction server 200.

As shown in FIG. 14A-1 and FIG. 14A-2, the server 200 may receive the text 1402. The human-computer interaction server 200 performs a skill classification, an intention classification, and slot extraction on the text 1402. Specifically, the semantic understanding module 303 in the human-computer interaction server 200 shown FIG. 3 may perform the skill classification on the text 1402. Then, the human-computer interaction server 200 may perform the intention classification and slot extraction on the text 1402 by using a human-computer dialog model of a skill corresponding to the text 1402. Specifically, the human-computer dialog model may be the human-computer dialog model trained in FIG. 5A. The human-computer interaction server 200 may store, in a form of Table 1401, the skill and a slot that correspond to the text 1402. It can be seen from Table 1401 that the skill corresponding to the text 1402 is a skill "Moji Weather". Therefore, the human-computer interaction server 200 sends a query request 1403 to a server 302 of Moji Weather. The query request 1403 may include a request parameter such as "tomorrow, Beijing". The request parameter may be an entity that corresponds to a slot and that is extracted by the human-computer interaction server 200 from the text 1402. A specific form of the query request 1403 is not limited herein.

As shown in FIG. 14A-1 and FIG. 14A-2, the server 302 of Moji Weather may receive the query request 1403. The server 302 of Moji Weather may obtain a query result 1404 (a weather forecast of Beijing tomorrow) based on the query request 1403 and a parameter "tomorrow, Beijing" included in the query request 1403.

2. Feed Back a Query Request

As shown in FIG. 14A-1 and FIG. 14A-2, the server 302 of Moji Weather may return the query result 1404 (for example, the weather forecast of Beijing tomorrow) to the human-computer interaction server 200.

As shown in FIG. 14A-1 and FIG. 14A-2, after receiving the query result 1404 (for example, the weather forecast of Beijing tomorrow) fed back by the server 302 of Moji Weather, the human-computer interaction server 200 may send the query result 1404 to the electronic device 100. Optionally, the human-computer interaction server 200 may send a weather forecast page to the electronic device 100. The human-computer interaction server 200 may alternatively send a weather forecast parameter to the electronic device 100. The electronic device 100 may generate the weather forecast page based on the weather forecast parameter.

As shown in FIG. 14A-1 and FIG. 14A-2, after receiving the query result 1404 sent by the human-computer interaction server 200, the electronic device 100 may output (display or voice-broadcast) a weather query result of Beijing tomorrow.

Figure 14B:
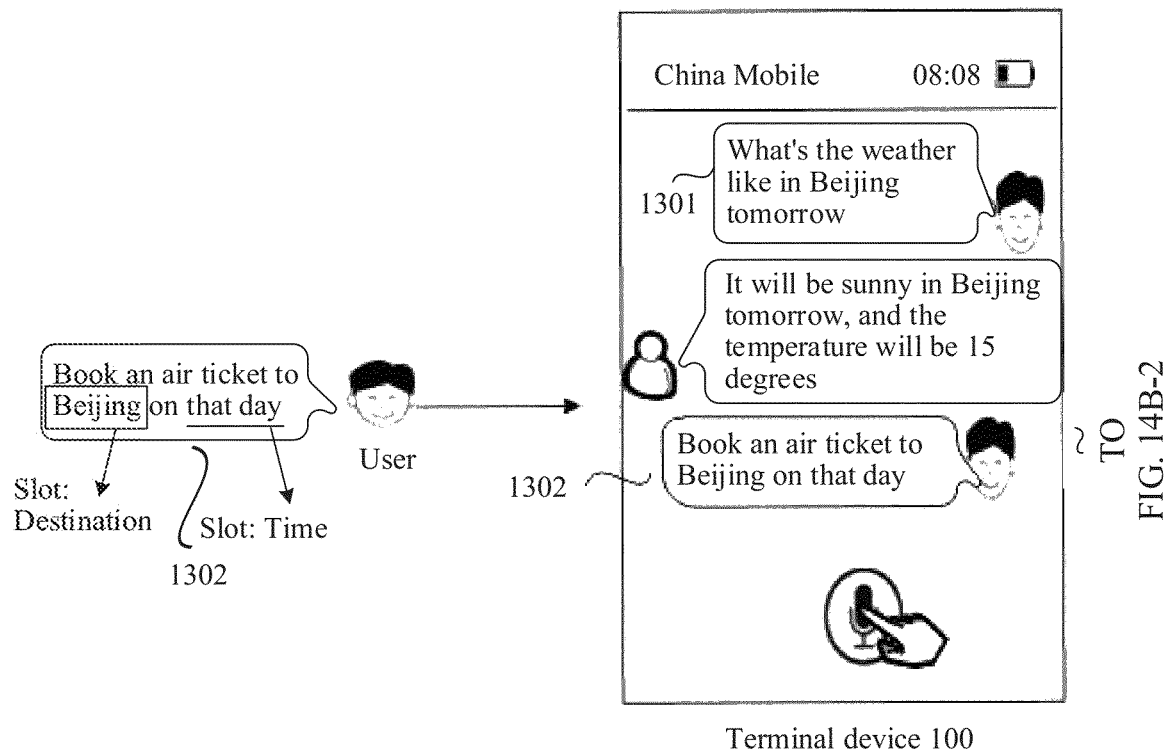
Figure 1:
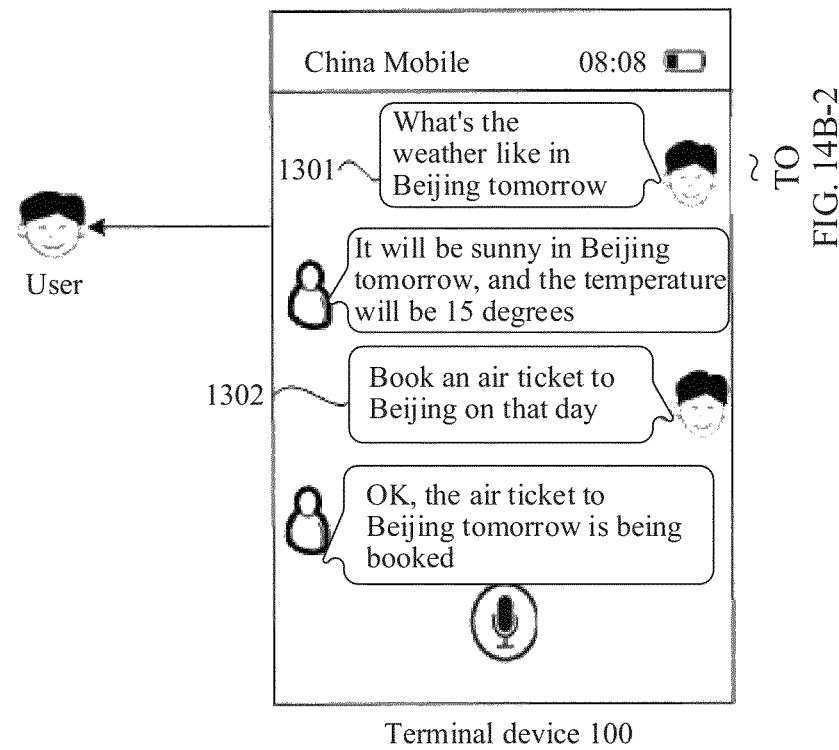
Figures 2, 14B:
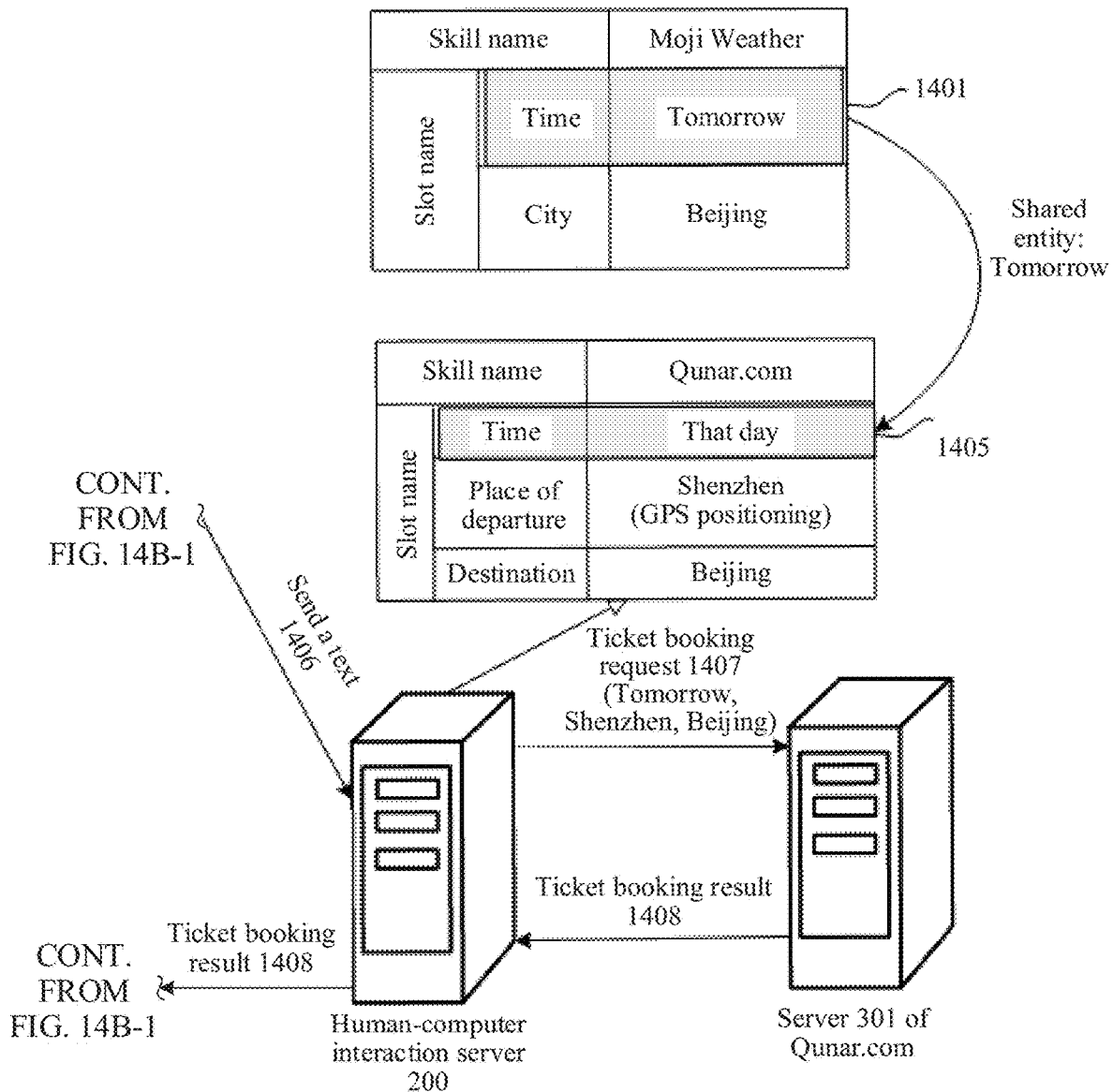

FIG. 14B-1 and FIG. 14B-2 specifically show a process in which the human-computer dialog system 10 processes a ticket booking request.

1. Send a Ticket Booking Request

As shown in FIG. 14B-1 and FIG. 14B-2, the electronic device 100 may collect the user sentence 1302. Optionally, the electronic device performs speech recognition on the user sentence 1302, and then converts the user sentence 1302 into a text 1406. The electronic device 100 sends the text 1406 to the human-computer interaction server 200.

As shown in FIG. 14B-1 and FIG. 14B-2, the server 200 may receive the text 1406. The human-computer interaction server 200 performs the skill classification, the intention classification, and slot extraction on the text 1406. Specifically, the semantic understanding module 303 in the human-computer interaction server 200 shown in FIG. 3 may perform the skill classification on the text 1406. Then, the human-computer interaction server 200 may perform the intention classification and slot extraction on the text 1406 by using a human-computer dialog model of a skill corresponding to the text 1406. Specifically, the human-computer dialog model may be the human-computer dialog model trained in FIG. 5A. The human-computer interaction server 200 may store, in a form of Table 1405, the skill and a slot that correspond to the text 1406.

As shown in FIG. 14B-1 and FIG. 14B-2, an entity of a time slot that is in the text 1406 and that is shown in Table 1405 is the pronoun "that day". Therefore, the human-computer interaction server 200 needs to query whether there is a shared entity of the time slot in the text 1406. A shared entity is configured for a time slot of a skill "Qunar.com" and a time slot of a skill "Moji Weather". For a process of configuring the shared entity for the time slot of the skill "Qunar.com" and the time slot of the skill "Moji Weather", refer to the shared entity configuration process shown in FIG. 8 to FIG. 10. Therefore, the human-computer interaction server 200 directly shares, with the time slot in Table 1405, an entity "tomorrow" corresponding to a time slot in Table 1401 stored in a memory, Therefore, the human-computer interaction server 200 learns that a specific intention of the text 1406 is "Book an air ticket from Shenzhen (a city obtained through GPS positioning) to Beijing tomorrow". Then, the human-computer interaction server 200 sends a ticket booking request 1407 to a server 301 of Qunar.com. The ticket hooking request 1407 may include a request parameter such as "tomorrow, Shenzhen, Beijing". The request parameter may be an entity that corresponds to a slot and that is extracted by the human-computer interaction server 200 from the text 1406. A specific form of the ticket booking request 1407 is not limited herein.

As shown in FIG. 14B-1 and FIG. 14B-2, the server 301 of Qunar.com may receive the ticket booking request 1407. The server 301 of Qunar.com may obtain a ticket booking result 1408 (for example, a flight from Shenzhen to Beijing tomorrow) based on the query request 1207 and the parameter "tomorrow Shenzhen, Beijing" included in the ticket booking request 1407.

2. Feed Back a Ticket Hooking Request

As shown in FIG. 14B-1 and FIG. 14B-2, the server 301 of Qunar.com may return the ticket booking result 1408 (the flight from Shenzhen to Beijing tomorrow) to the human-computer interaction server 200.

As shown in FIG. 14B-1 and FIG. 14B-2, after receiving the ticket booking result 1408 fed back by the server 301 of Qunar.com, the human-computer interaction server 200 may send the ticket hooking result 1408 to the electronic device 100. Optionally, the human-computer interaction server 200 may send a ticket booking page to the electronic device 100. The human-computer interaction server 200 may alternatively send a ticket booking parameter to the electronic device 100. The electronic device 100 may generate the ticket booking page based on the ticket booking parameter.

As shown in FIG. 14B-1 and FIG. 14B-2, after receiving the ticket booking result 1408 sent by the human-computer interaction server 200, the electronic device 100 may output (display or voice-broadcast) a result of booking a ticket from Shenzhen to Beijing tomorrow.

In Embodiment 2 of this application, a shared entity is configured for the time slot of the skill "Moji Weather" and the time slot of the skill "Qunar.com". Therefore, when the entity corresponding to the time slot in the user sentence 1302 is the pronoun "there", the human-computer interaction server 200 can still understand that "that day" in the user sentence 1302 means "Beijing". The human-computer interaction server 200 does not need to ask the user for a meaning of the pronoun "that day" in the user sentence 1302. In this way, user experience is improved.

In the speech interaction method provided in this application, the human-computer interaction server 200 receives a first user sentence collected by the electronic device 100; the human-computer interaction server 200 extracts an entity of a first slot from the first user sentence; the first slot is a slot configured for a first intention; the first intention is an intention configured for a first skill, and one or more intentions are configured for the first skill; the first intention and the first skill are determined by the human-computer interaction server 200 based on the first user sentence, and match a service requirement expressed in the first user sentence; if the entity of the first slot is a pronoun, the human-computer interaction server 200 modifies the entity of the first slot to an entity of a second slot; the second slot is configured as an associated slot of the first slot, and the entity of the second slot is extracted by the human-computer interaction server 200 from a second user sentence; the second user sentence is collected by the electronic device 100 before the first user sentence; an intention for which the second slot is configured is a second intention, and the second intention is configured as an association intention of the first intention; a skill for which the second intention is configured is a second skill, and the second skill configured as an associated skill of the first skill; the human-computer interaction server 200 sends a first server request to a third-party application server 300, and obtains, from the third-party application server 300, a first service result generated in response to the first service request; the first service request includes indication information of the first intention and the entity of the first slot; the third-party application server 300 is an application server that provides the first skill; and the first service result is determined by the third-party application server 300 based on the first intention and the entity of the first slot. The human-computer interaction server 200 returns the first service result to the electronic device 100; and the first service result is output by the electronic device 100.

FIG. 15A to FIG. 15D show an overall procedure of a semantic parsing method according to an embodiment of this application. Details are as follows:

Stage 1: Prior speech interaction (S101-S107)

S101: An electronic device 100 collects a user sentence A, processes the user sentence A by using a speech recognition module, and sends the user sentence A to a human-computer interaction server 200.

Figure 15A:
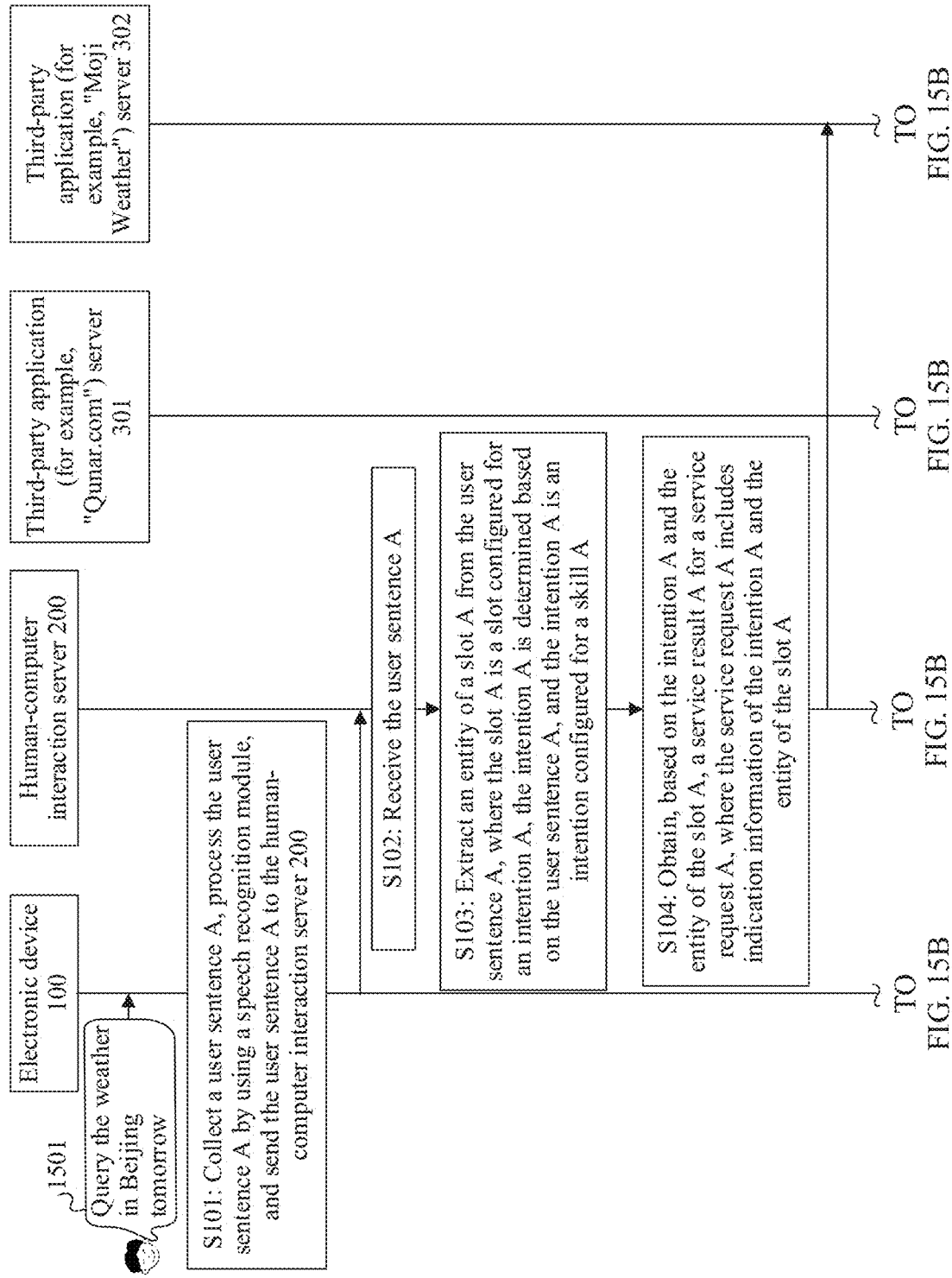
Figure 15B:
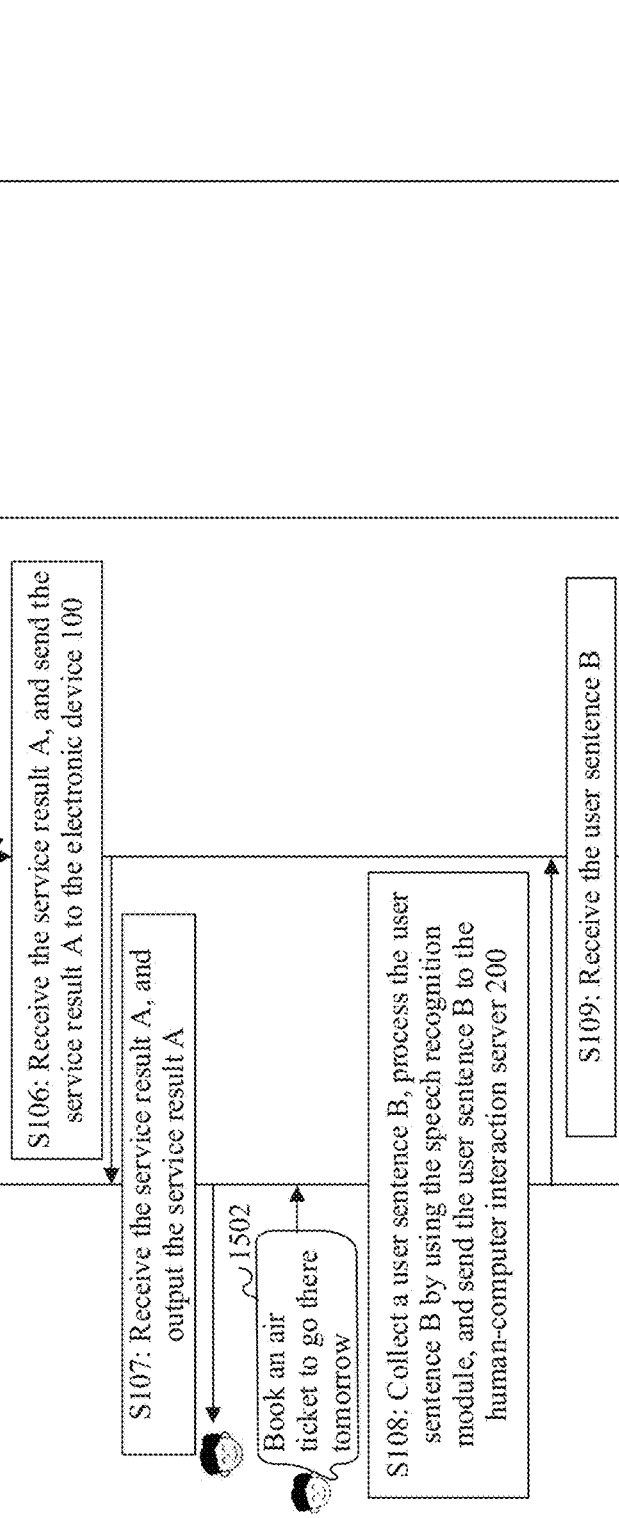
Figure 15D:
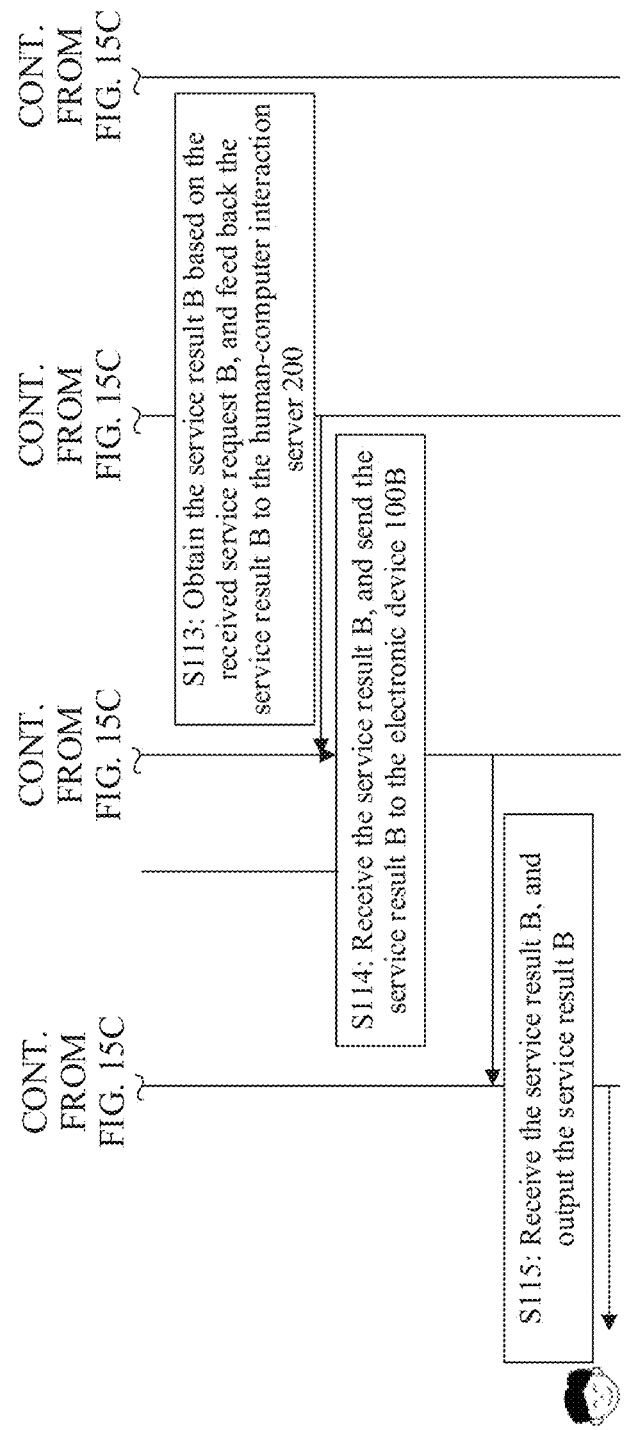

The user sentence A may be a user sentence 1501 "Query the weather in Beijing tomorrow" shown in FIG. 15A. The speech recognition module in the electronic device 100 performs speech recognition on the user sentence 1501. Optionally, the user sentence A sent by the electronic device 100 to the human-computer interaction server 200 may be in an audio form, or may be in a text form. This is not limited herein.

S102: The human-computer interaction server 200 receives the user sentence A.

When performing dialog interaction with the human-computer interaction server 200 by using the electronic device 100, a user may propose a corresponding service requirement to the human-computer interaction server 200 in a speech form or the text form. If the user enters a speech, the human-computer interaction server 200 may perform speech recognition, convert the speech into a text form, and enter the speech into a semantic understanding module 303. If the user enters a text, the human-computer interaction server 200 enters, into the semantic understanding module 303, the text entered by the user.

The user sentence A may be a sentence in a single-round dialog between the user and the human-computer interaction server 200, or may be a plurality of sentences in a multi-round dialog between the user and the human-computer interaction server 200. This is not limited in this embodiment of this application.

The human-computer interaction server 200 may receive, through the communication connection 101 shown in FIG. 2, the user sentence A sent by the electronic device 100.

S103: The human-computer interaction server 200 extracts an entity of a slot A from the user sentence A, where the slot A is a slot configured for the intention A, the intention A is determined based on the user sentence A, and the intention A is an intention configured for the skill A.

The first user sentence may express a service requirement of the user, namely, a service that the user wants the human-computer interaction server 200 to provide. The semantic understanding module 303 may perform a search and filtering based on the first user sentence, to determine the intention A corresponding to the user sentence A and slot information (including the slot A) associated with the intention.

The intention A is an intention (for example, a dialog intention "Weather query") of the skill A (for example, a weather query skill) in the human-computer interaction server 200. When configuring the skill, a skill developer configures a corresponding slot (for example, a city slot or a time slot) for the intention A of the skill, namely, a slot that needs to be extracted for the intention A and an attribute of each slot. Therefore, after determining the intention A corresponding to the user sentence A, the human-computer interaction server 200 may output, by using a human-computer dialog model corresponding to the intention A, a slot configuration associated with the intention A. For example, when the user sentence A is "Query the weather in Beijing tomorrow", the human-computer interaction server 200 may determine that the intention A corresponding to the user sentence A is the dialog intention "Weather query". A human-computer dialog model corresponding to the dialog intention "Weather query" may output slots associated with the intention: a time slot and a city slot. An entity corresponding to the time slot is "tomorrow", and an entity corresponding to the city slot is "Beijing". The slot A may be the city slot.

It should be noted that, information about some slots may be information that is set by the user by default or that may be obtained in another manner (for example, through GPS positioning), and may not necessarily be extracted from the user sentence A.

S104: The human-computer interaction server 200 obtains, based on the intention A and the entity of the slot A, a service result A for a service request A, where the service request A includes indication information of the intention A and the entity of the slot A.

After obtaining a specific intention and slot information associated with the intention, the human-computer interaction server 200 sends a service request to a third-party application server that has a mapping relationship with the intention. The mapping relationship between the intention and the third-party application server may be established before the human-computer interaction server 200 receives the first user sentence. The mapping relationship between the intention and the third-party application server may alternatively be established when the human-computer interaction server creates a skill. This is not limited herein. For example, the dialog intention "Weather query" corresponds to a server of Moji Weather. A dialog intention "Book an air ticket" corresponds to a server of Qunar.com. A first service request may be a weather query request, or may be a ticket booking request. This is not limited herein. The intention obtained by, the human-computer interaction server 200 is the dialog intention "Weather query". Slots corresponding to the dialog intention "Weather query" are respectively the time slot and the city slot. The human-computer interaction server 200 obtains an entity "tomorrow" corresponding to the time slot and an entity "Beijing" corresponding to the city slot. Then, the human-computer interaction server 200 sends the weather query request to the server of Moji Weather. The weather query request includes a query time "tomorrow" and a query city "Beijing". Correspondingly, the service result obtained by the human-computer interaction server 200 may be a weather forecast of Beijing tomorrow.

S105: A server 302 of a third application 2 obtains the service result A based on the received service request A, and feeds back the service result A to the human-computer interaction server 200.

The server 302 of the third-party application 2 (for example, a server of the application "Moji Weather") receives the service request A (for example, the weather query request) sent by the human-computer interaction server. The server 302 of the third-party application 2 obtains the service result A (for example, a weather query result of Beijing tomorrow) based on the service request A and a parameter (for example, "tomorrow, Beijing") carried in the service request A. Then, the server 302 of the third-party application 2 returns the service result A to the human-computer interaction server 200.

S106: The human-computer interaction server receives the service result A, and sends the service result A to the electronic device 100.

Specifically, the service result A sent by the human-computer interaction server 200 may be in a form of a web page. The service result A may alternatively be in a form of a parameter, and the corresponding web page is generated by the electronic device 100. This is not limited herein.

S107: The electronic device 100 receives the service result A, and outputs the service result A.

The electronic device 100 may display the service result A (for example, the weather forecast of Beijing tomorrow) on a screen in a form of the web page, so that the user views the service result A. The electronic device 100 may further voice-broadcast the service result A to the user. A form of the service result A output by the electronic device 100 is not limited herein.

Stage 2: Latter Speech Interaction (S108-S117)

S108: The electronic device 100 collects a user sentence B, processes the user sentence B by using the speech recognition module, and sends the user sentence B to the human-computer interaction server 200.

The user sentence B that may be collected by the electronic device 100 may be a sentence 1502 "Book an air ticket to go there tomorrow." Optionally, the second user sentence may be in an audio form, or may be in a text form.

Specifically, the electronic device 100 may send the user sentence B to the human-computer interaction server 200 through the communication connection 101 shown in FIG. 3.

S109: The human-computer interaction server 200 receives the user sentence B.

For a process in which the human-computer interaction server 200 receives the user sentence B, refer to the process in which the human-computer interaction server 200 receives the user sentence A in step 102. Details are not described herein again.

S110: The human-computer interaction server 200 extracts an entity of a slot B from the user sentence B, where the slot B is a slot configured for an intention B, the intention B is determined based on the user sentence B, and the intention B is an intention configured for a skill B.

The human-computer interaction server 200 recognizes that a skill corresponding to the user sentence B is an air ticket booking skill, and may further recognize that an intention corresponding to a dialog intention is the dialog intention "Book an air ticket". The human-computer interaction server 200 may further determine, from the user sentence B, an entity corresponding to a slot (for example, a time slot, a place of departure slot, or a destination slot) associated with the dialog intention "Book an air ticket". Specifically, an entity corresponding to the time slot is "tomorrow", an entity corresponding to the place of departure slot is a current location of the user, and an entity corresponding to the destination slot is a pronoun "there". A manner in which the human-computer interaction server 200 performs a skill classification and intention recognition to extract a slot is described in step 103, and details are not described herein again.

S111: If the entity of the slot B is a pronoun, the human-computer interaction server 200 modifies the entity of the slot B to the entity of the slot A, where the slot A is configured as an associated slot of the slot B, and the skill A is configured as an associated skill of the skill B.

Specifically, if the entity of the slot B is a pronoun, for example, a destination slot in the user sentence 1502 "Book an air ticket to go there tomorrow" corresponds to the pronoun "there", the human-computer interaction server 200 cannot determine a specific meaning of the pronoun "there". Because the human-computer interaction server 200 configures a shared entity for the slot A and the slot B, the human-computer interaction server 200 replaces the entity of the slot B with the entity of the slot A. The human-computer interaction server 200 configures the shared entity for the slot. A and the slot B. For example, the shared entity is configured for the slot A of the skill "Weather query" (for example, the "city slot" of the skill "Weather query") and the "destination slot" of the skill "Qunar.com". When the entity of the "city slot" is a pronoun, the human-computer interaction server 200 replaces the entity of the "city slot" with the entity of the "destination slot". A process in which the human-computer interaction server 200 configures the shared entity is shown in FIG. 8 to FIG. 10. Details are not described herein again.

As shown in FIG. 12B-1 and FIG. 12B-2, the human-computer interaction server 200 replaces the entity "there" of the city slot in Table 1205 with the entity "Beijing" corresponding to the destination slot in Table 1201. Then, the entity corresponding to the city slot in Table 1205 is "Beijing". Herein, a second slot is the city slot in Table 1305, and a meaning of the pronoun "there" is "Beijing". As shown in FIG. 14B-1 and FIG. 14B-2, the human-computer interaction server 200 replaces the entity "that day" of the time slot in Table 1405 with the entity "tomorrow" corresponding to the time slot in Table 1401. Then, the entity corresponding to the time slot in Table 1505 is "tomorrow". Herein, a first slot is the time slot in Table 1405, and a meaning of the pronoun "that day" is "tomorrow".

S112: The human-computer interaction server 200 obtains a service result B for a service request B from a third-party application server based on the intention B and the entity of the slot B, where the service request B includes indication information of the intention B and the entity of the slot B.

After obtaining a specific intention and slot information corresponding to the intention, the human-computer interaction server 200 sends the service request B (for example, "Book an air ticket from Shenzhen to Beijing tomorrow") to a third-party application server (for example, the server of Qunar.com) that has a mapping relationship with the intention B (for example, the dialog intention "Book an air ticket"). For example, the intention obtained by the human-computer interaction server 200 is the dialog intention "Book an air ticket". Slots corresponding to the dialog intention "Book an air ticket" are respectively the time slot, the place of departure slot, and the destination slot. The human-computer interaction server 200 obtains an entity "tomorrow" corresponding to the time slot, an entity "Shenzhen" corresponding to the place of departure slot, and an entity "Beijing" corresponding to the destination slot. Then, the human-computer interaction server 200 sends the service request A (for example, an air ticket booking request) to the server of Qunar.com. The air ticket booking request includes indication information of the dialog intention "Book an air ticket", a time "tomorrow", a place of departure "Shenzhen", and a destination "Beijing". The service result B obtained by the human-computer interaction server 200 may be information about a flight from Shenzhen to Beijing tomorrow. The indication information of the dialog intention "Book an air ticket" may be a name of the dialog intention "Book an air ticket", may be an ID of the dialog intention "Book an air ticket", or the like. The indication information of the dialog intention "Book an air ticket" may be used to indicate the intention.

S113: A server 301 of a third-party application 1 obtains the service result B based on the received service request B, and feeds back the service result B to the human-computer interaction server 200.

The server 301 of the third-party application 1 receives the service request B (for example, the ticket booking request) sent by the human-computer interaction server 200. Then, the server 301 of the third-party application 1 obtains a second service result (for example, the flight from Shenzhen to Beijing tomorrow) based on the service request B (for example, the ticket booking request) and a second service request parameter (for example, "tomorrow, Shenzhen, Beijing"). Subsequently, the server 301 of the third-party application 1 sends the service result B to the human-computer interaction server 200. Specifically, the server of the third-party application 1 may send the service result B to the human-computer interaction server 200 through the communication connection 102 shown in FIG. 2.

S114: The human-computer interaction server 200 receives the service result B, and sends the service result B to a terminal device 100.

The service result B sent by the human-computer interaction server 200 may be in the form of the web page. The service result B may alternatively be in a form of a parameter, and the corresponding web page is generated by the electronic device 100. This is not limited herein.

S115: The electronic device 100 receives the service result B, and outputs the service result B.

Specifically, the electronic device 100 may display the service result B on the screen in the form of the web page, so that the user views the service result B. The electronic device 100 may alternatively voice-broadcast the service result B to the user. This is not limited herein.

In the semantic parsing method provided in this embodiment of this application, the electronic device 100 may collect the first user sentence, and send the first user sentence to the human-computer interaction server 200. The human-computer interaction server 200 receives the first user sentence collected by the electronic device 100; the human-computer interaction server 200 extracts an entity of a first slot from the first user sentence; the first slot is a slot configured for a first intention; the first intention is an intention configured fora first skill, and one or more intentions are configured for the first skill; the first intention and the first skill are determined by the human-computer interaction server 200 based on the first user sentence, and match the service requirement expressed in the first user sentence; if the entity of the first slot is a pronoun, the human-computer interaction server 200 modifies the entity of the first slot to an entity of a second slot; the second slot is configured as an associated slot of the first slot, and the entity of the second slot is extracted by the human-computer interaction server 200 from the second user sentence; the second user sentence is collected by the electronic device 100 before the first user sentence; an intention for which the second slot is configured is a second intention, and the second intention is configured as an association intention of the first intention; a skill for which the second intention is configured is a second skill, and the second skill configured as an associated skill of the first skill; the human-computer interaction server 200 sends a first server request to a third-party application server 300, and obtains, from the third-party application server 300, a first service result generated in response to the first service request; the first service request includes indication information of the first intention and the entity of the first slot; the third-party application server 300 is an application server corresponding to the first skill; and the first service result is determined by the third-party application server 300 based on the first intention and the entity of the first slot. The human-computer interaction server 200 returns the first service result to the electronic device 100; and the first service result is output by the electronic device 100. The human-computer interaction server 200 does not need to ask the user for a meaning of a pronoun, thereby improving user experience.

Figure 16:
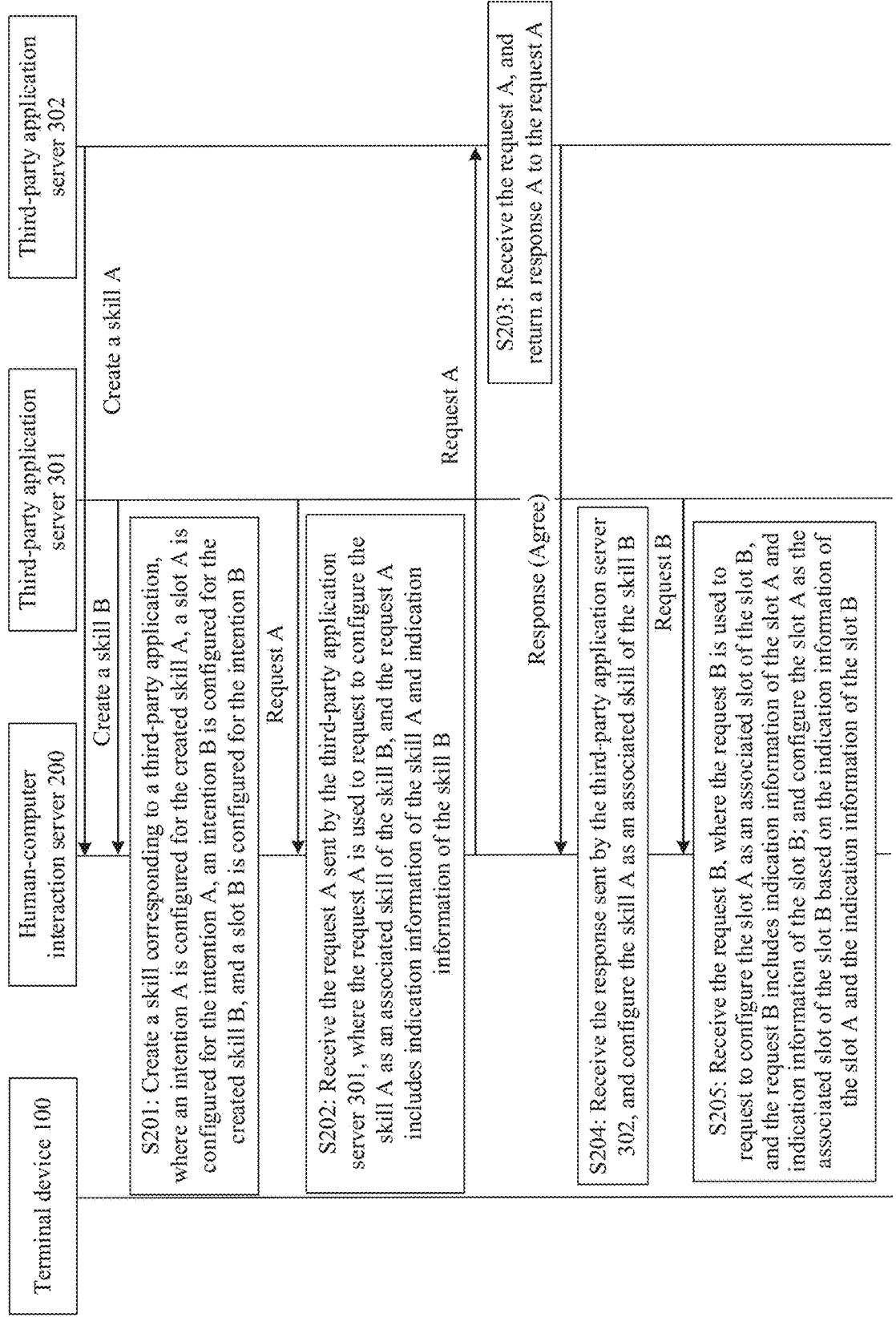
FIG. 16 is a schematic flowchart of another semantic parsing method according to an embodiment of this application.

Before step S101 in the semantic parsing method provided in FIG. 15A to FIG. 15D in this application, the semantic parsing method provided in this application further includes steps such as creating a skill, establishing a group of skills, and configuring skill sharing as shown in FIG. 16. The steps are as follows:

S201: A human-computer interaction server 200 creates a skill corresponding to a third-party application, where an intention A is configured for a created skill A, a slot A is configured for the intention A, an intention B is configured for a created skill B, and a slot B is configured for the intention B.

Specifically, the human-computer interaction server 200 may create the skill A (for example, a skill "Weather query") based on a skill (a skill "Query in Moji Weather") provided by a third-party application server 301 (for example, a server of Moji Weather), the intention A (for example, a dialog intention "Weather query") is configured for the skill A, and the slot A (for example, a "city slot") is configured for the intention A. The human-computer interaction server 200 may create a skill B (for example, a skill "Book an air ticket") based on a skill (for example, a skill "Book a ticket in Qunar.com") provided by a third-party application server 302 (for example, a server of Qunar.com), the intention B (for example, a dialog intention "Book an air ticket") is configured for the skill B, and the slot B (for example, a "destination slot") is configured for the intention B. The third-party application may be an application "Moji Weather", or may be an application "Taobao", an application "Jingdong", or the like. This is not limited herein. For how to create a skill, refer to the foregoing description of the skill creation process shown in FIG. 4A to FIG. 4D.

S202-S204: The human-computer interaction server 200 configures the skill A as an associated skill of the skill B.

Specifically, the human-computer interaction server 200 receives a request A sent by the third-party application server 301 (for example, the server of Moji Weather) that provides the skill A (for example, the skill "Moji Weather"), The request A is used to configure the skill A (for example, the skill "Moji Weather") as the associated skill of the skill B (for example, the skill "Qunar.com"). The request A includes indication information of the skill A and indication information of the skill B. The indication information of the skill A may be a name of the skill A, or may be information that may indicate the skill A, for example, an ID of the skill A. The indication information of the skill B may be a name of the skill B, or may be information that may indicate the skill B, for example, an ID of the skill B. The human-computer interaction server 200 sends the request A, the indication information of the skill A, and the indication information of the skill B to the third party application server 302 (for example, the server of Qunar.com) that provides the skill B (for example, the skill "Qunar.com"). The third-party application server 302 receives the request A. and returns a response A (for example, "agree" the request) to the request A. After receiving the response (for example, "agree"), the human-computer interaction server 200 configures the skill A as the associated skill of the skill B. Then, the human-computer interaction server 200 stores an association relationship between the skill A and the skill B.

For a skill association process in which the human-computer interaction server 200 configures the skill A (for example, the skill "Moji Weather") as the associated skill of the skill B (for example, the skill "Qunar.com"), refer to the process in which the skill "Moji Weather" is configured as an association skill of the skill "Qunar.com" in FIG. 7A-1 and FIG. 7A-2 and FIG. 7B-1 and FIG. 7B-2.

S205: The human-computer interaction server 200 receives a request B sent by the third-party application server 302, where the request B is used to request the human-computer interaction server 200 to configure the slot A as an associated slot of the slot B. The request B includes indication information of the slot A and indication information of the slot B.

Specifically, the human-computer interaction server 200 configures the slot A (for example, the city slot) as the associated slot of the slot B (for example, the destination slot) based on the indication information of the slot A and the indication information of the slot B. In other words, an entity sharing configuration is performed on the slot A and the slot B. The indication information of the slot A may be a slot name of the slot A, or may be information such as an ID of the slot A. The indication information of the slot B may be a slot name of the slot B, or may be information such as an ID of the slot B. A process of configuring a shared entity is shown in FIG. 8 to FIG. 10. Details are not described herein again.

Optionally, if an entity configured for the slot A (for example, the city slot) comes from a system word library, the human-computer interaction server 200 associates the slot name of the slot B (for example, the destination slot) with the slot name of the slot A. The system word library makes all slots whose configured entities come from the system word library have a same entity set. An entity configured for the slot B comes from the system word library. Alternatively, if the entity configured for the slot A (for example, the city slot) comes from a first user-defined word library, the human-computer interaction server 200 associates the slot name of the slot B (for example, the destination slot) with the slot name of the slot A. The human-computer interaction server 200 associates the first user-defined word library with a second user-defined word library. The first user-defined word library is an entity set configured for the slot A. The second user-defined word library is an entity set configured for the slot B. The entity set configured for the slot A is different from the entity set configured for the slot B.

In this embodiment provided in this application, the human-computer interaction server performs a configuration such as creating a skill, establishing a group of skills, or configuring skill sharing. When a corresponding slot in a user sentence received by the human-computer interaction server is a pronoun, the human-computer interaction server may replace the pronoun by obtaining an entity of an associated slot. Therefore, the human-computer interaction server may learn of a meaning of the pronoun.

In addition, this application further provides another semantic parsing method. When a human-computer interaction server 200 does not extract an entity corresponding to a second slot in a second input, and no shared entity of the second slot is configured in the human-computer interaction server 200, this method may be used to find a candidate entity by using a score sorting model, to fill the second slot.

Figure 17:
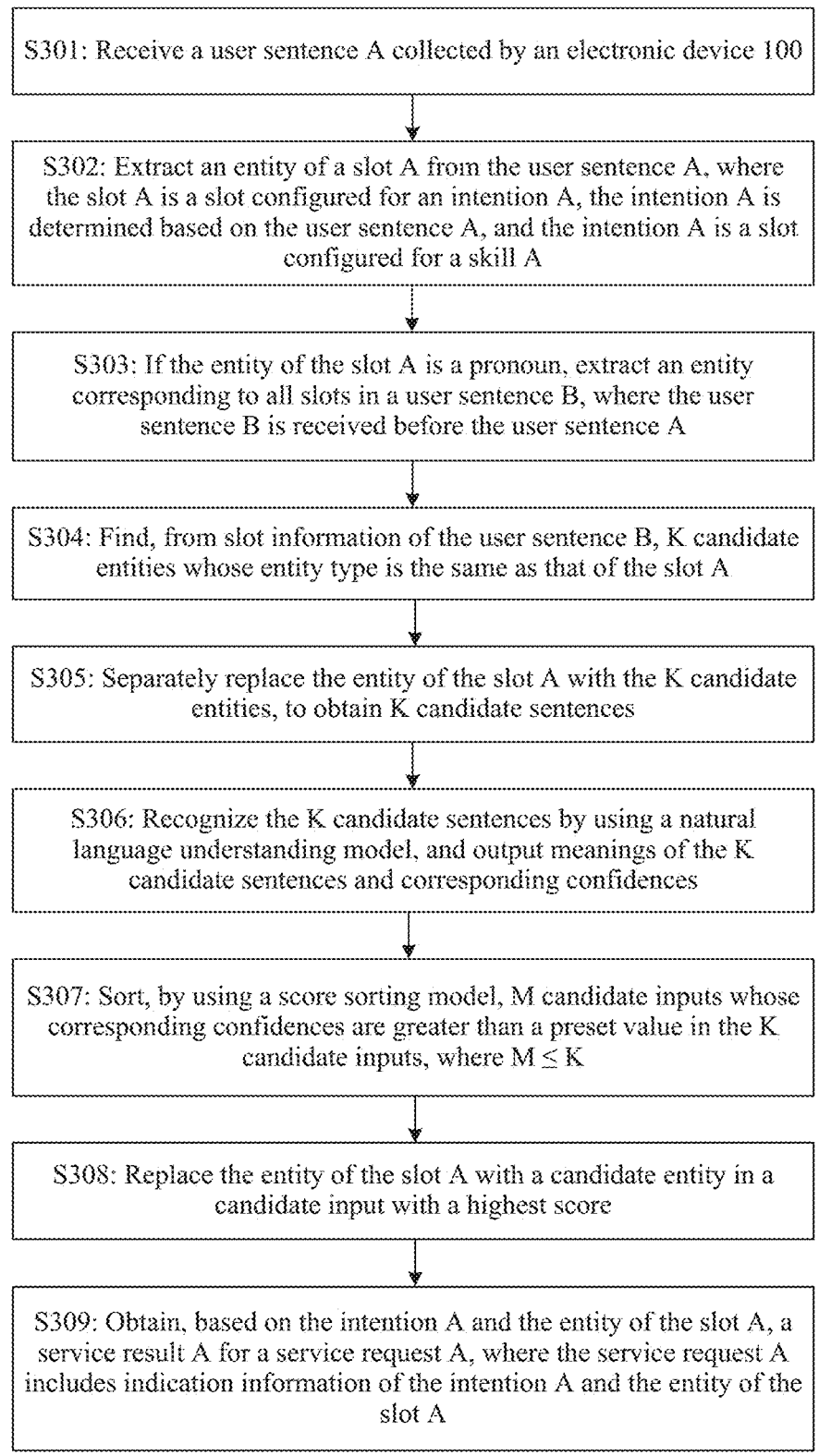
FIG. 17 is a schematic flowchart of another semantic parsing method according to an embodiment of this application.

FIG. 17 shows an overall process of another human-computer dialog method according to this application. Details are as follows:

S301: A human-computer interaction server 200 receives a user sentence A collected by an electronic device 100.

That the human-computer interaction server 200 receives the user sentence A collected by the electronic device 100 is described in step S102. Details are not described herein again. The user sentence A collected by the electronic device 100 is described in step S101. Details are not described herein again.

S302: The human-computer interaction server 200 extracts an entity of a slot from the user sentence A, where the slot A is a slot configured for the intention A, the intention A is determined based on the user sentence A, and the intention A is a slot configured for the skill A.

For step 302, refer to step S103. Details are not described herein again.

S303-S308: Find a candidate entity by using a score sorting model, and replace an entity of a second slot with the candidate entity.

S303: If the entity of the slot A is a pronoun, the human-computer interaction server 200 extracts an entity corresponding to all slots in a user sentence B, where the user sentence B is received by the human-computer interaction server 200 before the user sentence A.

The human-computer interaction server 200 extracts a slot in the user sentence B and an entity corresponding to the slot that are stored in a dialog management module. For example, it is assumed that the user sentence B stored in the human-computer interaction server 200 is "What's the weather like in Beijing tomorrow", and slots in the user sentence B are a time slot and a city slot. An entity corresponding, to the time slot is "tomorrow", and an entity corresponding to the city slot is "Beijing". The human-computer interaction server 200 extracts the entity "tomorrow" of the time slot and the entity "Beijing" of the city slot. The user sentence B may be a sentence in a single-round dialog between a user and the human-computer interaction server 200, or may be a plurality of sentences in a multi-round dialog between a user and the human-computer interaction server 200. This is not limited in this embodiment of this application.

S304: The human-computer interaction server 200 finds K candidate entities whose entity information type is the same as that of the slot A.

The human-computer interaction server 200 selects a stored slot and corresponding entity information based on information about the slot A. For example, if the entity corresponding to the slot A is a location, the selected candidate entity is also an entity representing a location. In this way, the K candidate entities are obtained. Herein, K is a natural number greater than 1. For example, it is assumed that the slot A is a city slot, and the corresponding entity needs to be of a location type. If the slots and corresponding entities that are extracted by the human-computer interaction server 200 from the user sentence B are "time slot, tomorrow", "time slot, today", "place of departure slot, Beijing", "destination slot, Shanghai", and "city slot, Shenzhen". Then, the human-computer interaction server 200 selects "Beijing", "Shanghai", and "Shenzhen" as candidate entities.

S305: The human-computer interaction server 200 separately replaces the entity of the slot A with the K candidate entities, to obtain the K candidate sentences.

The human-computer interaction server 200 separately fills the slot A in the user sentence A with the K candidate entities, to obtain the K candidate sentences. For example, it is assumed that the user sentence A is "Book an air ticket to go there tomorrow" An intention of the user sentence A is to book a ticket. Slots of a ticket booking intention are respectively a time slot, a place of departure slot, and a destination slot. An entity corresponding to the time slot in the user sentence A is "tomorrow", an entity corresponding to the place of departure slot is not reflected, but is considered by default as a city obtained through GPS positioning (for example, Shenzhen), and an entity corresponding to the destination slot is only the pronoun "there". Therefore, the human-computer interaction server 200 needs to find the entity corresponding to the destination slot. It is assumed that candidate entities found by the human-computer interaction server 200 in step S303 are "Beijing" and "Shanghai". Then, candidate sentences are respectively "Book an air ticket to Beijing tomorrow" and "Book an air ticket to Shanghai tomorrow".

S306: The human-computer interaction server 200 recognizes the K candidate sentences by using a natural language understanding model, and outputs meanings of the K candidate sentences and corresponding confidences.

For example, it is assumed that a candidate sentence. 1 is "Book an air ticket to Beijing tomorrow" A candidate sentence 2 is "Book an air ticket to Shanghai tomorrow". Then, the human-computer interaction server 200 outputs meanings and confidences of the candidate sentence 1 and the candidate sentence 2 by using the natural language understanding model. The candidate sentence 1 has a confidence of 0.9, and the candidate sentence 2 has a confidence of 0.9.

S307: The human-computer interaction server 200 sorts, by using a score sorting model, M candidate sentences whose corresponding confidences are greater than a preset value in the K candidate sentences, where M≤K.

For example, it is assumed that a confidence threshold is 0.85. In this case, the confidences of the candidate sentence 1 and the candidate sentence 2 in step S150 are both greater than the confidence threshold. The human-computer interaction server 200 then sorts the candidate sentences 1 and the candidate sentences 2 by using the score sorting model. In this case, K=2, and M=2, The score sorting model may be a model constructed by using a neural network, or may be a model constructed by using a sort algorithm such as a bubble sort algorithm and a selection sort algorithm. This is not limited herein. Training data of the score sorting model may be a questionnaire from the Internet. A dialog scenario is provided in the questionnaire. For example, the user first says "Book an air ticket from Shenzhen to Beijing", and then the user says "What's the weather like there" next. Finally, an internet friend scores "Shenzhen" and "Beijing" that "there" said by the user may mean. Then, statistics about a result with a score given by the internet friend is collected, and a result with a high score is selected as an output of the score sorting model.

S308: The human-computer interaction server 200 replaces the entity of the slot A with a candidate entity in a candidate sentence with a highest score.

Specifically, it is assumed that a score of the candidate sentence 1 mentioned in S150 is 90 points, and a score of the candidate sentence 2 is 95 points. Then, the human-computer interaction server 200 selects "Shanghai" to fill the slot A.

S309: The human-computer interaction server 200 obtains, based on the intention A and the entity of the slot A, a service result A for a service request A, where the service request A includes indication information of the intention A and the entity of the slot A.

For step S309, refer to step S104, Details are not described herein again.

Based on the another semantic parsing method shown in FIG. 17, FIG. 18A to FIG. 18C show an example application of the method.

S401: The electronic device 100 obtains a user sentence 1803 "Hail a vehicle to go there now".

The user sentence 1803 currently obtained by the electronic device 100 is "Hail a vehicle to go there now". The electronic device 100 further provides a human-computer interaction service for a user previously. The electronic device 100 in FIG. 18A and FIG. 18C receives a user sentence 1801 before receiving the user sentence 1803, and provides an execution result 1802 based on the user sentence 1801.

S402: A human-computer interaction server 200 receives the user sentence 1803 sent by the electronic device 100, analyzes a skill and an intention by using a semantic understanding module, and extracts a slot.

After receiving the user sentence 1803, the human-computer interaction server 200 analyzes a text by using the semantic understanding module. The human-computer interaction server 200 learns, through analysis, that a skill corresponding to the input sentence 1803 is "Vehicle hailing service", an intention is "Hail a vehicle", and slots are "Time" and "Vehicle hailing destination", However, an entity of the slot "Vehicle hailing destination" is a pronoun "there". The human-computer interaction server 200 needs to query whether the skill "Vehicle hailing service" has a sharing skill. A shared entity of a location type can be extracted by using the sharing skill, to replace the entity "there" corresponding to the slot "Vehicle hailing destination".

S403: The human-computer interaction server 200 does not obtain the sharing skill through query, and invokes a dialog management module to query a slot and entity information in the user sentence 1801.

The human-computer interaction server 200 first needs to query whether there is a sharing skill, and invokes a historical-round dialog in the dialog management module if there is no sharing skill. For example, the historical-round dialog provided in this embodiment is 1801 "Check a road condition from Huawei to KFC by using Amap". An entity corresponding to a slot "Place of departure" in 1701 is "Huawei", and an entity corresponding to a slot "Destination" is "KFC". Both "Huawei" and "KFC" are entities of a location type, and are of a same type as the entity of "Vehicle hailing destination".

S404: The human-computer interaction server 200 invokes the dialog management module to replace the entity "there" of the slot "Vehicle hailing destination" in the user sentence 1803 with the entity in the user sentence 1801, to obtain a candidate sentence.

The human-computer interaction server 200 invokes the dialog management module to separately replace the slot "Vehicle hailing destination" in the user sentence 1803 with the entities "Huawei" and "KFC", to obtain a candidate sentence 1 "Hail a vehicle to Huawei" and a candidate sentence 2 "Hail a vehicle to KFC".

S405: The human-computer interaction server 200 performs semantic recognition on the candidate sentence by using the semantic understanding module.

The human-computer interaction server 200 obtains semantic recognition results and confidences of the candidate sentence 1 and the candidate sentence 2 by using the semantic understanding module 303. Both confidences obtained by replacing the entity of the slot "Vehicle hailing destination" with "Huawei" and "KFC" are 0.9. The human-computer interaction server 200 may preset a confidence threshold, and filter out a candidate sentence whose confidence is lower than the preset confidence threshold. In this embodiment of this application, the preset confidence threshold is 0.8, and both confidences of the candidate sentence 1 and the candidate sentence 2 are higher than the preset confidence threshold.

S406: The human-computer interaction server 200 scores and sorts, by using a score sorting model in the dialog management module, candidate inputs whose confidences are higher than the confidence threshold, and selects an entity in a candidate sentence with a highest score to replace the entity "there" of the slot "Vehicle hailing destination".

The human-computer interaction server 200 uses the candidate sentence 1 and the candidate sentence 2 as inputs into the score sorting model, to obtain a score sorting result. As shown in step S206 in FIG. 18C, the candidate sentence 1 "Hail a vehicle to KFC" is ranked the first and has a score of 98, and the candidate sentence 2 "Hail a vehicle to Huawei" is ranked the second and has a score of 95. Therefore. "KFC" that is ranked the first and that has a higher score is used as an entity of the slot "Vehicle hailing destination", and a corresponding vehicle hailing service is executed.

S407: The human-computer interaction server 200 converts a received vehicle hailing service execution result into a natural language by using a natural language generation module, and feeds back the natural language to the user.

The human-computer interaction server 200 sends a vehicle hailing intention and slot information to a server corresponding to a vehicle hailing skill, and obtains a vehicle hailing result returned by the server of the vehicle hailing skill. The natural language generation module in the human-computer interaction server 200 converts the vehicle hailing result into a natural language, and sends the natural language to the electronic device 100.

S408: The electronic device 100 displays the vehicle hailing service result to the user.

The electronic device 100 displays a vehicle hailing service page or voice-broadcasts the vehicle hailing result. This is not limited herein.

According to the semantic parsing method provided in this embodiment of this application, the human-computer interaction server finds an entity by using the score sorting model, to replace a pronoun in a user sentence. Therefore, the human-computer interaction server may learn of a meaning of the pronoun in the user sentence without a need to ask the user, thereby, improving user experience.

It may be understood that, to achieve the foregoing functions, the foregoing terminal includes a corresponding hardware structure and/or software module for implementing each function. A person skilled in the art should easily be aware that, units and algorithm steps in the examples described with reference to the embodiments disclosed in this specification may be implemented by using hardware or a combination of hardware and computer software in the embodiments of this application. Whether a function is performed by using hardware or hardware driven by computer software depends on a particular application and design constraint of the technical solutions. A person skilled in the art may use different methods to implement the described functions for each particular application, but it should not be considered that the implementation goes beyond the scope of the embodiments of the present invention.

In the embodiments of this application, the foregoing terminal and the like may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that, division into modules in the embodiments of the present invention is an example, and is only logical function division. There may be another division manner in an actual implementation.

Figure 18B:
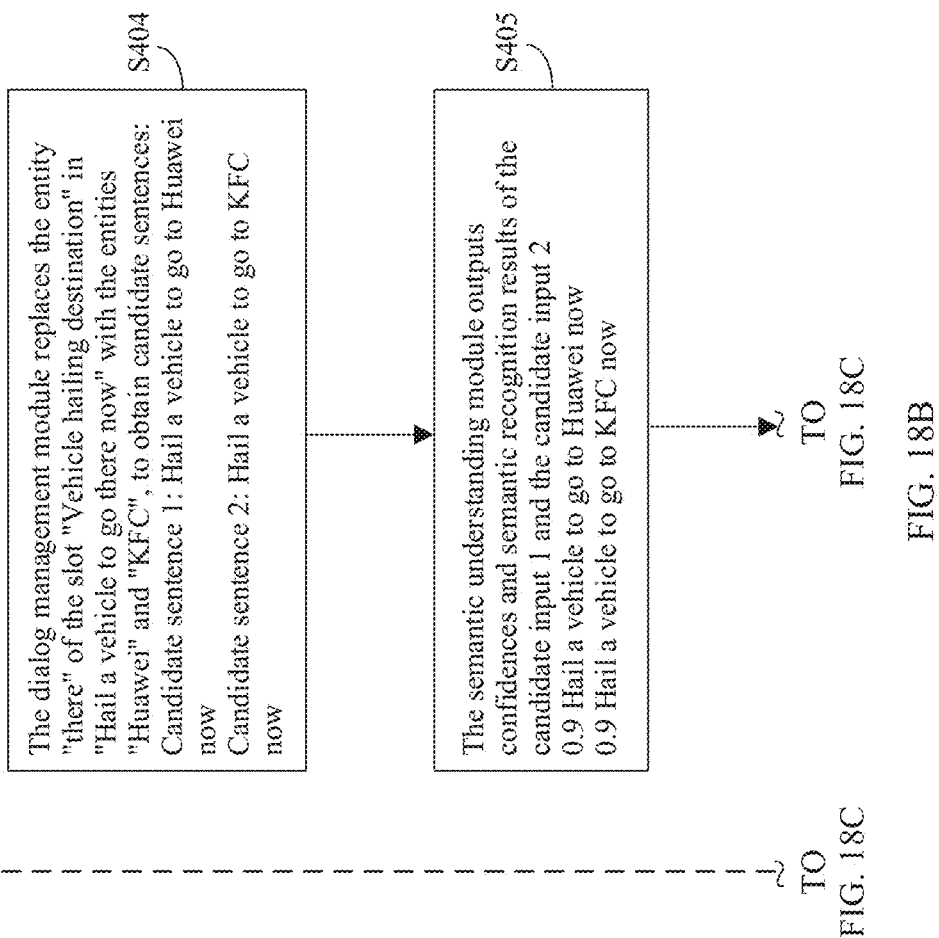
Figure 18C:
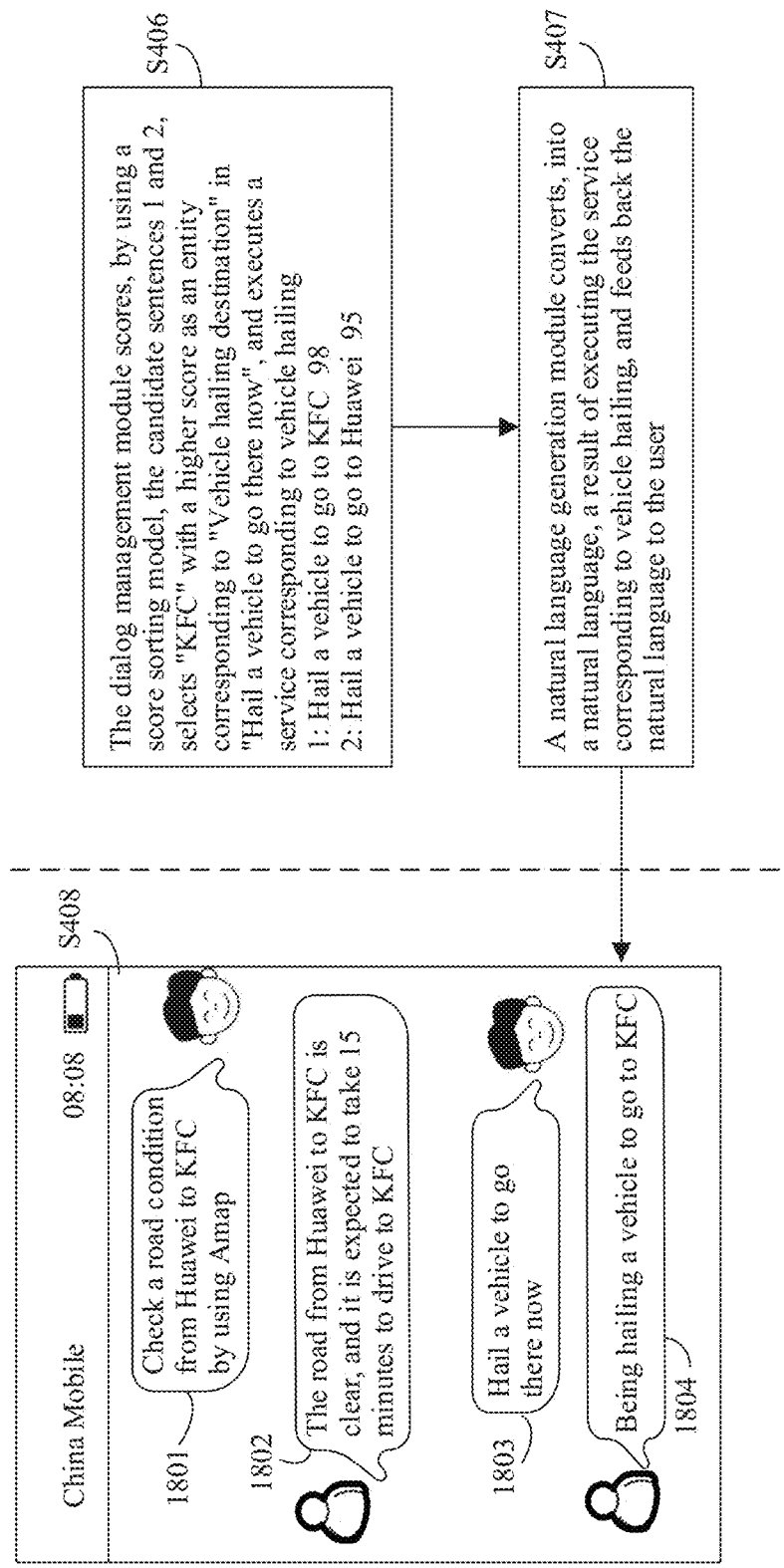
Figure 19:
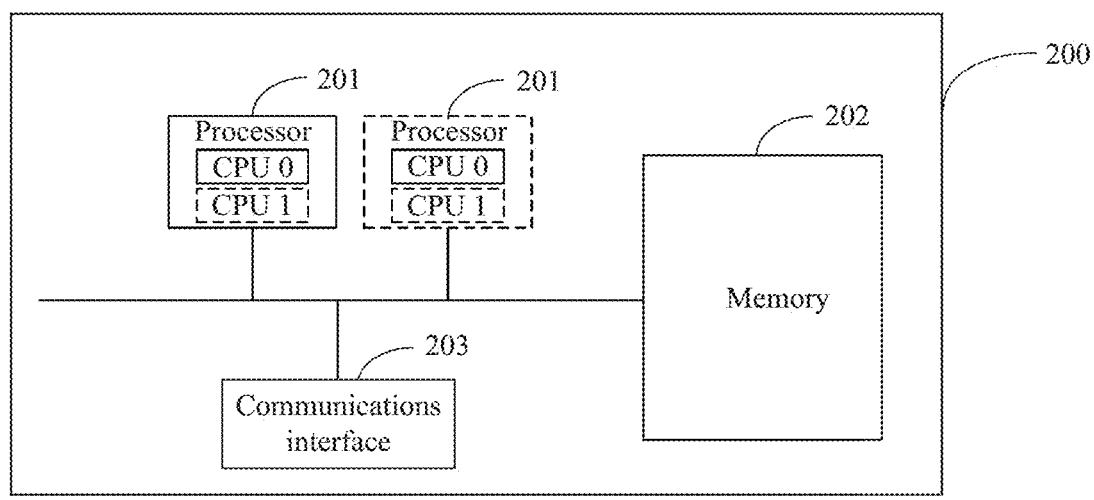
FIG. 19 is a schematic structural diagram of a server according to an embodiment of this application.

FIG. 18A to FIG. 18C are a schematic structural diagram of hardware of a server 200 according to an embodiment of this application. The server 200 includes at least one processor 201, at least one memory 202, and at least one communications interface 203. Optionally, the server 200 may further include an output device and an input device, and the output device and the input device are not shown in the figure.

The processor 201, the memory 202, and the communications interface 203 are connected by using a bus. The processor 201 may be a general-purpose central processing unit (Central Processing Unit, CPU), a microprocessor, an application-specific integrated circuit (Application-Specific Integrated Circuit, ASIC), or one or more integrated circuits that are configured to control program execution of the solutions of this application. The processor 201 may alternatively include a plurality of CPUs, and the processor 201 may be a single-core (single-CPU) processor or a multi-core (multi-CPU) processor. The processor herein may be one or more devices, circuits, and/or processing cores configured to process data (for example, a computer program instruction).

The memory 202 may be a read-only memory (Read-Only Memory, ROM) or another type of static storage device that can store static information and instructions, or a random access memory (Random Access Memory, RAM) or another type of dynamic storage device that can store information and instructions; or may be an electrically erasable programmable read-only memory (Electrically Erasable Programmable Read-Only Memory, EEPROM), a compact disc read-only memory (Compact Disc Read-Only Memory, CD-ROM), or another compact disc storage, an optical disc storage (including a compact disc, a laser disc, an optical disc, a digital versatile disc, and a Blu-ray disc, or the like), a disk storage medium or another disk storage device, or any other medium that can be used to carry or store expected program code in an instruction or data structure form and that can be accessed by a computer. However, the memory 202 is not limited herein. The memory 202 may exist independently and is connected to the processor 201 by using the bus. Alternatively, the memory 202 may be integrated with the processor 201. The memory 202 is configured to store program code used to execute the solutions of this application, and the processor 201 controls the execution. The processor 201 is configured to execute computer program code stored in the memory 202, to implement the human-computer interaction method in the embodiments of this application.

The communications interface 203 may be configured to communicate with another device or communications network, for example, the Ethernet or a wireless local area network (wireless local area networks, WLAN).

When communicating with the processor, the output device may display information in a plurality of manners. For example, the output device may be a liquid crystal display (Liquid Crystal Display, LCD), a light emitting diode (Light Emitting Diode, LED) display device, a cathode ray tube (Cathode Ray Tube, CRT) display device, or a projector (projector). When communicating with the processor, the input device may receive an input from a user in a plurality of manners. For example, the input device may be a mouse, a keyboard, a touchscreen device, or a sensing device.

Figure 20:
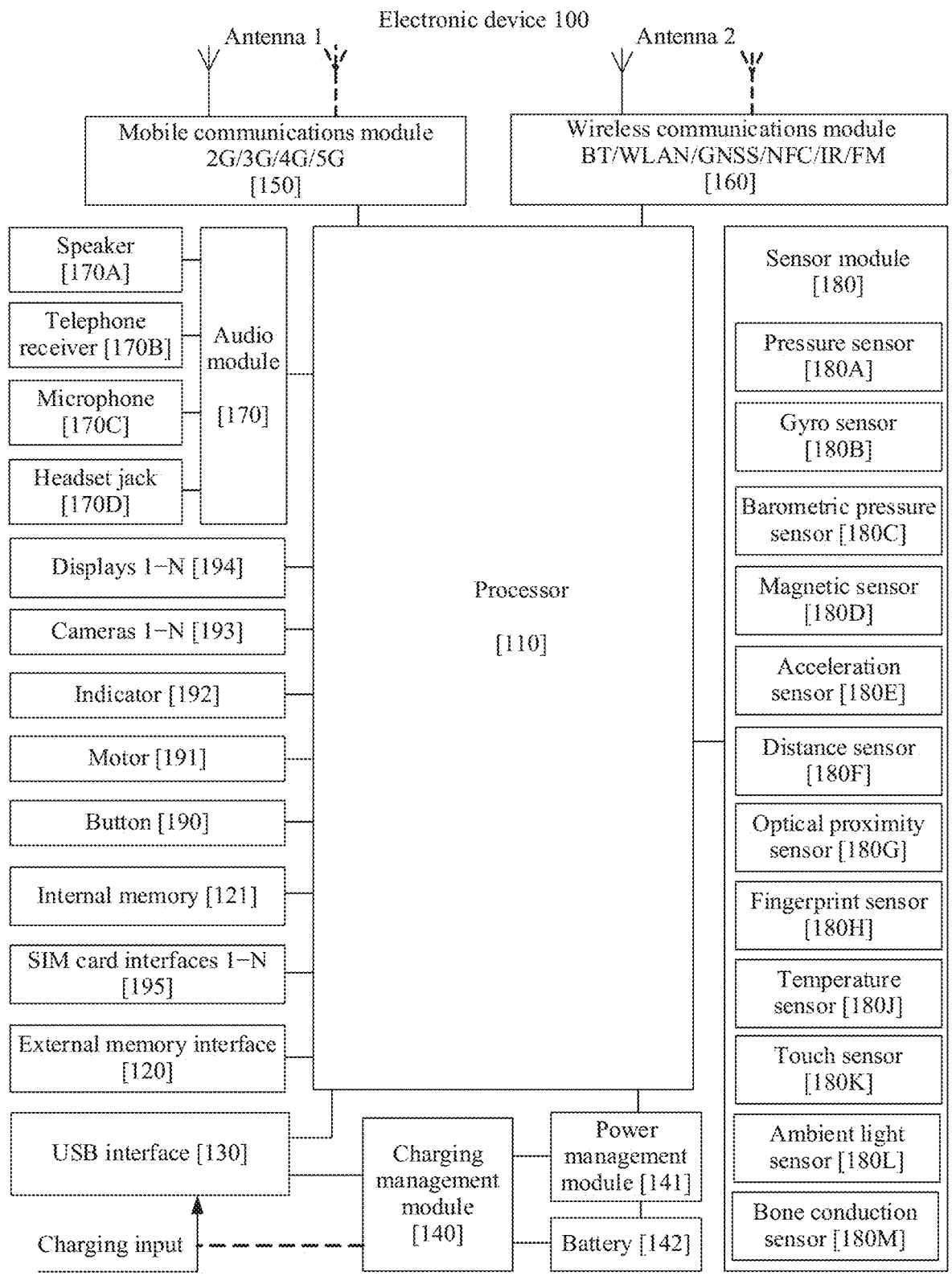
FIG. 20 is a schematic structural diagram of an electronic device according to an embodiment of this application.

FIG. 20 is a schematic structural diagram of an electronic device 100 according to an embodiment of this application. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 1800, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that a structure illustrated in this embodiment of the present invention does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on instruction operation code and a time sequence signal, and complete control of instruction fetching and instruction execution.

The memory may be further disposed in the processor 110, and is configured to store instructions and data. In some embodiments, the memory in the processor 110 is a cache memory. The memory may store instructions or data that is just used or repeatedly used by the processor 110. If the processor 110 needs to use the instructions or data again, the instructions or data may be directly invoked from the memory. In this case, repeated access is avoided, a waiting time of the processor 110 is reduced, and efficiency of a system is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general purpose input/output (general purpose input/output, GPIO) interface, a subscriber identity module (subscriber identity module, SIM) interface, and/or a universal serial bus (universal serial bus, USB) interface, or the like.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a camera flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to perform audio communication, to sample, quantize, and encode an analog signal. In some embodiments, the audio module 170 and the wireless communications module 160 may be coupled through a PCM bus interface. In some embodiments, the audio module 170 may transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a bidirectional communications bus. The UART interface converts to-be-transmitted data between serial communication and parallel communication. In some embodiments, the UART interface is usually configured to connect the processor 110 and the wireless communications module 160. For example, the processor 110 communicates with a Bluetooth module in the wireless communications module 160 through the UART interface, to implement a. Bluetooth function. In some embodiments, the audio module 170 may transfer an audio signal to the wireless communications module 160 through the UART interface, to implement a function of playing music by using a. Bluetooth headset.

The MIPI interface may be configured to connect the processor 110 and a peripheral component such as the display 194 and the camera 193. The MIPI interface includes a camera serial interface (camera serial interface, CSI), a display serial interface (display serial interface, DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface can be configured by using software. The GPIO interface may be configured as a control signal, or may be configured as a data signal. In some embodiments, the GPIO interface may be configured to connect the processor 110 and the camera 193, the display 194, the wireless communications module 160, the audio module 170, the sensor module 180, or the like. The GPIO interface may be further configured as an I2C interface, an I2S interface, a UART interface, an MIPI interface, or the like.

The USB interface 130 is an interface that meets a USB standard specification, and may be specifically a mini USB interface, a micro USB interface, a USB Type-C interface, or the like. The USB interface 130 may be configured to be connected to the charger to charge the electronic device 100, or may be configured to transmit data between the electronic device 100 and a peripheral device. The USB interface 130 may also be configured to be connected to a headset, to play audio by using the headset. The interface may be further configured to be connected to another electronic device, for example, an AR device.

It may be understood that an interface connection relationship between modules illustrated in this embodiment of the present invention is merely an example for description, and does not constitute a limitation on a structure of the electronic device 100. In some other embodiments of this application, different interface connection manners in the foregoing embodiments or a combination of a plurality of interface connection manners may alternatively be used for the electronic device 100.

The charging management nodule 140 is configured to receive a charging input from the charger. The charger may be a wireless charger, or may be a wired charger. In some wired charging embodiments, the charging management module 140 may receive a charging input from the wired charger through the USB interface 130. In some wireless charging embodiments, the charging management module 140 may receive a wireless charging input by using a wireless charging coil of the electronic device 100. While charging the battery 142, the charging management module 140 may further supply power to the electronic device by using the power management module 141.

The power management module 141 is configured to be connected to the battery 142, the charging management module 140, and the processor 110. The power management module 141 receives an input from the battery 142 and/or the charging management module 140, and supplies power to the processor 110, the internal memory 121, the external memory, the display 194, the camera 193, the wireless communications module 160, or the like. The power management module 141 may be further configured to monitor a parameter such as a battery capacity, a quantity of battery cycles, and a battery health status (leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, or the like.

The antenna 1 and the antenna 2 are configured to transmit and receive an electromagnetic wave signal. Each antenna of the electronic device 100 may be configured to cover one or more communications frequency bands. Different antennas may be multiplexed, to improve antenna utilization. For example, the antenna 1 may be multiplexed as a diversity antenna of the wireless local area network. In some other embodiments, the antenna may be used in combination with a tuning switch.

The mobile communications module 150 may provide a solution to wireless communication including 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the received electromagnetic wave to the modem processor for demodulation. The mobile communications module 150 may further amplify a signal obtained through modulation by the modem processor, and convert the signal into an electromagnetic wave for radiation through the antenna 1. In some embodiments, at least some function modules of the mobile communications module 150 may be disposed in the processor 110. In some embodiments, the at least some function modules of the mobile communications module 150 and at least some function modules of the processor 110 may be disposed in a same device.

The modem processor may include a modulator and a demodulator. The modulator is configured to modulate a to-be-sent low frequency baseband signal into a medium and high frequency signal. The demodulator is configured to demodulate the received electromagnetic wave signal into a low frequency baseband signal. Then, the demodulator transmits, to the baseband processor for processing, the low frequency baseband signal obtained through demodulation. After being processed by the baseband processor, the low frequency baseband signal is transferred to the application processor. The application processor outputs a sound signal by using an audio device (not limited to the speaker 170A, the telephone receiver 170B, or the like), or displays an image or a video by using the display 194. In some embodiments, the modem processor may be a separate device. In some other embodiments, the modem processor may be independent of the processor 110, and the modem processor and the mobile communications module 150 or another function module are disposed in a same device.

The wireless communications module 160 may provide a solution to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like that is applied to the electronic device 100. The wireless communications module 160 may be one or more devices that integrate at least one communication processing module. The wireless communications module 160 receives an electromagnetic wave through the antenna 2, performs modulation and filtering processing on an electromagnetic wave signal, and sends the processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is configured to perform graphics rendering. The processor 110 may include one or more GPUs, and execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED) a flexible light-emitting diode (flex light-emitting diode, FLED), a miniLED, a microLED, a micro-OLED, a quantum dot light emitting diode (quantum dot light emitting diode, QLED), or the like. In some embodiments, the electronic device 100 may include one or N displays 194, where N is a positive integer greater than 1.

The electronic device 100 may implement the photographing function by using the ISP, the camera 193, the video codec, the GPU, the display 194, the application processor, or the like.

The ISP is configured to process data fed back by the camera 193, For example, during photographing, a shutter is enabled, light is transferred to a photosensitive element of the camera by using a lens, an optical signal is converted into an electrical signal, and the photosensitive element of the camera transfers the electrical signal to the ISP for processing, to convert the electrical signal into an image visible to an eye. The ISP may further perform algorithm optimization on noise, brightness, and a skin color of the image. The ISP may further optimize a parameter such as exposure and a color temperature of a photographing scenario. In some embodiments, the ISP may be disposed in the camera 193.

The camera 193 is configured to capture a static image or a video. An optical image of an object is generated by using the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal into an electrical signal, and then transmits the electrical signal to the ISP, to convert the electrical signal into a digital image signal. The ISP outputs the digital image signal to the DSP for processing. The DSP converts the digital image signal into a standard image signal in a form of RGB, YUV, or the like. In some embodiments, the electronic device 100 may include one or N cameras 193, where N is a positive integer greater than 1.

The digital signal processor is configured to process a digital signal, and may process another digital signal other than the digital image signal. For example, when the electronic device 100 selects a frequency, the digital signal processor is configured to perform fourier transformation on frequency energy.

The video codec is configured to compress or decompress a digital video. The electronic device 100 may support one or more video codecs. In this case, the electronic device 100 may play or record videos in a plurality of encoding formats, for example, moving picture experts group (moving picture experts group, MPEG)-1, MPEG-2, MPEG-3, and MPEG-4.

The NPU is a neural network (neural-network, NN) computing processor, and with reference to a biological neural network structure, for example, a transfer mode between human brain neurons, the NPU quickly processes input information, and can further continuously perform self-learning. The NPU may be used to implement application such as intelligent cognition of the electronic device 100, for example, image recognition, face recognition, speech recognition, and text understanding.

The external memory interface 120 may be configured to be connected to an external memory card, for example, a Micro SD card, to expand a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to execute various function applications and data processing of the electronic device 100. The internal memory 121 may include a program storage area and a data storage area. The program storage area may store an operating system, an application (for example, a sound playing function or an image playing function) required by at least one function, and the like. The data storage area may store data (for example, audio data or a phone book) created in a process of using the electronic device 100. In addition, the internal memory 121 may include a high-speed random access memory, and may further include a nonvolatile memory, for example, at least one magnetic disk storage device, a flash storage device, or a universal flash storage (universal flash storage, UFS).

The electronic device 100 may implement an audio function by using the audio module 170, the speaker 170A, the telephone receiver 170B, the microphone 170C, the headset jack 170D, the application processor, or the like, for example, playing music or a recording.

The audio module 170 is configured to convert digital audio information into an analog audio signal for output, and is further configured to convert an analog audio input into a digital audio signal. The audio module 170 may be further configured to encode and decode the audio signal. In some embodiments, the audio module 170 may be disposed in the processor 110, or some function modules of the audio module 170 may be disposed in the processor 110.

The speaker 170A, also referred to as "horn", is configured to convert an audio electrical signal into a sound signal. The electronic device 100 may be used to listen to music or answer a call in a hands-free mode through the speaker 170A.

The telephone receiver 170B, also referred to as an "earpiece", is configured to convert an audio electrical signal into a sound signal. When a call is answered or audio information is listened to by using the electronic device 100, the telephone receiver 170B may be put close to a human ear to listen to a voice.

The microphone 170C, also referred to as a "mike" or a "microphone", is configured to convert, a sound signal into an electrical signal. When making a call or sending audio information, the user may make a sound near the microphone 170C through the mouth of the user, to enter a sound signal into the microphone 170C. The electronic device 100 may be provided with at least one microphone 170C. In some other embodiments, the electronic device 100 may be provided with two microphones 170C, to implement a noise reduction function in addition to collecting a sound signal. In some other embodiments, the electronic device 100 may be further provided with three, four, or more microphones 170C, to collect a sound signal, reduce noise, identify a sound source, implement a directional recording function, and the like. The headset jack 170D is configured to be connected to a wired headset. The headset jack 170D may be a USB interface 130, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The electronic device 100 determines pressure intensity based on the change in the capacitance. When a touch operation acts on the display 194, the electronic device 100 detects intensity of the touch operation by using the pressure sensor 180A. The electronic device 100 may also calculate a touch location based on a detection signal of the pressure sensor 180A. In some embodiments, touch operations that act on a same touch location but have different touch operation intensity may correspond to different operation instructions. For example, when a touch operation whose touch operation intensity is less than a first pressure threshold acts on an SMS message application icon, an instruction for viewing an SMS message is executed. For example, when a touch operation whose touch operation intensity is greater than or equal to the first pressure threshold acts on the SMS message application icon, an instruction for creating a new SMS message is executed.

The gyro sensor 180B may be configured to determine a moving posture of the electronic device 100. In some embodiments, an angular velocity of the electronic device 100 around three axes (to be specific, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion sensing game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or an opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is an object near the electronic device 100. The electronic device 100 may detect, by using the optical proximity sensor 180G, that the user holds the electronic device 100 close to an ear to make a call, to automatically perform screen-off for power saving. The optical proximity sensor 180E may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G, to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when a temperature reported by the temperature sensor 180J exceeds a threshold, the electronic device 100 lowers performance of a processor located near the temperature sensor 180J, to reduce power consumption for thermal protection. In some other embodiments, when the temperature is lower than another threshold, the electronic device 100 heats the battery 142, to prevent the electronic device 100 from being shut down abnormally due to a low temperature. In some other embodiments, when the temperature is lower than still another threshold, the electronic device 100 boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation acting on or near the touch sensor 180K. The touch sensor may transfer the detected touch operation to the application processor, to determine a touch event type. A visual output related to the touch operation may be provided by using the display 194. In some other embodiments, the touch sensor 180K may also be disposed on a surface of the electronic device 100, and is located on a location different from that of the display 194.

The bone conduction sensor 180M may obtain a vibration signal. In some embodiments, the bone conduction sensor 180M may obtain a vibration signal of a vibration hone of a human vocal-cord part. The bone conduction sensor 180M may also contact a pulse of a human body to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing or audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, or the like.

The SIM card interface 195 is configured to be connected to a SIM card. The SIM card may be inserted into the SIM card interface 195 or detached from the SIM card interface 195, to implement contact with or separation from the electronic device 100, The electronic device 100 may support one or N SIM card interfaces, and N is a positive integer greater than 1. The SIM card interface 195 may support a nano-SIM card, a micro-SIM card, a SIM card, and the like. A plurality of cards may be inserted into a same SIM card interface 195 at a same time. The plurality of cards may be of a same type or different types. The SIM card interface 195 may be compatible with different types of SIM cards. The SIM card interface 195 may further be compatible with an external memory card. The electronic device 100 interacts with a network by using the SIM card, to implement functions such as conversation and data communication. In some embodiments, an eSIM, namely, an embedded SIM card, is used for the electronic device 100. The eSIM card may be embedded into the electronic device 100, and cannot be separated from the electronic device 100.

In this application, the microphone 170C may collect a user voice, and the processor 110 is configured to process the user voice collected by the microphone 170C. Then, the mobile communications module 150 and the wireless communications module 160 may establish a communication connection with a human-computer interaction server 200, for example, the communication connection 101 shown in FIG. 2. The display 194 may display, to the user, a voice processing result fed back by the human-computer interaction server 200. The speaker 170A and the telephone receiver 170B may broadcast, to the user, the voice processing result fed back by the human-computer interaction server 200.

Based on the foregoing descriptions about implementations, it may be clearly understood by a person skilled in the art that, for the purpose of convenient and brief description, division into the foregoing function modules is used as an example for description. In actual application, the foregoing functions can be allocated to different modules and implemented based on a requirement, to be specific, an inner structure of an apparatus is divided into different function modules to implement all or some of the functions described above. For a detailed working process of the foregoing system, apparatus, and unit, refer to a corresponding process in the foregoing method embodiments. Details are not described herein.

Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium, and includes several instructions for instructing a computer device (which may be a personal computer, a server, a network device, or the like) or a processor to perform all or some steps of the methods described in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a first server, wherein the method comprises:
   receiving a second user sentence;
   receiving a first user sentence after receiving the second user sentence;
   determining, based on the first user sentence, a first skill and a first intention associated with the first skill, wherein the first skill and the first intention match a service requirement expressed in the first user sentence, and wherein one or more intentions are associated with the first skill;
   extracting, from the first user sentences first entity of a first slot, wherein the first slot is associated with the first intention;
   extracting, from the second user sentence, a second entity of a second slot, wherein the second slot is an associated slot of the first slot and is associated with a second intention, wherein the second intention is an associated intention of the first intention and is further associated with a second skill, and wherein the second skill is an associated skill of the first skill;

modifying the first entity to the second entity of when the first entity is a pronoun;

sending, to a second server, a first service request comprising a first indication information of the first intention and the first entity, wherein the second server is an application server corresponding to the first skill; and obtaining, from the second server and in response to the first service request, a first service result that is based on the first indication information and the first entity.

2. The method of claim 1, further comprising receiving the first user sentence from an electronic device, wherein the first user sentence is either in an audio form or in a text form.

3. The method of claim 1, wherein before extracting the first entity, the method further comprises:

receiving, from the second server, a skill association request requesting to configure the second skill as the associated skill of the first skill, wherein the skill association request comprises second indication information of the first skill and third indication information of the second skill;

obtaining, in response to the skill association request, confirmation information from a third server confirming that the second skill is to be associated with the first skill, wherein the third server is an application server corresponding to the second skill; and configuring, based on the confirmation information, the second skill as the associated skill of the first skill.

4. The method of claim 3, wherein based on the confirmation information and before extracting the first entity, the method further comprises:

receiving, from the second server, a slot association request requesting to configure the second slot as the associated slot of the first slot, wherein the slot association request comprises fourth indication information of the first slot and fifth indication information of the second slot; and configuring, in response to the slot association request, the second slot as the associated slot of the first slot.

5. The method of claim 4, further comprising:

determining whether a first slot type of the first slot is the same as a second slot type of the second slot; and configuring the second slot as the associated slot of the first slot if when the first slot type is the same as the second slot type.

6. The method of claim 5, further comprising:

providing a system word library for all skills, wherein the system word library makes all slots comprising associated entities from a same system word library have a same entity set;

making a determination that the first entity is from the system word library; and associating, in response to the determination, a second slot name of the second slot with a first slot name of the first slot, wherein a second entity source associated with the second slot is the same as a first entity source associated with the first slot.

7. The method of claim 5, further comprising:

creating a first user-defined word library for the first skill, wherein the first user-defined word library is a first entity set associated with the first slot and comprises a limited quantity of words;

creating a second user-defined word library for the second skill, wherein the second user-defined word library is a second entity set associated with the second slot and comprises a limited quantity of words;

making a determination that the first entity is from the first user-defined word library;

associating, in response to the determination, a second slot name of the second slot with a first slot name of the first slot; and associating, in response to the determination, the first user-defined word library with the second user-defined word library.

8. The method of claim 1, further comprising receiving, from an electronic device, the first service result in a manner of a display on a screen of the electronic device.

9. The method of claim 1, further comprising further receiving, from an electronic device, the first service result in a manner of a voice-broadcast.

10. A method implemented by a second server, wherein the method comprises:

receiving, from a first server, a first service request, comprising first indication information of a first intention and a first entity of a first slot, wherein the first entity is based on a modification from a pronoun to a second entity of a second slot if when the first entity extracted from a first user sentence is the pronoun, wherein the second slot is associated with the first slot, wherein the first slot is associated with the first intention, wherein the first intention is associated with a first skill, wherein one or more intentions are associated with the first skill, wherein the second server is an application server corresponding to the first skill, wherein the first skill and the first intention are based on the first user sentence and match a first service requirement expressed in the first user sentence, wherein the second slot is associated with a second intention, wherein the second intention is associated with a second skill, wherein the second skill is associated with the first skill, wherein the second skill and the second intention are based on a second user sentence and match a second service requirement expressed in the second user sentence, and wherein the second user sentence is from the electronic device before the first user sentence;

determining a first service result based on the first indication information and the first entity; and sending, in response to the first service request, the first service result to the first server.

11. The method of claim 10, wherein before receiving the first service request, the method further comprises sending, to the first server, a skill association request is used to request requesting to configure the second skill as the associated skill of the first skill, and wherein the skill association request comprises second indication information of the first skill and third indication information of the second skill.

12. The method of claim 10, wherein before receiving the first service request, the method further comprises sending, to the first server, a slot association request requesting to configure the second slot as the associated slot of the first slot, and wherein the slot association request comprises second indication information of the first slot and third indication information of the second slot.

13. A computer program product comprising computer-executable instructions that are stored on a non-transitory computer readable medium and that, when executed by a processor, cause a first server to:
- receive a second user sentence;
- receive a first user sentence after receiving the second user sentence;
- determine, based on the first user sentence, a first skill and a first intention that is associated with the first skill, wherein the first skill and the first intention match a service requirement expressed in the first user sentence, and wherein one or more intentions are associated with the first skill;
- extract, from the first user sentence, a first entity of a first slot, wherein the first slot is associated with the first intention
- extract, from the second user sentence, a second entity of a second slot, wherein the second slot is associated with the first slot and is associated with a second intention, wherein the second intention is an associated intention of the first intention and is further associated with a second skill, and wherein the second skill is an associated skill of the first skill;
- modify the first entity to the second entity when the first entity is a pronoun;
- send, to a second server a first service request comprising first indication information of the first intention and the first entity, wherein the second server is an application server corresponding to the first skill; and
- obtain, from the second server and in response to the first service request, a first service result that is based on the first indication information and the first entity.

14. The computer program product of claim 13, wherein the computer-executable instructions further cause the first server to further receive the first user sentence from an electronic device, and wherein the first user sentence is either in an audio form or in a text form.

15. The computer program product of claim 13, wherein before extracting the first entity, the computer-executable instructions further cause the first server to:
- receive, from the second server, a skill association request requesting to configure the second skill as the associated skill of the first skill, wherein the skill association request comprises second indication information of the first skill and third indication information of the second skill;
- obtain, in response to the skill association request, confirmation information from a third server confirming that the second skill is to be associated with the first skill, wherein the third server is an application server corresponding to the second skill; and
- configure, based on the confirmation information, the second skill as the associated skill of the first skill.

16. The computer program product of claim 15, wherein based on the confirmation information and before extracting the first entity, the computer-executable instructions further cause the first server to:
- receive, from the second server, a slot association request requesting to configure the second slot as the associated slot of the first slot, wherein the slot association request comprises fourth indication information of the first slot and fifth indication information of the second slot; and
- configure, in response to the slot association request, the second slot as the associated slot of the first slot.

17. The computer program product of claim 16, wherein the computer-executable instructions further cause the first server to:
- determine whether a first slot type of the first slot is the same as a second slot type of the second slot; and
- configure the second slot as the associated slot of the first slot when the first slot type is the same as the second slot type.

18. The computer program product of claim 17, wherein the computer-executable instructions further cause the first server to:
- provide a system word library for all skills, wherein the system word library makes all slots comprising associated entities are from a same system word library have a same entity set;
- make a determination that the first entity is from the system word library; and
- associate, in response to the determination, a second slot name of the second slot with a first slot name of the first slot, wherein a second entity source associated with the second slot is the same as a first entity source associated with the first slot.

19. The computer program product of claim 17, wherein the computer-executable instructions further cause the first server to:
- create a first user-defined word library for the first skill, wherein the first user-defined word library is a first entity set associated with the first slot and comprises a limited quantity of words;
- create a second user-defined word library for the second skill, wherein the second user-defined word library is a second entity set associated with the second slot and comprises a limited quantity of words;
- make a determination that the first entity is from the first user-defined word library;
- associate, in response to the determination, a second slot name of the second slot with a first slot name of the first slot; and
- associate, in response to the determination, the first user-defined word library with the second user-defined word library.

20. The computer program product of claim 13, wherein the computer-executable instructions further cause the first server to further receive, from an electronic device, the first service result either in a manner of a display on a screen of the electronic device or in a manner of a voice-broadcast.

* * * * *

UNITED STATES PATENT AND TRADEMARK OFFICE
CERTIFICATE OF CORRECTION

PATENT NO. : 11,900,924 B2
APPLICATION NO. : 17/607657
DATED : February 13, 2024
INVENTOR(S) : Qing Zhang et al.

Page 1 of 1

It is certified that error appears in the above-identified patent and that said Letters Patent is hereby corrected as shown below:

In the Claims

Claim 10, Column 48, Line 26: "slot if when" should read "slot when"

Claim 11, Column 48, Lines 53-54: "request is used to request requesting" should read "request requesting"

Signed and Sealed this
Second Day of April, 2024

Katherine Kelly Vidal
*Director of the United States Patent and Trademark Office*